United States Patent [19]
Aman et al.

[11] Patent Number: 5,603,029
[45] Date of Patent: Feb. 11, 1997

[54] SYSTEM OF ASSIGNING WORK REQUESTS BASED ON CLASSIFYING INTO AN ELIGIBLE CLASS WHERE THE CRITERIA IS GOAL ORIENTED AND CAPACITY INFORMATION IS AVAILABLE

[75] Inventors: Jeffrey D. Aman, Wappingers Falls, N.Y.; Curt L. Cotner, Gilroy, Calif.; Donna N. T. Dillenberger, Yorktown Heights; David B. Emmes, Poughkeepsie, both of N.Y.

[73] Assignee: International Business Machines Corporation, Armonk, N.Y.

[21] Appl. No.: 476,157

[22] Filed: Jun. 7, 1995

[51] Int. Cl.⁶ .................................................. G06F 15/06
[52] U.S. Cl. .................... 395/675; 395/616; 395/859; 395/200.01; 364/242.94; 364/229; 364/230.3; 364/286; 364/281; 364/284.4
[58] Field of Search ........................ 395/200.01, 200.03, 395/600, 650, 826; 364/242.94, 229, 230.3, 280, 281, 284.4, 902

[56] References Cited

U.S. PATENT DOCUMENTS

| | | | |
|---|---|---|---|
| 4,481,583 | 11/1984 | Mueller | 395/732 |
| 5,241,677 | 8/1993 | Naganuma et al. | 395/650 |
| 5,341,477 | 8/1994 | Pitkin et al. | 395/200 |
| 5,537,542 | 7/1996 | Eilert et al. | 395/184.01 |

OTHER PUBLICATIONS

D. Sitaram et al, Issues in the . . . Load Skew, Parallel and Distributed Information Systems, pp. 214–223 1993.

Lin et al., "A Dynamic Load Balancing Policy with a Central Job Dispatcher (LBC)", *Proceedings of the Eleventh International Conference on Distributed Computing Systems*, Arlington, Texas, 20–24 May 1991, pp. 264–271.

Geise, "Dynamic Load Balancing in a Cluster of Loosely Coupled Systems", *IBM Technical Disclosure Bulletin*, vol. 37, No. 7, Jul. 1994, pp. 243–244.

Herrin II, et al., "The Benefits of Service Rebalancing", *Proceedings of the Third Workship on Workstation Operating Systems*, Key Biscayne, FL, 23–24 Apr. 1992, pp. 104–110.

Menditto et al., "Single System Image And Load Balancing For Network Access To A Loosely Coupled Complex", *IBM Technical Disclosure Bulletin*, vol. 34, No. 9, Feb. 1992, pp. 464–271.

*Primary Examiner*—Thomas C. Lee
*Assistant Examiner*—Anderson I. Chen
*Attorney, Agent, or Firm*—William A. Kinnaman, Jr.; Peter L. Michaelson; Michaelson & Wallace

[57] ABSTRACT

Apparatus and accompanying methods for use preferably in a multi-system shared data (sysplex) environment (100), wherein each system (110) provides one or more servers (115), for dynamically and adaptively assigning and balancing new work and for new session requests, among the servers in the sysplex, in view of attendant user-defined business importance of these requests and available sysplex resource capacity so as to meet overall business goals. Specifically, systems and servers are categorized into two classes: eligible, i.e., goal-oriented servers running under a policy and for which capacity information is currently available, and candidate, i.e., servers which lack capacity information. Work requests for a client application are assigned first to various eligible systems and eligible servers thereon based on their current capacity to accept new work and in a manner that meets business goals inherent in a sysplex policy; followed, if additional servers are requested by that application, to candidate systems and candidate servers thereon. As to session placement, first those system(s) are selected that have lowest utilization, at a target importance level, but with sufficient available capacity at that level. Competing servers on the selected system(s) are then evaluated based on their corresponding session count data to yield a single resulting server. Thereafter, identification of multiple servers and their corresponding weights are returned to, e.g., a client application, for eventual routing of work requests to those servers, or the identification of a single server is returned to that application for establishing a new session therewith.

44 Claims, 25 Drawing Sheets

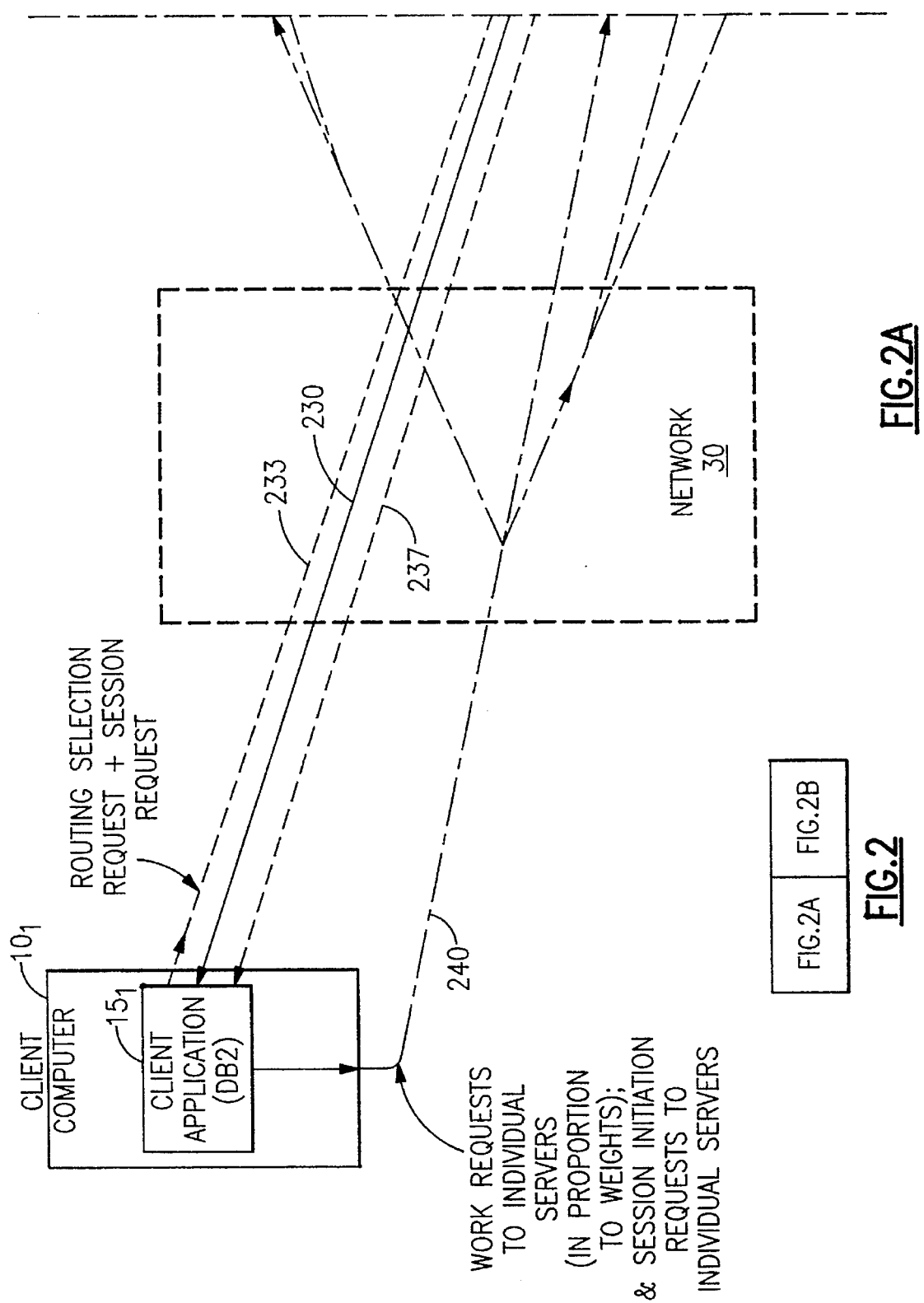

FIG.3

| WORK TYPE | IMPORTANCE LEVEL | SERVICE UNIT SUM @60 SEC. (ILSS_SUM%60) | %60 | SERVICE UNIT SUM @120 SEC. (ILSS_SUM%120) | %120 | SERVICE UNIT SUM @180 SEC. (ILSS_SUM%180) | %180 |
|---|---|---|---|---|---|---|---|
| SYSTEM OVERHEAD | 0 | 100000 | 100% | 200000 | 100% | 300000 | 100% |
| CUSTOMER SPECIFIABLE IMPORTANCE LEVELS | 1 | 92000 | 92% | 180000 | 90% | 285000 | 95% |
|  | 2 | 75000 | 75% | 150000 | 75% | 240000 | 80% |
|  | 3 | 55000 | 55% | 120000 | 60% | 150000 | 50% |
|  | 4 | 30000 | 30% | 50000 | 25% | 90000 | 30% |
|  | 5 | 2000 | 2% | 15000 | 7% | 30000 | 10% |
| DISCRETIONARY WORK | 6 | 500 | 0% | 6000 | 3% | 9000 | 3% |
| UNUSED (AVAILABLE) CAPACITY | 7 | 0 | 0% | 2000 | 1% | 6000 | 2% |

↖300

310, 320, 330, 340, 350, 360

|  | NAME (SERVER SET) | SYTEM NAME | LU (LOGICAL UNIT) | NETWORK |
|---|---|---|---|---|
| SERVERS 1–3 | ATM | SYS A | T5732A | BANKING |
| SERVERS 4–5 | NYC | SYS B | T9723M | ADMIN |
| SERVERS 6–10 | NYC | SYS B | T876X | ADMIN |
| ⋮ | ⋮ | ⋮ | ⋮ | ⋮ |

SYSPLEX ROUTER REGISTERED USER (SRRU) TABLE

FIG. 4

| SERVER | GENERIC RESOURCE NAME | LU (LOGICAL UNIT) | NETWORK |
|---|---|---|---|
| 1 | ATM | TR127 | BANKING |
| 2 | ATM | TR234 | BANKING |
| ⋮ | ⋮ | ⋮ | ⋮ |

GENERIC RESOURCE REAL INSTANCE (GRRI) TABLE

FIG. 10A

| SYSTEM | GRSS TABLE |
|---|---|
| SYS A | 20 |
| SYS B | 10 |
| SYS C | 30 |
| SYS D | 55 |
| SYS E | 80 |

GENERIC RESOURCE SELECTED SYSTEMS (GRSS) TABLE

FIG. 10B

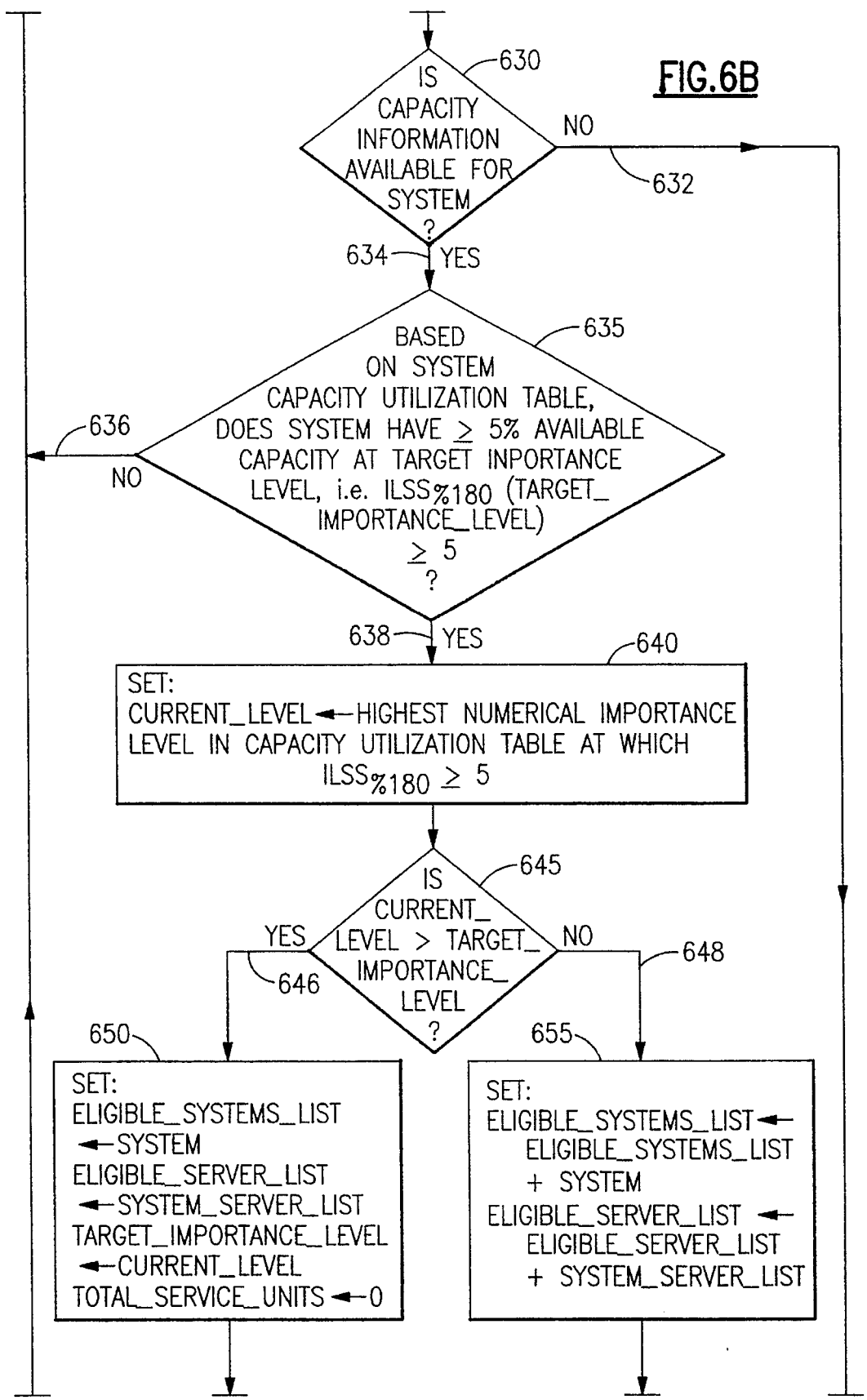

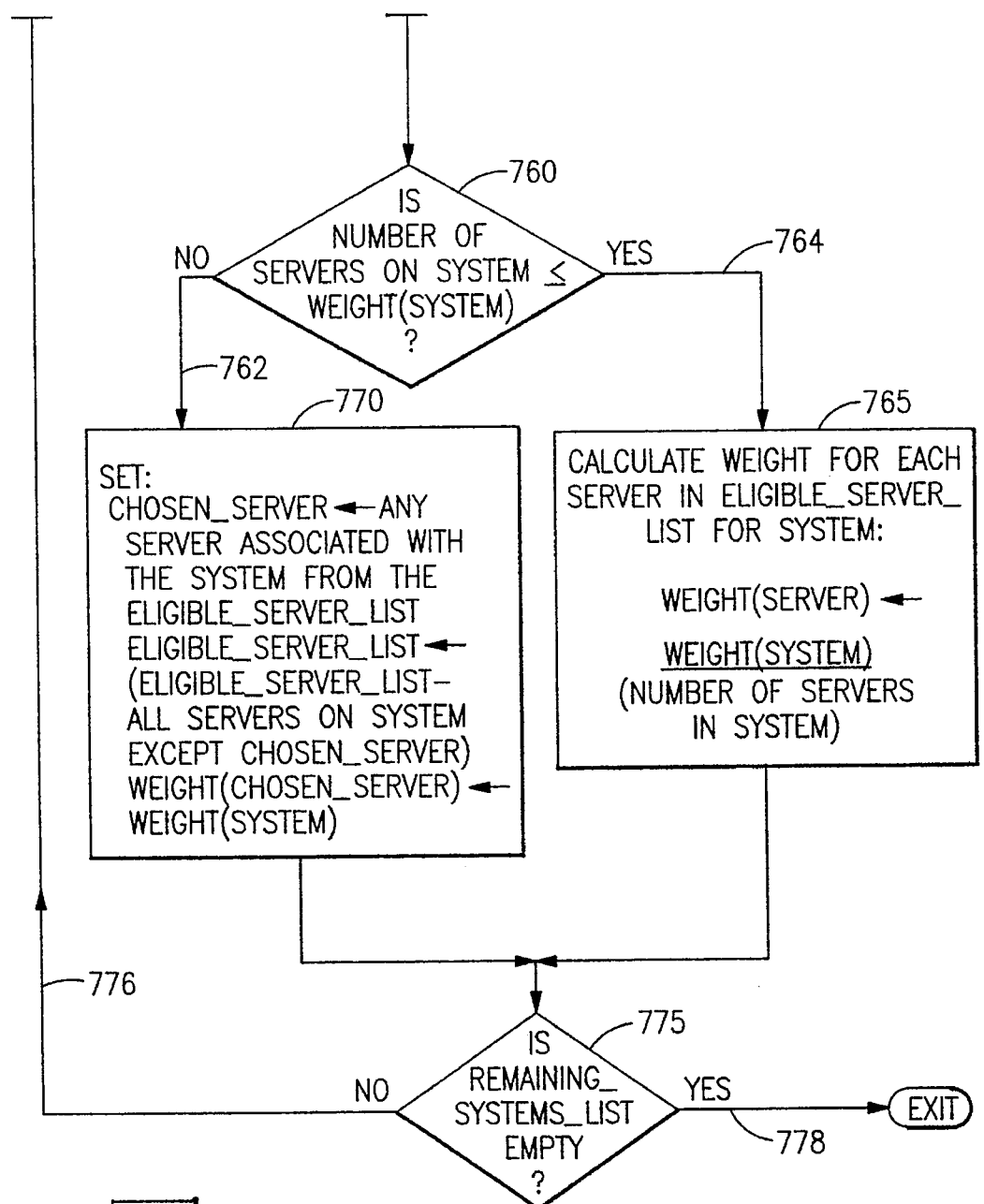

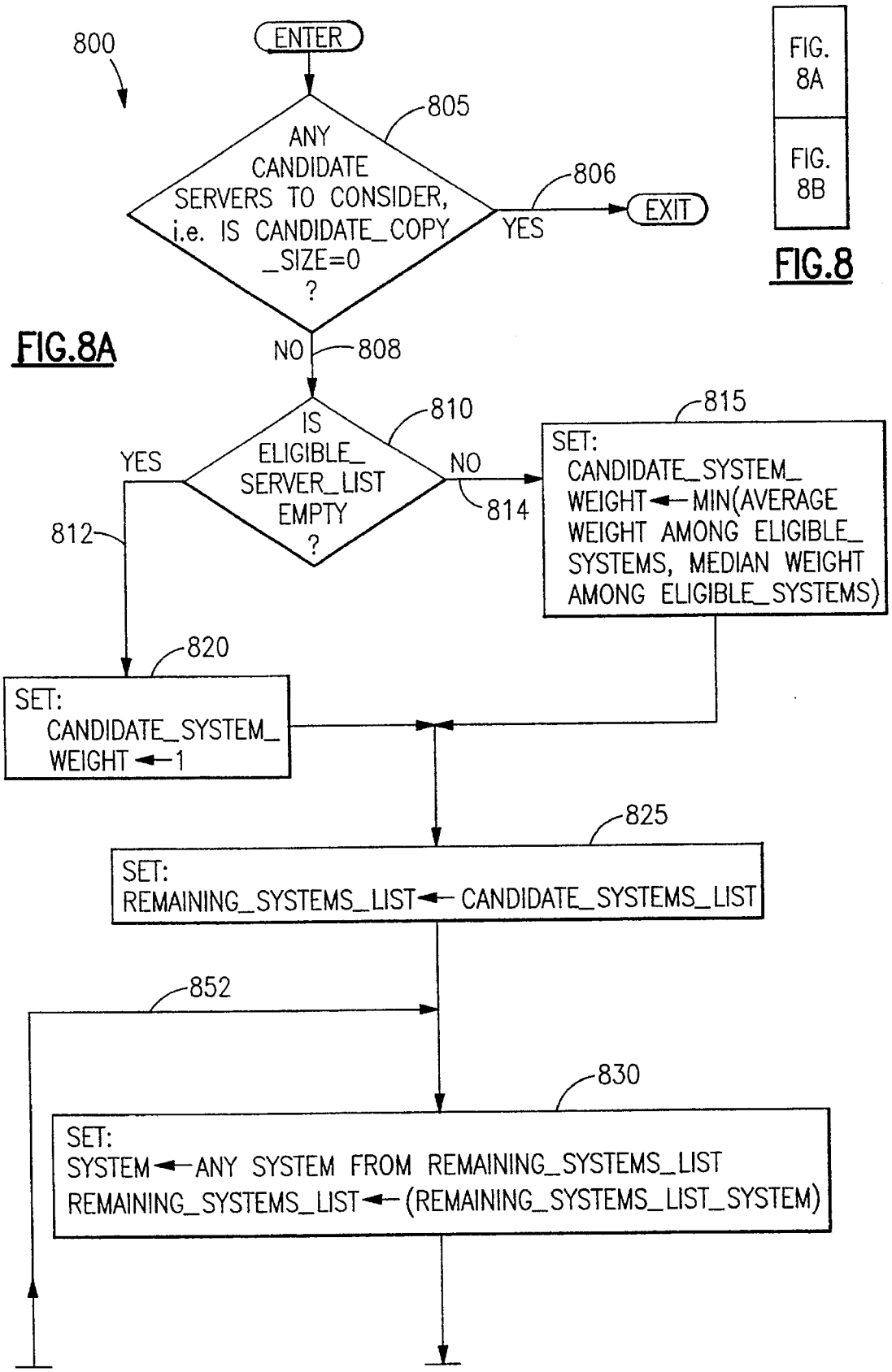

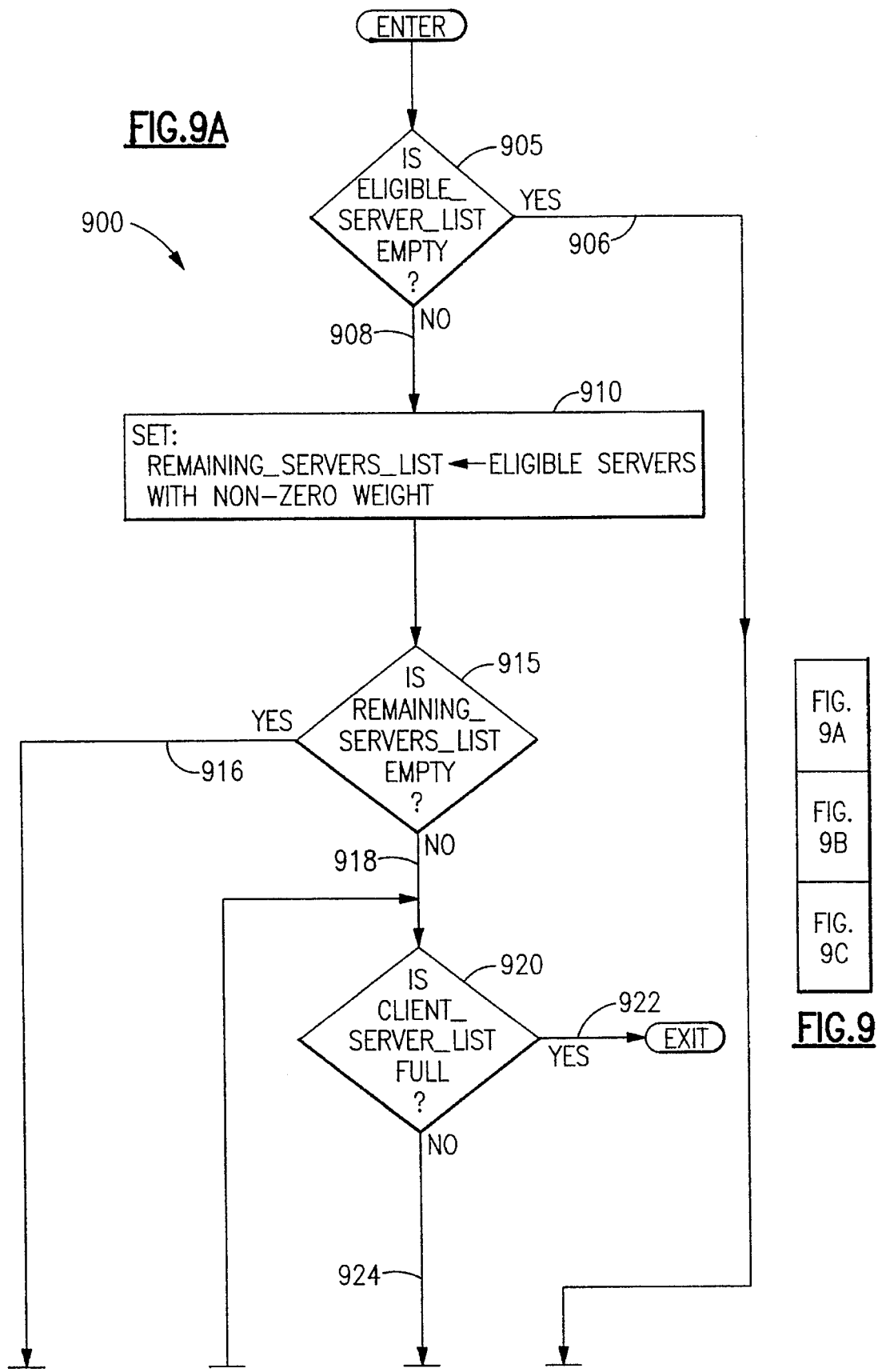

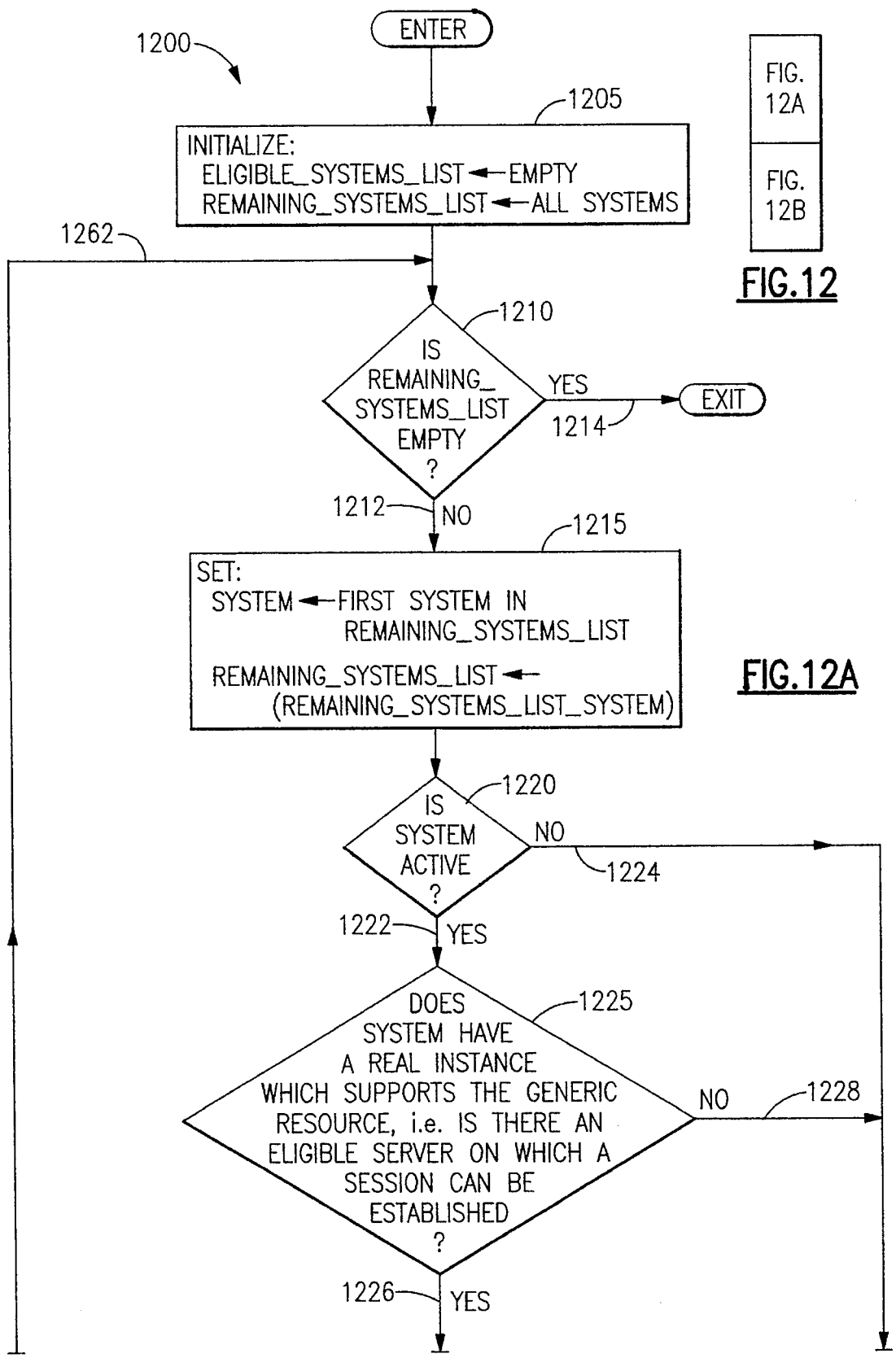

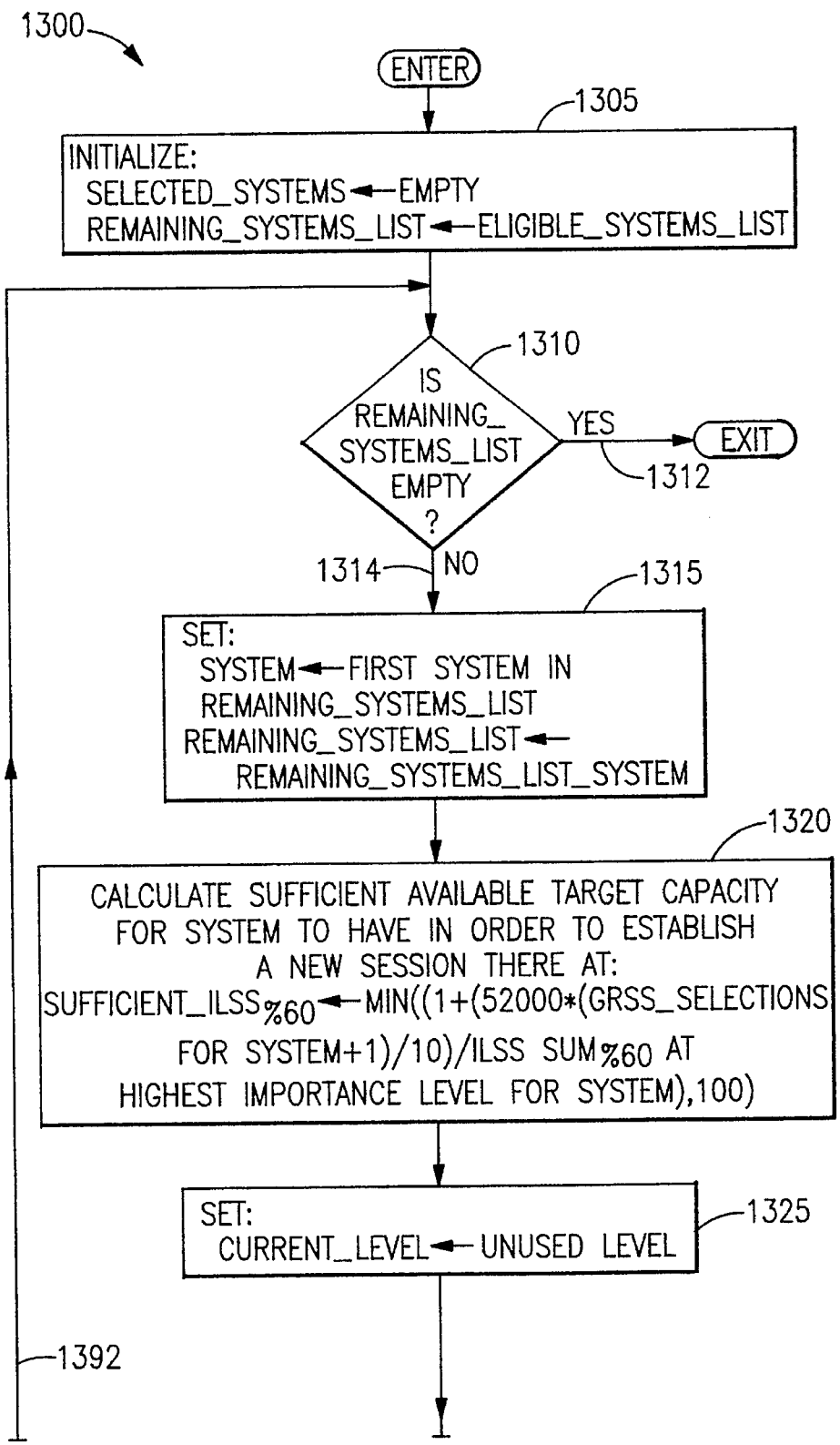

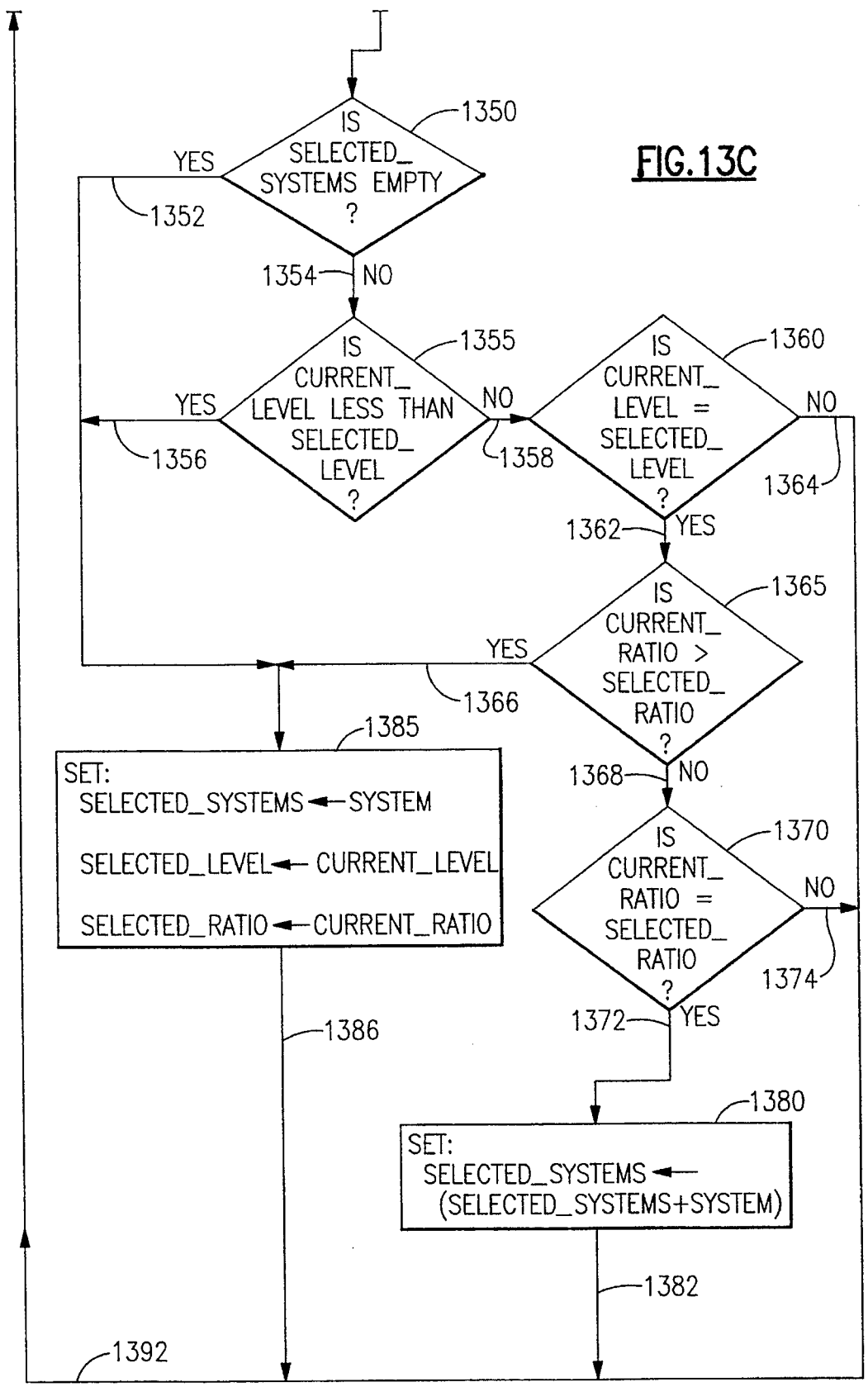

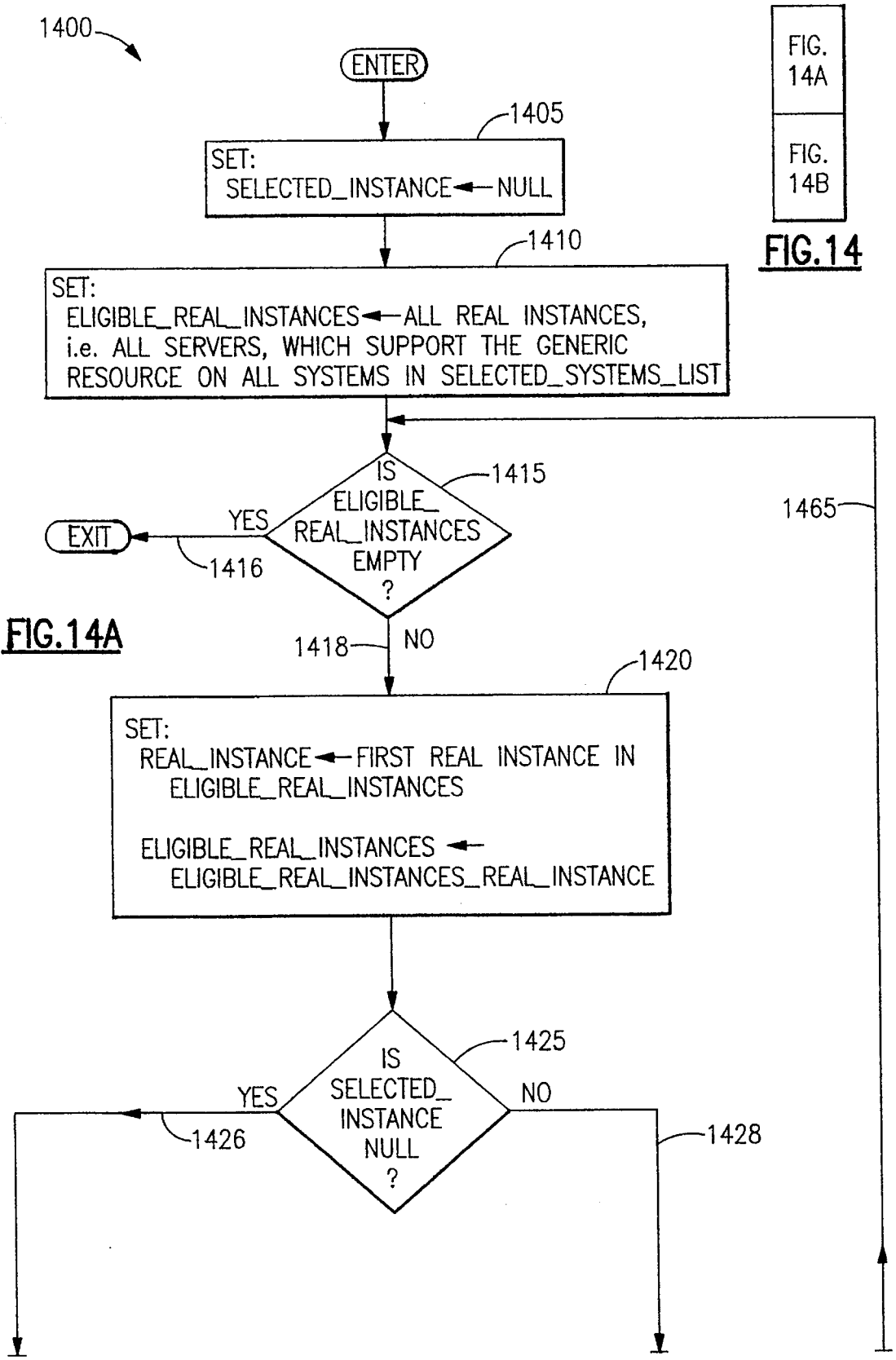

5,603,029

SYSTEM OF ASSIGNING WORK REQUESTS BASED ON CLASSIFYING INTO AN ELIGIBLE CLASS WHERE THE CRITERIA IS GOAL ORIENTED AND CAPACITY INFORMATION IS AVAILABLE

CROSS-REFERENCE TO RELATED APPLICATION

This application describes and claims subject matter that is also described in co-pending United States patent application of Jeffrey D. Aman, David B. Emmes and David W. Palmieri entitled "APPARATUS AND ACCOMPANYING METHOD FOR ASSIGNING SESSION REQUESTS IN A MULTI-SERVER SYSPLEX ENVIRONMENT"; filed concurrently herewith; assigned Ser. No. 08/488,374, now pending and which is also assigned to the present assignee hereof.

BACKGROUND OF THE DISCLOSURE

1. Field of the Invention

The invention relates to apparatus and accompanying methods for use preferably, though not exclusively, in a multi-system shared data (sysplex) environment, wherein each system provides one or more servers, for dynamically and adaptively assigning and balancing new work and for session requests, among the servers in the sysplex, in view of attendant user-defined business importance of the requests and available sysplex resource capacity so as to meet overall business goals.

2. Description of the Prior Art

Prior to the early-1980s, large scale computing installations often relied on using a single monolithic computer system to handle an entire processing workload. If the system failed, all processing applications in the workload were suspended until the failure was remedied. While a resulting processing delay was tolerated at first, as increasingly critical applications were processed through the system, any such ensuing delays became increasingly intolerable. Furthermore, as processing needs increased, the entire system was eventually replaced with a new one of sufficient capacity. Replacing systems in that manner proved to be extremely expensive and very inefficient. However, at that time, few workable alternatives existed, to using monolithic systems, that appreciably eliminated both these outages and an eventual need to replace the entire system.

To efficiently address this need, over the past several years and continuing to the present, computer manufacturers are providing processing architectures based on a multi-system shared data approach. Through these architectures, multiple large-scale computer systems, each of which is often referred to as a computer processing complex (CPC) or a central electronic complex (CEC), are inter-connected, through, for example, a coupling facility or other inter-processor communication mechanism, to permit each such system to gain read-write access to data residing on one or more shared input/output devices, such as a direct access storage device (DASD). The resulting inter-connected computer system is commonly referred to as a "sysplex". In a sysplex, as with a typical multi-processing environment, a processing workload is generally distributed among all of the inter-connected computer systems such that each computer system is responsible for processing a portion of the entire workload. Conventionally then, each of these systems executes its own portion of the total workload independently of that undertaken by any the other such systems. Owing to the inherent high reliability and highly cost-efficient expansion potential of a sysplex architecture, sysplexes are particularly attractive in handling so-called critical business support applications that involve real-time transaction processing and can tolerate essentially no downtime.

Generally, within a sysplex, separate copies (so-called "instances") of an application are resident and simultaneously active on more than one of the computer systems, each henceforth referred to as a "machine" to differentiate the physical hardware therefor, and, based upon, e.g., the processing capacity required for the application, often on all or most of these machines.

Certain currently available machines that can be readily incorporated into a sysplex, such as illustratively the Enterprise System/9000 (ES/9000) Series manufactured by the International Business Machines (IBM) Corporation, can each support, if appropriately configured, multiple actively and simultaneously executing copies of various operating systems (OS) to implement separate corresponding individual and unique application processing environments. (Enterprise System/9000 is a registered trademark, and ES/9000 is a trademark, of the International Business Machines Corporation.) Each of these environments utilizes a separate copy of the operating system, such as the MVS/ESA (henceforth simply "MVS") OS, which forms a so-called OS "image", along with an instance (s) of corresponding application program (s) and a dedicated storage area (typically a logical partition—"LPAR"). (MVS/ESA is a trademark, and IBM is a registered trademark, of the International Business Machines Corporation.) As such, each such environment thus constitutes a separate "processing system" (henceforth referred to, for the sake of brevity, as simply a "system"). Each application instance that executes on any such system constitutes a separate application server (henceforth referred to as simply a "server" or "real instance") to service a portion of the total workload presented to the overall application on the sysplex. A system, based on its processing capacity and that required by the corresponding applications, can implement one or more corresponding servers.

A recurring difficulty in using multiple servers has been how to effectively balance the current processing load across the servers. Traditionally, operating systems, such as the MVS OS, relied on a totally static approach to allocating available sysplex resources, such as available servers, processing time, and processor storage, to each current work request. To accomplish this, system administrators utilized historic performance measurements of past workload processing to project just what sysplex resources would then be available as each new work request was presented to the sysplex and how these available resources should be allocated to handle that request. The overall goal of the administrator in allocating these resources to the current work requests was simply to keep each system maximally busy, i.e., to utilize as many available clock cycles thereon as possible, in effect keeping that system "pegged" and hence maximizing its throughput.

For a sysplex, historic averaged performance measurements were made over a variety of intervals and in relation to a variety of causes: e.g., on a day-by-day basis, on an hour-by-hour basis, and by each individual application, as well as in relation to other time or usage-related metrics. Based on this data, a system administrator determined, from projections made from this historic data: how current work requests should be assigned to individual servers, a dispatching priority for each one of these requests that would be queued on each server, i.e., the order in which these requests were to be executed on that server, and the amount of resources at that server to allocate to each new work request presented thereto. Once these determinations were made for an expected sysplex workload in view of the goal of maximizing throughput of each system, the administrator simply instructed the operating system at each server accordingly. Through this effort, the administrator strove to distribute the total workload, as he or she then foresaw it, across all the servers as evenly as possible consistent with maximizing the throughput of all the servers.

Unfortunately, dispatching relationships existing between different work requests queued for execution in a sysplex tend to be extremely complex. Not only were accurate predictions of workload and resource allocations across multiple servers extremely tedious and difficult to create, but also such allocations were based on static, i.e., fixed, workloads having concomitant demands for each server that were not expected to change over time. Unfortunately, in practice, workloads do change, often significantly with time. Predictions predicated on static workloads simply could not accommodate subsequent changes in sysplex workload. Hence, each time a new application or a change in arrival patterns or demand for existing workload was to occur in a sysplex, the administrator had to totally re-formulate (re-iterate) the predictions and accordingly change the work request assignments and resource allocations therefor in order to accommodate the additional work request. Doing so would, of necessity, involve determining whether any processing conflicts would arise by introduction of the new work request vis-à-vis existing requests then being processed and then resolving all such conflicts. Moreover, not only did each subsequent iteration consume substantial effort, but a static prediction assumed that future work requests, even for the same application, would behave as past work requests therefor did. Since this assumption often failed to account for sudden increases, i.e., spikes, in processing demand by an application, such as a surge in users and/or transactions therefor, these static workload predictions, coupled with fixed work request assignments and pre-determined sysplex resource allocations, simply could not efficiently accommodate dynamic changes in workload. Hence, imbalances between systems frequently arose through which one or more systems would be heavily loaded while others would be lightly loaded. Consequently, work requests that then had a high degree of business importance, and either could not wait or could tolerate only minimal delay, might nevertheless be queued on the former systems for relatively some time awaiting dispatch for execution, while queued work requests of much lesser business importance would be dispatched far more quickly on the latter systems. Hence, the sysplex, due to inter-system processing imbalances resulting from static work assignment and pre-defined resource allocation, was often unable to meet its business goals, i.e., its total current processing demand was not met and accompanying processing results were not provided in a manner temporally consistent with the business importance of the underlying application(s).

While the art teaches several approaches for providing improved workload balancing in a sysplex, or generally a multi-processing environment, all these approaches suffer drawbacks that limit their attractiveness and general utility.

Specifically, an early attempt at balancing workload across multiple systems involved physically connecting a certain number of users, on a pre-defined basis often in terms of physical wiring or other such interconnections, to each system and thereafter routing all work requests, incoming over a network and originating from those users, to only that system to the exclusion of all other systems. For brevity, we will refer to this approach hereinafter as "connection based" balancing. The user assignments, specifically the interconnections, were initially established such that an approximately equal number of users would be connected, at any one time, to each system. Under this approach, once a user, through a physical connection to a given system, established a terminal session thereat, all the work requests for that session were routed solely and directly to that given system. Unfortunately, significant inter-system processing imbalances frequently occurred. In that regard and at one extreme, one or a small number of users using one common system but having a collectively large demand for processing, could overwhelm that system to the detriment of all the other users executing applications thereat; while a large number of other such users, such as those having sessions with relatively little activity, connected to one or more other system(s) might collectively present relatively light processing demands and all receive quick dispatching of all their work. At another extreme and prior to networked systems, users simply choose the particular system they logged onto. Consequently, a large number of active users could utilize a given system(s) thereby causing a significant imbalance between that system(s) and the others, which were then much less loaded. Furthermore, since user assignments were established through pre-defined hardware connections, users could well be connected to systems that were not then available and hence receive no application processing whatsoever, thereby further exacerbating workload and session imbalances among the systems and hence once again resulting in an overall failure of the sysplex to meet its business goals.

A later attempt, commonly referred to as "session placement", provided increased flexibility in terms of balancing workload in view of system failure(s). Session placement relied on assigning and connecting each user, then seeking to establish a terminal session, on a balanced session count basis to the next available system. This user assignment and connection was generally accomplished through some type of network interconnect facility—such as an IBM Virtual Telecommunications Access Method (VTAM). (VTAM is a registered trademark of the International Business Machines Corporation.) While this approach precluded session assignment to a failed system and thus accorded improved inter-system workload balancing, it still proved deficient. Specifically, the interconnect facility simply had no knowledge, a priori, of the amount of work any one session entailed or, for that matter, the business importance of that work vis-à-vis other work then queued or executing on the sysplex. Here too, as with connection based balancing, a system could be overwhelmed by a relatively small number of users with collectively heavy processing demands, thus leading once again to workload and session imbalances.

Moreover, while VTAM maintained knowledge of which systems were available at any one time, each of these systems, simply by virtue of their own processing hardware, could well provide radically different processing capacity than the others: some of these systems might have substantially more processing power relative to others having much less. VTAM had no knowledge of these capacity differences, which could, if recognized and utilized, tend to skew the number of work assignments towards the larger capacity systems. By failing to successfully exploit these capacity differences, workload imbalances were exacerbated in sysplexes having systems of widely differing capacity. In contrast, with connection based balancing, increasingly large systems frequently accommodated correspondingly increased numbers of physical connections and hence users and thus, to a certain extent, successfully exploited these capacity differences.

Unfortunately, session count balancing, as well as certainly connection based balancing, failed to account for the business importance of the various work requests that constituted this workload. Thus, both of these approaches were often unable to meet processing demand in a manner temporally consistent with the current business importance of the underlying application(s) to be processed. For example, by concentrating on maximizing throughput of processed work, no attention was paid, during dispatching, to the relative business importance of the individual work requests, thereby often causing relatively important work to be delayed at the hand of other such work of much lesser importance with a concomitant failure to meet overall business goals.

Given the deficiencies inherent in distributing sessions on a simple balanced session count basis, the art has attempted to remedy these deficiencies by modifying the session count balancing approach to accommodate work request transfers among systems—hereinafter referred to as the "session count balancing with transfer" approach. Specifically, once sessions are assigned to given systems by VTAM, then, in the event of a workload imbalance between systems, heavily loaded system(s) could then transfer individual work requests, on a request-by-request basis, to any other system that then had sufficient idle capacity. Accordingly, if session count balancing resulted in relatively poor session placements, i.e., "bad" choices which caused or exacerbated a current workload imbalance, then, to a certain extent, these bad choices could be subsequently alleviated by subsequent work redistribution among the systems themselves. While at first blush, this appears to be an attractive solution; unfortunately, it can result in significant cost. Specifically, the process of communicating and transferring work requests is heavily dependent on the inter-system communications fabric, incorporated into the sysplex, and available processor resources. Not only must the sysplex contain sufficient communication links, providing high-speed bandwidth to enable such a transfer at any time, but also each such transfer consumes a certain amount of system instructions, expended both at a transmitting system and a receiving system, such as on the order of, e.g., 50K instructions/work request. If the work request is relatively large, then, the resulting processor overhead needed to implement the transfer may be small or even negligible as compared to the processing demands of the work request itself, thereby readily justifying the cost, in terms of system overhead, of the transfer. On the other hand, a work request that consumes a relatively small number of instructions, such as on the order of, e.g., 100K or so, would be simply be too expensive, again in terms of system overhead, to transfer to another system. Unfortunately, rarely, if ever, will a system have a priori knowledge, immediately upon its receipt of a work request, as to just how much processing that request entails, i.e., just how many instructions that request will ultimately consume. Once a system starts processing a request and is then able to possibly estimate its size, it is then simply too late to transfer the request. Thus, given the lack of insight as to the ultimate size of any processing request, the session count balancing with transfer" approach can still produce "bad" choices that result in workload imbalances among the individual systems in the sysplex.

An alternate approach taught in the art for workload balancing, applies in a network context where a network can route a work request from any user to any system in the sysplex. Similar to connection based balancing, this approach involves returning a list of routers, from a network type OS in the sysplex, and then, routing through the network, a current work request to one of these servers. This server is identified in a fixed manner through directories, by the network OS, such as in a round-robin fashion, as the next successive server in the directory or as simply the first server in the directory. Unfortunately, this approach relies on a customer, particularly the sysplex administrator, to define a directory, i.e., an installation table, of all the servers. This table changes whenever a new server is installed or removed. Furthermore and similar to the other approaches described above, the network-based routing process disadvantageously has simply no knowledge of the business importance of the work requests, both those currently executing as well as those that are competing for service, or what other tasks, other than routed work requests, are being executed at each of the available servers and their respective levels of importance. Hence, work requests are frequently assigned and ultimately dispatched totally inconsistent with their actual business importance. Moreover, owing to a lack of knowledge as to actual server loading or availability, a server can be overloaded or taken out of service, but, no information thereof will be immediately passed back to the network routing process to prevent the network from attempting to send a work request to any such then non-available server. As such, whenever a server becomes non-available—because, e.g., it is overloaded or taken out of service, the network is forced to wait for an appropriate response, more likely a lack of response after a given time interval has elapsed, to signify that a given server is not then available. As such, once this time interval has elapsed, the network must then reroute the work request accordingly to the next server listed in the directory. However, this delay disadvantageously postpones both the dispatching and the ultimate processing of this work request—possibly contravening the importance underlying the request and hence causing the sysplex to once again fail to meet its overall business goals.

A recent attempt at allocating system resources to work requests based on attaining one or more pre-defined end-user oriented goals, such as execution velocity or response time, is described in co-pending U.S. patent application "Apparatus and Method for Managing a Data Processing System Workload According to Two or More Distinct Processing Goal Types", Ser. No. 08/222,755; filed Apr. 4, 1994; now U.S. Pat. No. 5,473,773, assigned to the present assignee hereof and incorporated by reference herein. This attempt represents a significant advance inasmuch as here OS software, rather than a system administrator, takes over the responsibility for allocating system resources in a manner that attempts to satisfy the end-user goals. However, this attempt still relies on a system administrator to assign all the work requests, based on a static workload prediction, to the individual servers in the sysplex and, only after this assignment has been made, allocates the available system resources to attain the goals. As a result of this static workload allocation among the servers, imbalances in workload and/or session placements, as discussed above, can disadvantageously still arise.

Therefore, a need currently exists in the art for a technique, including both a method and accompanying apparatus, that can be used in a multi-system environment, such as illustratively a sysplex or other multi-processing environment, for effectively balancing session placements and/or work requests, across all the servers therein, in view of attendant user-defined business importance thereof and available sysplex resource capacity. By doing so, this technique would be expected to utilize these available resources to balance workload and/or session placements in a manner that properly satisfies the overall business goals of the sysplex. This technique should not merely rely on static predictions of workload and/or session placements but rather should dynamically react and adapt to changing workloads and session requirements, as well as current server availability, and also effectively accommodate capacity differences existing among the various available systems. In addition, by not just relying on static predictions or fixed network based routing schemes, this technique should avoid making any "bad" choices as to session and/or work request placement, thereby obviating the need and cost that might otherwise be incurred to subsequently remedy such choices.

SUMMARY OF THE INVENTION

Advantageously, we have developed a technique, including both methods and accompanying apparatus, for use in illustratively a multi-system (sysplex) processing environment, for balancing work requests and/or session placements among the servers therein that substantially, if not totally, eliminates the deficiencies that currently exist in the art.

In accordance with our present invention and with respect to work request assignment, systems and servers are categorized into two classes: eligible and candidate. As discussed below, work requests for a client application are assigned first to various eligible systems and eligible servers thereon based on their current capacity to accept new work in a manner that meets business goals inherent in a sysplex policy; followed, if additional servers are requested by that application, to candidate systems and candidate servers thereon. Eligible systems are those goal-oriented systems running under the policy and for which current capacity information is known; candidate systems are those for which no current capacity information is known.

As our invention specifically teaches, in response to a routing selection request from a client application, a list of appropriate systems is first fabricated. This list is populated first by selected eligible systems and then, if space remains in the list, by selected candidate systems. Those eligible systems selected for inclusion in the list are those then exhibiting a pre-defined minimum level of capacity utilization at a lowest business importance level. Weights are assigned to each of the eligible systems based on the actual capacity utilized at these lowest levels, over a pre-defined time interval, illustratively three minutes, with respect to total capacity utilized at that level across all eligible systems. A server weight for each of the eligible servers (that are part of a collection of common servers which support the client application) on each eligible system is then calculated by dividing the weight for that eligible system by the number of active application servers thereon. In the event that the number of such servers exceeds the system weight thereby otherwise resulting in a fractional server weight, then the system weight is assigned to one of these servers on that eligible system; zero to all the others residing thereon. Thereafter, if candidate systems are to be selected, then weights are assigned to each candidate system and active candidate server thereon. If only candidate systems are to be selected, then the weight of each candidate system is set to one. Alternatively, if eligible servers are to be selected as well, then, if more eligible systems are to be selected than candidate systems, the weight of each candidate system is set as a minimum of the average and a median of all the system weights for all the eligible systems. In a similar fashion as with the eligible servers, the weight of each candidate server is calculated by dividing the candidate system weight by the number of candidate servers thereon. Here too any individual candidate server weight can not be fractional. Hence, in the event that the number of candidate servers exceeds the weight for the corresponding candidate system thereby resulting in a fractional server weight, then the system weight is assigned to one of these servers on that candidate system; zero to all the others residing thereon.

If non-zero weight eligible servers exist, then an output client server list is populated with identification of these servers (with their weights), in descending weight order, until either the client server list is full or the list of non-zero weight eligible servers is exhausted, whichever occurs first. In the latter case, identification of successive candidate servers (with their weights) are then written into this list in descending weight order, in order to fill the list if possible.

However, if the eligible servers are only those with zero weights—i.e., those eligible servers with relatively little capacity, then each of these eligible servers are successively assigned a common weight of one and selected in seriatim until the identifications of all these servers (including their weights) have been written into the client server list. An improvement may be to rotate the server entries among the different systems. Owing to their apparent inability to handle more than a small number, if any, of additional work requests, hence none of these servers is now particularly favored for new work. Thereafter, if any candidate servers are to be selected, each of these servers are successively assigned a weight of one and selected, again in seriatim, until all the candidate servers are selected or the client server list becomes full, whichever occurs first. In view of a lack of capacity information, none of these candidate servers is particularly favored as well.

As a result of our inventive work request assignment method, a list of servers and their corresponding server weights is identified to the client application which, in turn, will directly route a portion of the total work requests thereat to each of these servers in proportion to its weight. The client may request a refresh of this balancing assessment on a periodic basis.

With respect to session placement, our inventive method only places sessions when all relevant systems collectively have non-zero capacity information, i.e. are goal-oriented. In the absence of such systems, we will revert back to session count balancing. If all systems have capacity information, the eligible servers therein that are meeting their goals are selected first, followed by those not meeting their goals.

In particular, our inventive method first selects system(s) with sufficient available capacity at a lowest business importance level; if multiple systems result, then the one system that provides the largest amount of service per session is then selected. Competing servers on the selected system(s) are then evaluated based on their corresponding session count data to yield a single server. As a result of our inventive session placement method, the identification of that single server is returned to the client application which, in turn, will directly establish a session therewith.

Furthermore, our inventive technique provides the feature, as pertaining to work request assignment, of alternate routing and distribution of these requests. Not only can the individual work requests be routed from a client application directly, through a network, to corresponding sysplex servers, but also this routing can alternatively be accomplished within the sysplex itself. Sysplex based routing, via disadvantageously consuming additional overhead, advantageously frees the client application from any need to distribute and route work requests to individual servers and hence simplifies its programming.

Another feature of our invention, as it pertains to session placement, involves use of increasingly refined decision criteria to select among competing servers in order to account for transient server conditions. Rather than making sharp distinctions in choosing among competing servers for session placement, increasingly fine decision criteria can be used to give preference, that would not otherwise occur, to a system (and its servers) which, over a relatively short period of time, can be converted, through resource reallocation, from one not meeting its goals to one that is. Such a system may experience only a temporary loss in capacity caused by factors unrelated to insufficient CPU access, such as, e.g., inadequate memory size. The MVS OS continually re-assesses and, if required, re-allocates system resources at relatively short intervals, such as every ten seconds. Hence, a system not currently meeting its goals through receiving the needed resources can be converted into one, even with a new session established thereat, that will meet its goals. Thus, by spreading a new session to an additional server, sysplex performance is enhanced; hence further effectuating sysplex policy.

A further feature of our invention is that if a relatively large number of sessions have recently been placed at any given system within a relatively small time period, then any work flowing from a new session subsequently placed at that system may well experience some degree of latency. This arises from a latent demand at that system to process work subsequently requested by then existing, i.e., previously established, active and/or pending sessions thereat. Unfortunately, the amount of such latent work at any one system generally can not be accurately estimated a priori. Moreover, owing to latency, the capacity statistics in a system capacity utilization table will not update immediately upon placement of each new session, but rather will require some time, to accurately reflect the actual processing capacity utilized by that session. Consequently, our invention compensates for this latent demand.

BRIEF DESCRIPTION OF THE DRAWINGS

The teachings of the present invention can be readily understood by considering the following detailed description in conjunction with the accompanying drawings, in which:

FIG. 2 depicts the correct alignment of the drawing sheets for FIGS. 2A and 2B;

FIGS. 2A and 2B collectively depict a simplified high-level diagram for illustrative message flow that results from use of our present invention in sysplex 100, with, e.g., System E serving as a routing node therein;

FIG. 3 depicts System Capacity Utilization (Importance Level Service Summary—ILSS) table 300 as used by our present invention;

FIG. 4 depicts Sysplex Router Registered User (SSRU) table 400 also used by our present invention;

FIG. 6 depicts the correct alignment of the drawing sheets for FIGS. 6A–6C;

FIGS. 6A–6C collectively depict a high level flowchart of Eligible and Candidate Systems and Servers Determination routine 600 which is executed by routine 500, the latter shown in FIG. 5;

FIG. 7 depicts the correct alignment of the drawing sheets for FIGS. 7A–7C;

FIGS. 7A–7C collectively depict a high level flowchart of Eligible Server List and Weight Determination routine 700 which is also executed by routine 500, the latter shown in FIG. 5;

FIG. 8 depicts the correct alignment of the drawing sheets for FIGS. 8A and 8B;

FIGS. 8A and 8B collectively depict a high level flowchart of Selection of Candidate Servers and Weights Determination routine 800 which is also executed by routine 500, the latter shown in FIG. 5;

FIG. 9 depicts the correct alignment of the drawing sheets for FIGS. 9A–9C;

FIGS. 9A–9C collectively depict a high level flowchart of Server Assignment routine 900 which is also executed by routine 500, the latter shown in FIG. 5;

FIG. 10A depicts Generic Resource Real Instance (GRRI) table 1000 also used by our present invention;

FIG. 10B depicts Generic Resource Selected Systems (GRSS) table 1050 also used by our present invention;

FIG. 12 depicts the correct alignment of the drawing sheets for FIGS. 12A and 12B;

FIGS. 12A and 12B collectively depict a high level flowchart of System Set Ascertaining routine 1200 which is executed by routine 1100, the latter shown in FIG. 11;

FIG. 13 depicts the correct alignment of the drawing sheets for FIGS. 13A–13C;

FIGS. 13A–13C collectively depict a high level flowchart of System Determination routine 1300 which is also executed by routine 1100, the latter shown in FIG. 11;

FIG. 14 depicts the correct alignment of the drawing sheets for FIGS. 14A and 14B; and FIGS. 14A and 14B collectively depict a high level flowchart of Server Selection routine 1400 which is also executed by routine 1100, the latter shown in FIG. 11.

To facilitate understanding, identical reference numerals have been used, where possible, to designate identical elements that are common to various figures.

DETAILED DESCRIPTION

After considering the following description, those skilled in the art will clearly realize that the teachings of our present invention for dynamically assigning new work requests and placing new sessions across multiple servers can be used in computer installations that have any one of a wide variety of different multi-server and/or multi-processing architectures. Illustratively, these architectures can range from a relatively simple computer installation which utilizes a single physical processor that simultaneously executes several applications in separate operating system (OS) images, each image essentially implementing a separate application server, to a large sysplex that employs multiple computer processing complexes (CPCs), i.e., multiple physical processors, in which each CPC usually concurrently executes multiple applications against multiple OS images, the latter typified by a well known "PR/SM" MVS environment. (PR/SM is a trademark of the International Business Machines Corporation.) In such a multi-CPC environment, again each OS image implements a separate server. Through use of our present invention, work requests and session placements are dynamically assigned across a plurality of, generally all, the servers consistent with the business importance of the underlying work and available sysplex resources and overall business goals. With this in mind and to simplify the ensuing description, we will describe our invention in an illustrative context of use in a sysplex, such as the ES/9000 Series computer, that has separate systems all capable of accessing shared data; the sysplex and all its components are currently manufactured by the International Business Machines (IBM) Corporation of Armonk, New York (which is also the present assignee hereof).

A. Overview

Figure 1:
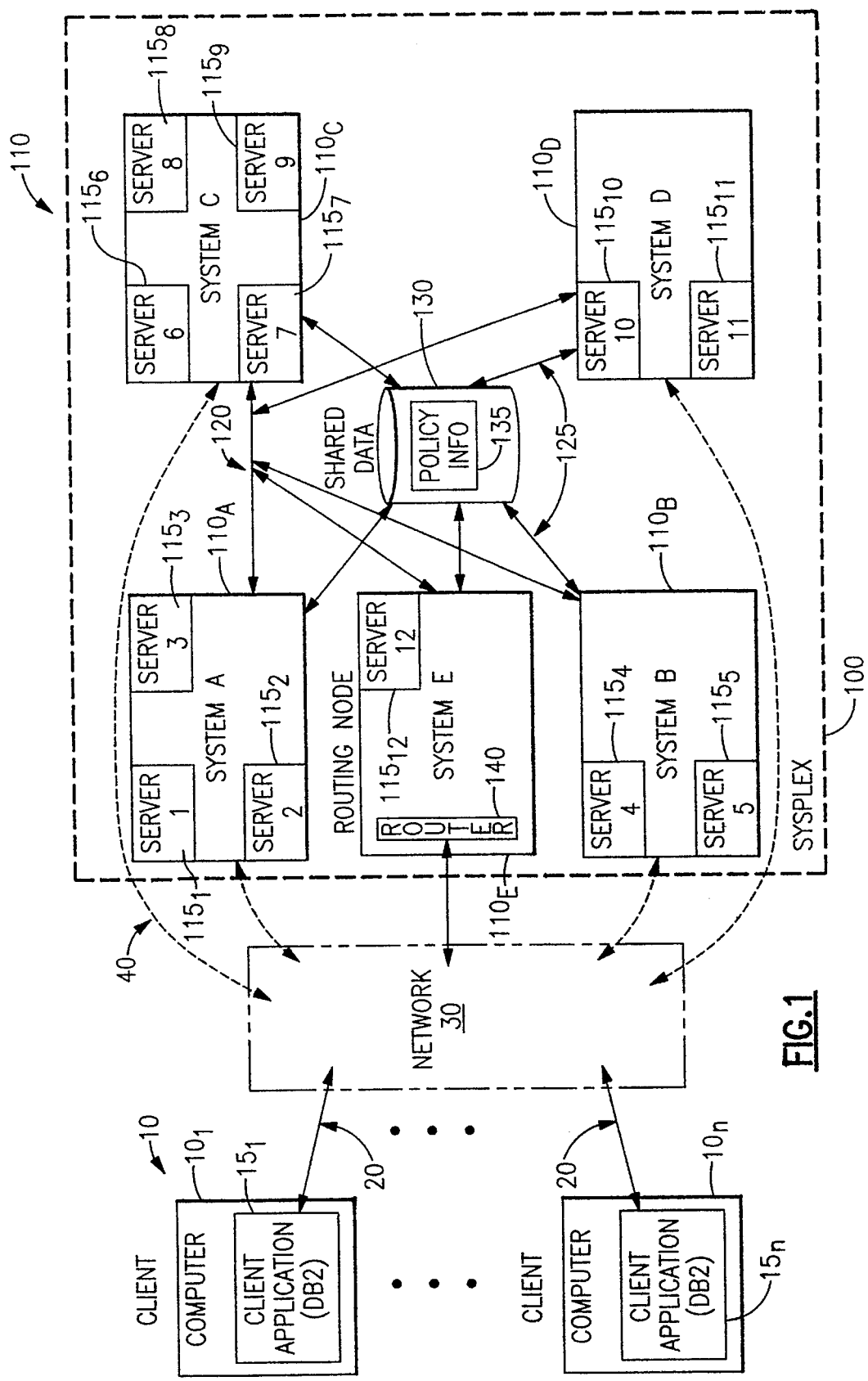
FIG. 1 depicts illustrative sysplex 100 with a typical associated computing environment.

FIG. 1 depicts typical sysplex 100 and a typical associated networked computing environment. As shown, remote client computers 10, having client computers $10_1, \ldots, 10_n$, are connected through connections 20, network 30, and connections 40, to sysplex 100, and specifically through the network to any of systems 110 residing within the sysplex. Illustratively, client computers $10_1, \ldots, 10_n$ execute respective client applications $15_1, \ldots, 15_n$; for simplicity, one such application, e.g., a DB2 database application, is shown as executing at each client computer, though, in actuality, each client computer can simultaneously execute different client applications and/or conduct multiple sessions of the same application. Those skilled in the art realize that a "session" is an example of a connection between two end-points, e.g. a client and a server. Hence, the term "session" will be defined and used in that generic context hereinafter. To simplify the drawing, the sysplex is shown as containing merely five systems: $110_A$, $110_B$, $110_C$, $110_D$ and $110_E$ (also designated as SYSTEM A, SYSTEM B, SYSTEM C, SYSTEM D and SYSTEM E, respectively). Since, from the standpoint of the present invention, it is immaterial as to which specific CPC implements any given system or how many systems reside on that CPC and, for that matter how many CPCs are utilized in sysplex 100, the CPC level has simply been omitted from the figure and will not be discussed further. All that is required, for the present invention, is that all the systems communicate, as discussed below, their current capacity utilization data, their own identification and identification of their resident and available server(s) with each other.

Each system implements a separate corresponding and unique application processing environment. Each of these environments utilizes a separate copy of an OS, such as the MVS OS, which forms a so-called OS "image", along with an instance(s) of corresponding application program(s) and a dedicated storage area (typically a logical partition—"LPAR"); the OS and LPAR are not specifically shown in the figure. Each application instance that executes on any such system constitutes a separate application server (henceforth referred to as simply a "server" or "real instance") to service a portion of the total workload presented to the overall application (also referred to as the "generic resource") on the sysplex. A system, based on its processing capacity and that required by the corresponding applications, can implement multiple corresponding servers. In that regard, sysplex 100 illustratively implements twelve separate servers 115; namely, servers $115_1$, $115_2$, and $115_3$ (also denoted as SERVER 1, SERVER 2, SERVER 3, respectively) on system $110_A$; servers $115_4$ and $115_5$ (also denoted as SERVER 4 and SERVER 5, respectively) on system $110_B$; servers $115_6$, $115_7$, $115_8$ and $115_9$ (also denoted as SERVER 6, SERVER 7, SERVER 8 and SERVER 9, respectively) on system $110_C$; servers $115_{10}$ and $115_{11}$ (SERVER 10 and SERVER 11, respectively) on system $10_D$; and server $115_{12}$ (also denoted as SERVER 12) on system $110_E$. One must bear in mind that a "system" as used herein is an intangible construct distinct from the actual physical CPC, i.e., the "machine", and specifically the physical processor therein, on which that system executes. Inasmuch as the invention addresses allocation and balancing of work requests and sessions among systems and servers thereon—regardless of where they reside in the sysplex, the "machine" level is irrelevant and will not be discussed any further. Furthermore, each of the systems 110 is capable of directly communicating with each other as symbolized by paths 120.

Shared data device 130 provides common data accessible among the systems. To the extent relevant here, device 130 stores policy information in dataset 135 that is commonly accessible by all the systems. The shared data device communicates with each of the systems 110 as symbolized by paths 125. The shared data device may be implemented by illustratively a coupling facility or a direct access storage device (DASD).

Each incoming work request, as well as session request, from any of client computers 10, specifically from client applications 15 running thereon, to the sysplex is accompanied by one or more associated attributes. The request attributes can span a wide variety and are typified by, e.g., user identification (USERID), accounting information, job name or transaction name. For any given request, policy information in dataset 135, using embedded pre-defined rules, is used to map the attributes for that request into a service class. Each different service class has a set of business goals associated therewith. These goals are varied and can constitute, e.g., required response time and required execution velocity—the latter signifying how fast a given piece of work is actually running vis-à-vis how fast that piece of work could run if nothing else was running at the time. Each of these goals has a numeric importance level associated with it which signifies the business importance attached to achieving that particular goal and hence the service class. These levels range from one to five, with one representing the highest importance level, five representing the lowest. Where insufficient sysplex capacity exists to immediately dispatch all work requests then assigned to any given system in the sysplex, those pending requests having higher importance levels prevail and are accorded higher dispatch priority for execution over those requests having lower importance levels. The present invention does not address either the actual prioritizing and dispatch of requests that have already been assigned to a given server or the policy based mapping of the request attributes into proper service classes and importance levels. Rather, as will be discussed in quite some detail below, the present invention is directed to a technique that, based upon business importance of existing requests (active work) and available sysplex resources, actually assigns these requests among the available systems and servers therein for subsequent execution in a manner that satisfies overall business goals of the sysplex, as embodied in the policy. Generally, some of the systems will be running under the goal based policy, while others may not. As will be seen below, our inventive process accommodates both types of systems.

As noted previously, network 30 provides a communication path from each of client computers 10 to any of systems 110. To facilitate this connection, each of the systems contains a network inter-connect facility, i.e. router 140. In use, incoming session and work requests initially flow from the network to one given system, a so-called "routing node", here shown as illustratively system $110_E$, to the sysplex. This particular node, through our inventive process, then provides information as to where subsequent requests should flow and communicates this information back to the requesting client computer, particularly the client application thereon, which, in turn, submits its work requests to system(s) and server(s) thereon. To accentuate the routing node function of system $110_E$, the communication path in paths 40 to that node is shown as a solid line, while every other such path in paths 40 from network 30 to each of the other four systems is shown as a dashed line.

B. Illustrative Message Flow

Figure 2B:
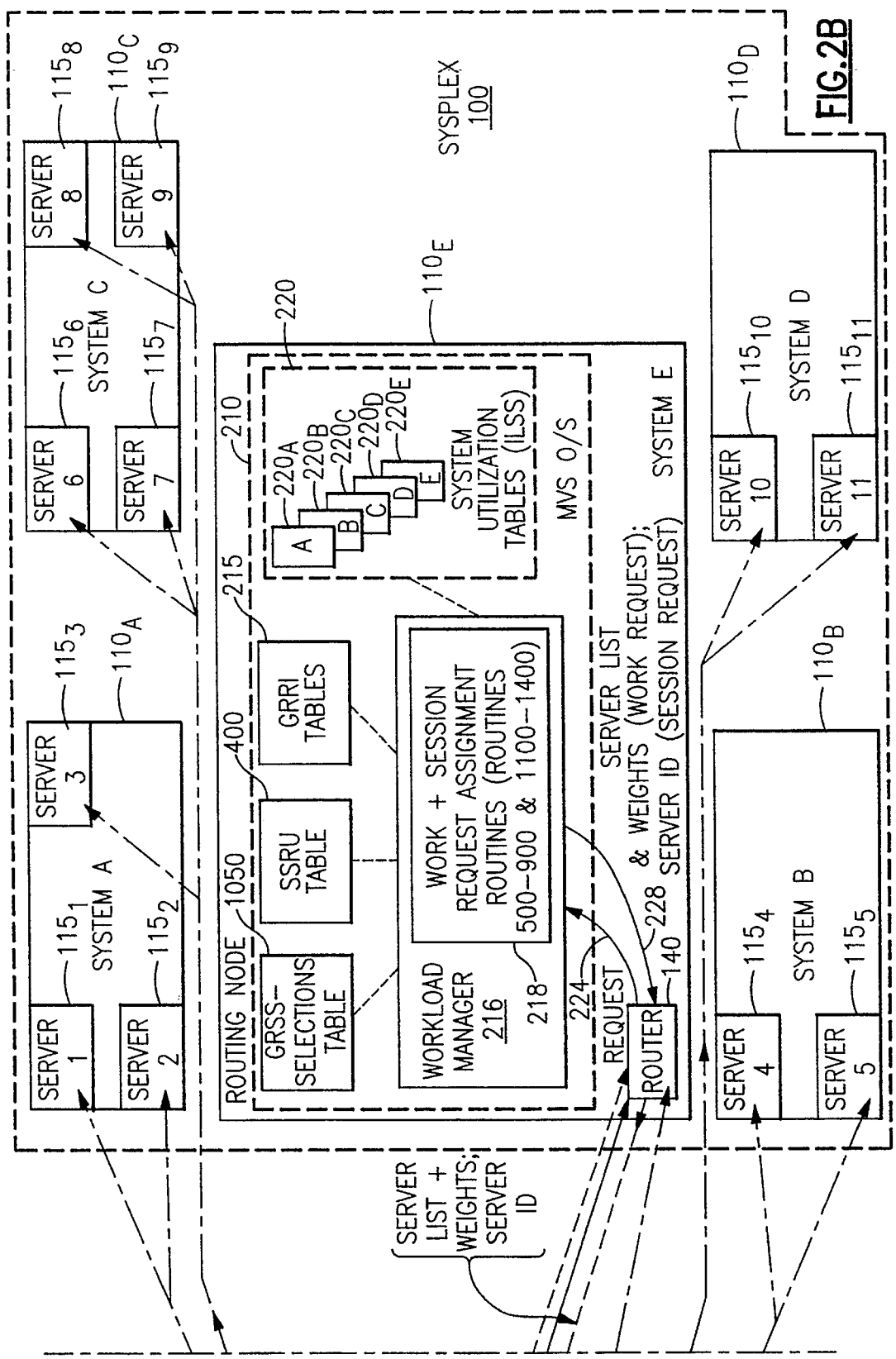

FIGS. 2A and 2B collectively depict a simplified high-level diagram of illustrative message flow that results from use of our present invention in sysplex 100 with system $110_E$ serving as the routing node; the correct alignment of the drawing sheets for these figures is shown in FIG. 2.

As depicted in FIGS. 2A and 2B, whenever illustrative client application (e.g., DB2) $15_1$ executing within client computer $10_1$ needs to either submit a work request to the sysplex or establish a session therewith, the client first establishes a connection to the sysplex. The network, transparent to the client application, extends this connection to the routing node, i.e., system $110_E$, within the sysplex and particularly to router 140; the entire connection being symbolized by solid line 230. As such, and as symbolized by dashed line 233, the work or session request is routed to router 140. This router, resident on system $110_E$, passes this request, as symbolized by line 224, to MVS OS 210 that executes on this system.

MVS OS 210, through particularly workload manager 216, assigns the work or session request, in accordance with the teachings of our present invention, to an available server(s), based upon current capacity information, consistent with the business importance of the request so as to satisfy overall business goals of the sysplex—as embodied in the policy. In so doing, the workload manager contains and executes our inventive work load and session assignment process, collectively depicted here as block 218, as discussed below as routines 500–900 and 1100–1400 and shown with FIGS. 5–9 and 11–14, respectively. Through our present invention, the work request and session placement that previously occurred on a basis of balancing session counts among servers, is modified to permit the workload manager to assign work and session requests in our inventive manner.

To the extent relevant, the MVS OS, which is replicated on each of the systems—though only OS 210 is shown, contains a workload manager; a Sysplex Router Registered User (SSRU) table—of which table 400 is illustrative; Generic Resource Real Instance (GRRI) tables—of which table 215 is illustrative; GRSS table 1050; and System Utilization tables—of which tables 220 are illustrative. The SSRU table, as discussed below in conjunction with FIG. 4, maintains a list of systems and their associated servers, and other associated information therefor, for the entire sysplex. The same exact table, with the same information, is maintained in each of the different systems. As new systems are brought on-line, that system undergoes a registration process, which, appropriately updates the SSRU table in each of the other systems to account for the new system and its servers. The GRRI table, also discussed below in conjunction with FIG. 10A, maintains a list of specific application servers (which support an overall application, i.e., a "generic resource", with each separate instance of an application resident on that server being a so-called "real instance") available on a given system. Each system maintains its own GRRI table and supplies, as a new server is brought on-line or taken off-line, every other system with all updates to that GRRI table. As such, exact copies of all the current GRRI tables are maintained on every system. Though not specifically illustrated, GRRI tables 215 contain five separate GRRI tables, one for each of systems $110_{A-E}$. The GRSS__Selections table 1050, which is also discussed below in conjunction with FIG. 10B, indicates the number of times, measured over, e.g., a ten second interval, that a session has been assigned, i.e., bound, by our inventive process, to a given system. This same table is also maintained and updated independently on every system to which our inventive process can assign a session. System utilization (Importance Level Service Summary—ILSS) tables 220 are formed of five tables (specifically $220_A$, $220_B$, $220_C$, $220_D$ and $220_E$), again one, as discussed below in conjunction with FIG. 3, for each system (systems $110_{A-E}$, respectively), that reports the current utilization, in terms of service unit sums and percentages of total capacity, for that particular system. However, only each of those systems that run in so-called "goal" mode, i.e., under a "policy", maintains an ILSS table for itself. Here, for purposes of illustration, all five systems are assumed to be running in this mode. System capacity is measured over illustratively three separate implementionally specific measurement periods, e.g.: 60 seconds, 120 second and 180 seconds. Alternatively, these periods could be formed of one or two intervals and possibly of different durations. Again, each system reports its current capacity information over these three measurement periods to every other system, thus allowing each of the five systems to maintain a complete current copy of ILSS tables 220 for all the sysplex systems. However, regardless of whether each system is running in goal mode or not, and hence maintaining its own ILSS table or not, that system maintains a corresponding ILSS table for every other system in the sysplex that is running in goal mode. Thus, if a sysplex has 32 systems all running in goal mode, the tables 220 (for each of those systems) will contain 32 separate ILSS tables, one for each of these goal mode systems.

Once the work or session request has been assigned, then, as symbolized by line 228, the workload manager passes the assignment information back to router 140. For work requests, the assignment constitutes a list of available servers and the percentage, in terms of a proportionate weight, of then total future work requested by the client application, e.g., client application $15_1$, that is to be routed to each of these servers. For a session placement request, the assignment information constitutes identification of a single server at which a new session requested by the client application is to be established. Once router 140 receives this assignment information, it routes, as symbolized by dashed line 237, this information back through network 30 to requesting client application $15_1$. In response to this information, the client application, for a work request, then sends, as symbolized by dot-dashed lines 240, work requests to each of the servers, such as servers $115_{1-12}$, specified in the list and in a proportionate amount, of the total work to be placed, as specified by the corresponding weight for each of these servers. For a session request, the client application will simply send a session establishment request to just the single server identified to the application—rather than to one and often more servers that are to process a work request. Routing of all the session establishment requests to their corresponding identified servers, but for all twelve servers 115, is also symbolized by dot-dashed lines 240.

C. ILSS and SSRU Tables

FIG. 3 depicts System Capacity Utilization (ILSS) table 300. As discussed above, each system running in goal mode maintains its own ILSS table and, through its OS, communicates updates to that table to each of the other systems so as to maintain an exact current duplicate of that table at each of the other systems. Inasmuch as all the ILSS tables are identical in form, FIG. 3 shows one such table.

As shown, this table contains real-time measurement data, as measured by the workload manager, for capacity utilization, in terms of measured service unit sums, over each of three time intervals: 60, 120 and 180 seconds with corresponding measurement and percentage data in columns 310 and 320, 330 and 340; and 350 and 360. Measurement data is provided for eight importance levels (noted as 0–7), with numerically larger levels denoting increasingly less important work. Importance level 0, being reserved for system overhead tasks undertaken by the MVS OS, constitutes the most important work. No work requests can be assigned at this level to any system. Levels 1–5 are customer specifiable importance levels at which work can be dispatched according to the importance levels of the corresponding service classes associated with the underlying assigned work requests. Level 6 is a discretionary level and signifies work at a lower importance level than any of the customer specified levels. If any excess capacity remains for a system after all assigned work at all higher importance levels has been dispatched for execution on that system, that capacity is indicated in row 7 for "unused (available)" capacity. Work at this level is accorded the lowest dispatch importance level. Each entry in the service unit sum columns for any importance level is the sum, in measured service units, of service units consumed over the corresponding time period (e.g., 60, 120 or 180 seconds) by work at that importance level summed with service units consumed over the identical period by work at all lower importance levels (both discretionary and unused). As noted, this data is continually measured and reported by the workload manager. The percentage column indicates the percentage, in terms of total service units, of total capacity that is being consumed at any one and all lower importance levels during the corresponding period, truncated to a whole percentage. The data shown in table 300 is merely illustrative and, of course, will vary, sometimes widely, in real-time.

FIG. 4 depicts Sysplex Router Registered User (SSRU) table 400. This table, as noted, maintains a list of systems and their associated servers for the entire sysplex. This table contains columns 410, 420, 430 and 440. A separate entry exists for each set of the same application servers which resides on a different system. This table specifies, in column 410, a name of the set of servers (e.g., "ATM" or "NYC") resident on each system—this name can be a location name, if desired; in column 420, a system name (e.g., "SYS A" or "SYS B"); a logical unit (LU) identification for each system (e.g., "T5732A" or "T9723M"); and in column 440, a network identification for that system (e.g., "BANKING" or "ADMIN"). The server set name must be unique for each and every different set of servers. Though not specifically shown by the illustrative data in table 400, different sets of servers can reside on either a common system or different corresponding systems. The logical unit combined with the network identification, which are both specified by a customer, is unique for each and every system. As illustrated in table 400, a server set can have multiple instances. As each system is brought on-line, that system undergoes a registration process conducted by its MVS OS, which, appropriately updates its own SSRU table and sends messages to all the all other systems to update each of their own SSRU tables in order to account for the new system and all its resident servers. Accordingly, through registration, all the SSRU tables maintained on all the active servers are identical. Conversely, should a system be taken off-line, then, as a result of, e.g., non-responded status inquiries, the MVS OS on each of the other systems updates its own SSRU table to de-register, i.e., delete, the off-line system therefrom. While individual servers are not aware that any other server exists, through use of table 400 on each system, each MVS OS has knowledge of all the servers, by their set name, and the systems on which that set of servers resides. Through use of our invention, one of the sets of servers specified in table 400 is selected by the client application to receive work assignments with our invention then specifying the specific ratio of work requests sent to each of these servers in accordance with a corresponding dynamically determined weight. Since the only data of interest, for purposes of our present invention, is server name column 410, we will not discuss columns 420–440 any further.

D. Work Request Assignment

Our inventive work request assignment method categorizes systems and their resident servers into two classes: eligible and candidate, and assigns work requests for a client application first to various eligible systems and eligible servers thereon based on their current capacity to accept new work in a manner that meets business goals inherent in the policy; followed, if additional servers are requested by that application, to candidate systems and candidate servers thereon. Basically, as will be discussed in detail below, eligible systems are those goal-oriented systems running under a policy and for which current capacity information is known; candidate systems are those for which no current capacity information is known.

In essence, as we specifically teach, in response to a routing selection request from a client application, a list of appropriate systems is first fabricated. This list is populated first by selected eligible systems and then, if space remains in the list, by selected candidate systems. Those eligible systems selected for inclusion in the list are those then exhibiting a pre-defined minimum level of capacity utilization at a lowest business importance level. Weights are assigned to each of the eligible systems based on the actual capacity utilized at these lowest levels, over a pre-defined time interval, illustratively three minutes, with respect to total capacity utilized at that level across all eligible systems. A server weight for each of the eligible servers (that are part of a collection of common servers which supports the client application) on each eligible system is then calculated by dividing the weight for that eligible system by the number of active application servers thereon. In the event that the number of such servers exceeds the system weight thereby otherwise resulting in a fractional server weight, then the system weight is assigned to one of these servers on that eligible system; zero to all the others residing thereon. Thereafter, if candidate systems are to be selected, then weights are assigned to each candidate system and active candidate server thereon. If only candidate systems are to be selected, then the weight of each candidate system is set to one. Alternatively, if eligible servers are to be selected as well, then the weight of each candidate system is set as a minimum of the average and a median of all the system weights for all the eligible systems. In a similar fashion as with the eligible servers, the weight of each candidate server is calculated by dividing the candidate system weight by the number of candidate servers thereon. Here too any individual candidate server weight can not be fractional. Hence, in the event that the number of candidate servers exceeds the weight for the corresponding candidate system thereby resulting in a fractional server weight, then the system weight is assigned to one of these servers on that candidate system; zero to all the others residing thereon.

If non-zero weight eligible servers exist, then an output client server list is populated with identification of these servers (with their weights), in descending weight order, until either the client server list is full or the list of non-zero weight eligible servers is exhausted, whichever occurs first. In the latter case, identification of successive candidate servers (with their weights) are then written into this list in descending weight order, in order to fill the list if possible.

However, if the eligible servers are only those with zero weights—i.e., those eligible servers with relatively little capacity, then each of these eligible servers are successively assigned a common weight of one and selected in seriatim until the identifications of all these servers (including their weights) have been written into the client server list. An improvement here may be to rotate servers around different systems before the same system is selected again for a different server. In any event, owing to their apparent inability to handle more than a small number, if any, of additional work requests, hence none of these servers is now particularly favored for new work. Thereafter, if any candidate servers are to be selected, each of these servers are successively assigned a weight of one and selected, again in seriatim, until all the candidate servers are selected or the client server list becomes full, whichever occurs first. In view of a lack of capacity information, none of these candidate servers is particularly favored as well.

As a result of our inventive work request assignment method, a list of servers and their corresponding server weights is identified to the client application which, in turn, will directly route a portion of the total work requests thereat to each of these servers in proportion to its weight.

Figure 5:
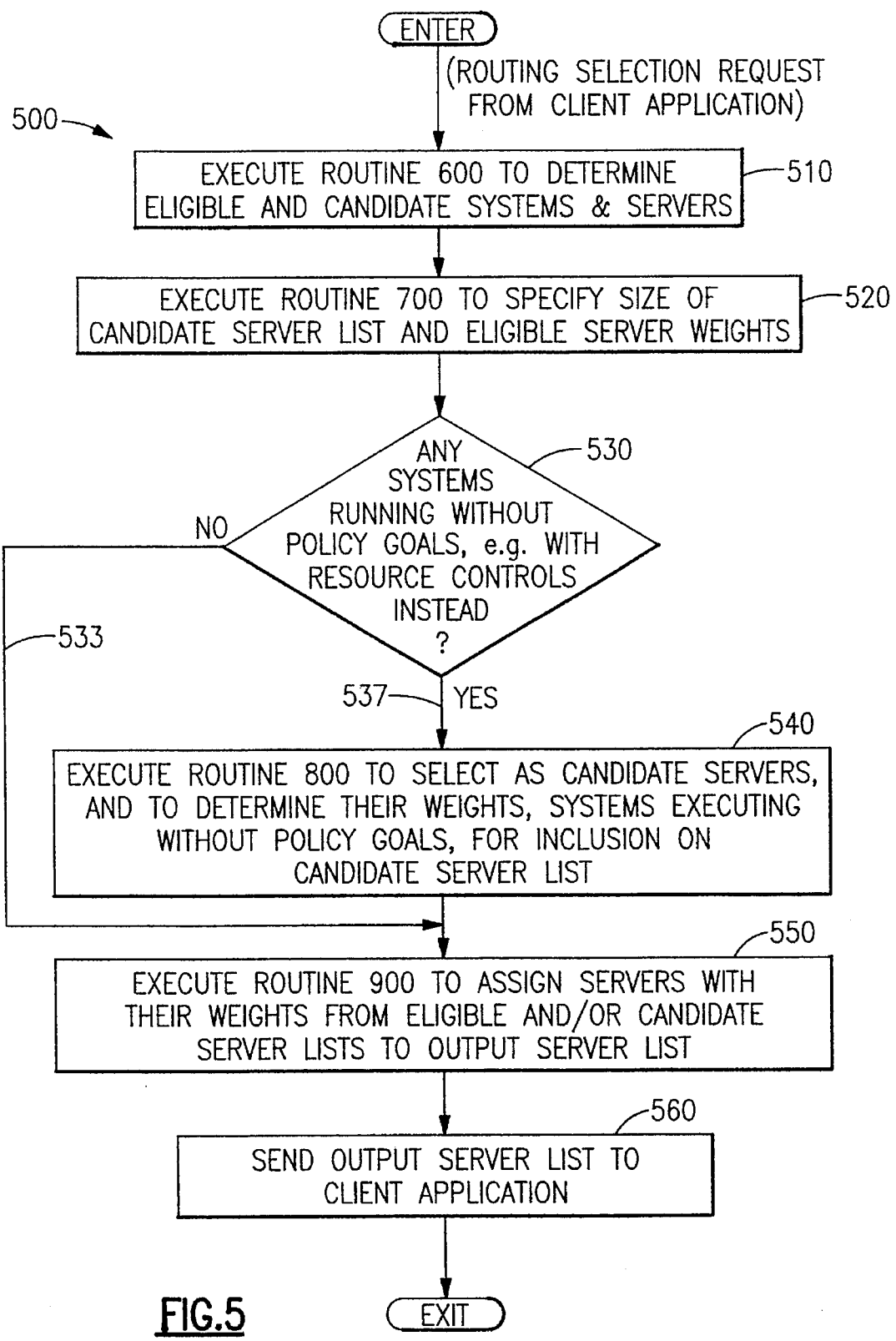
FIG. 5 depicts a high level flowchart of Output Server List Determination routine 500 which embodies our present invention for assigning and balancing new work requests throughout the sysplex.

With the above overview in mind, FIG. 5 depicts a high level flowchart of Output Server List Determination routine 500 which embodies our present invention for assigning and balancing new work requests throughout the sysplex. As noted above, routine 500, as well as subservient called routines 600–900, all execute as part of the Workload Manager in the routing node—which for purposes of illustration is system $110_E$ shown in FIGS. 1 and 2A–2B.

Routine 500, as shown in FIG. 5, is entered upon receipt of a routing selection request originating from a client application. Upon entry into this routine, execution proceeds to block 510 which executes routine 600 to determine two sets of servers: a set of "eligible" servers, and a set of "candidate" servers from all the sets of servers then registered in the SSRU tables. These sets of servers are also specified in terms of the corresponding systems on which each one of these sets reside. Eligible servers are defined as those which are running under a policy, i.e., goal oriented servers, and for which importance-based capacity (ILSS) information is available. Candidate servers include those for which capacity information is not available, e.g., servers that either are not running under a goal-oriented policy, or are goal-oriented but for which capacity information is not currently available. Servers that do not run under a goal-oriented policy instead utilize some type of resource controls and hence a different customer-defined metric, typically unrelated to underlying business importance, for dispatching assigned work, e.g., such as illustratively maximizing use of available processing cycles, dispatch priority time and storage targets. As will be seen, our inventive process can assign work requests across both types of servers.

Once routine 600 has executed to select the eligible and candidate servers and systems, execution proceeds to block 520 which, when entered, executes routine 700. Routine 700 specifies the maximum number of servers that can be selected from either of two server lists (eligible and candidate) and subsequently provided to the client application, and determines the weights for each of the eligible servers. Thereafter, execution proceeds to decision block 530 which determines whether any of the systems specified by routine 600 is running without goals. If no such non-goal oriented system then exists, then execution merely proceeds, via NO path 533, to block 550. Alternatively, if such a non-goal oriented system exists, then decision block 530 routes execution, via YES path 537, to block 540. This latter block executes routine 800 to set the weights of the "candidate" servers, i.e., the servers on the group of candidate systems specified by block 510. Candidate systems are those for which no capacity information is currently known. Two types of candidate systems exist. To easily distinguish between the two types of candidate systems and their servers: i.e., those systems which run under a policy but which lack current capacity information from those systems that are non-goal oriented and clearly provide no capacity information, we will refer to the latter type of candidate systems simply as "black box" systems and their resident servers as "black box" servers—hence, from policy and capacity perspectives, neither a policy nor capacity information exists for "black box" systems and servers. Routine 800 handles all the candidate servers including the "black box" systems and their "black box" servers. Once routine 800 fully executes, execution exits from block 540 and passes to block 550.

Block 550, when executed, invokes routine 900, to assign servers, either the eligible or candidate servers depending on the results of routines 700 and 800, and their corresponding weights to an output server list. The size of this list is specified by the particular client application that is requesting work. Once this list is formulated, execution proceeds to block 560 which sends this list back through the network to the client application. Once this occurs, execution exits from routine 500. The client application then sends a proportionate share of its current work through the network directly to the servers specified in the output list with the proportion given by the weight for each of these servers.

Figure 6A:
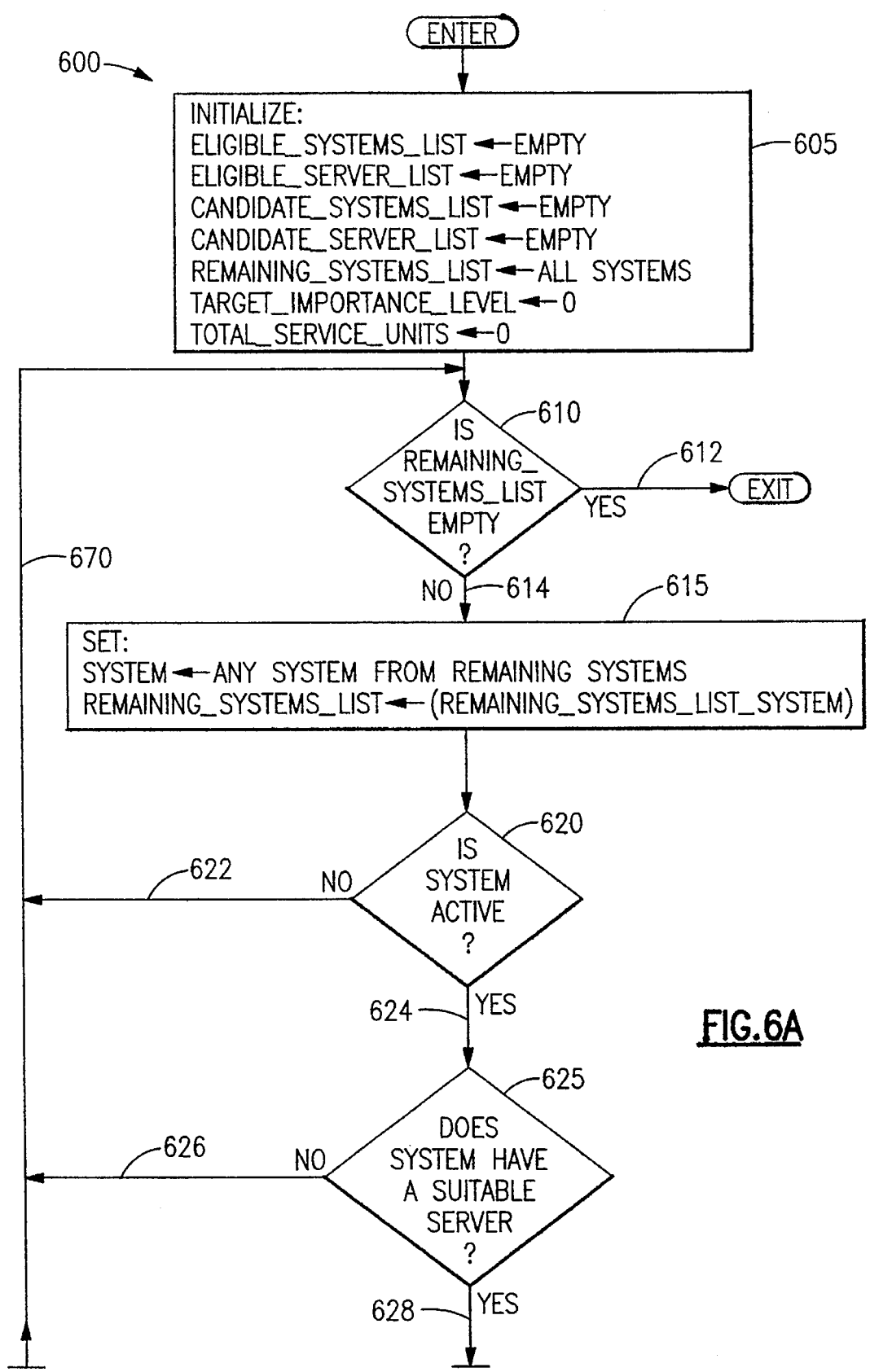
Figures 6, 6C:
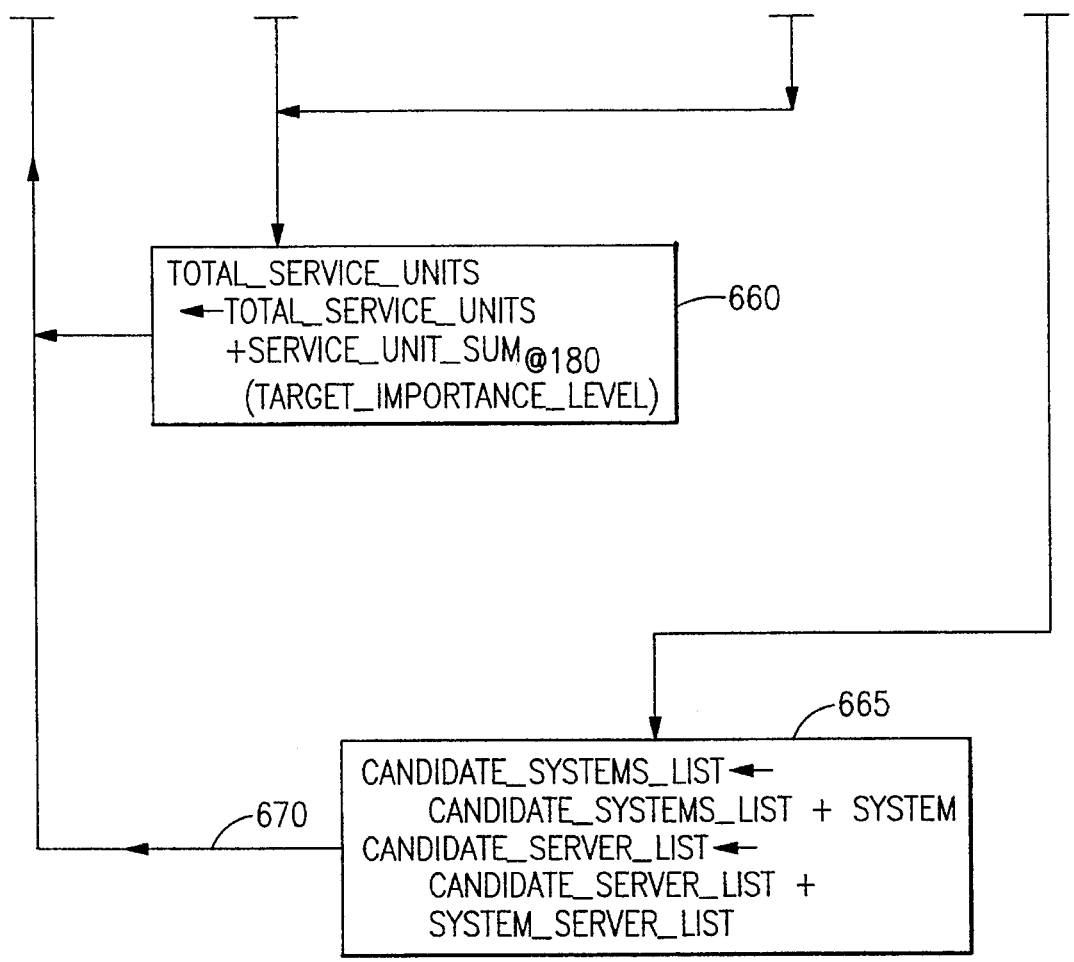

FIGS. 6A–6C collectively depict a high level flowchart of Eligible and Candidate Systems and Servers Determination routine 600; the correct alignment of the drawing sheets for these figures is shown in FIG. 6. As noted above, routine 600 determines a set of "eligible" and a set of "candidate" servers, and corresponding systems, to which work is to be assigned.

Upon entry into routine 600, execution first proceeds to block 605 which initializes various variables. In that regard, a list of eligible systems, i.e., ELIGIBLE_SYSTEMS_LIST, and a list of eligible servers, i.e., ELIGIBLE_SERVER_LIST, are both set to empty. Similarly, a list of candidate systems, i.e., CANDIDATE_SYSTEMS_LIST, and a list of candidate servers, i.e., CANDIDATE_SERVER_LIST, are also both set to empty. A list of remaining systems, i.e., REMAINING_SYSTEMS_LIST, is filled with all the systems, by name. A variable for target importance level, i.e., TARGET_IMPORTANCE level, is set to zero (the highest importance level). Lastly, a variable for total service units, i.e., TOTAL_SERVICE_UNITS, is also set to zero. Once this initialization has completed, execution proceeds to decision block 610. This decision block determines, by ascertaining whether the REMAIN- ING_SYSTEMS list is empty, whether all the systems have been processed. If all the systems registered in the SRRU table have been processed, then execution simply exits, via YES path 612, from routine 600 and then returns to routine 500.

Alternatively, if any system remains to be processed, i.e., the list of REMAINING_SYSTEMS, i.e., variable REMAINING_SYSTEMS_LIST, is not empty, then decision block 610 routes execution, via NO path 614, to block 615. This latter block, when executed, sets variable SYSTEM to designate the next successive system, i.e., the "current" system, to be processed in REMAINING_SYSTEMS_LIST. Thereafter, block 615 removes the system now designated by variable SYSTEM from REMAINING_SYSTEMS_LIST. Once this occurs, execution proceeds to decision block 620 which tests whether the current system is active. If this system is not active, execution loops back, via NO path 622 and path 670, to block 610 to again determine whether all the systems have been processed and so on. Alternatively, if the current system is active, then decision block 620 routes execution, via its YES path 624, to decision block 625. This decision block determines whether the current system has an suitable server, i.e., whether a functioning application server resides on that system. If the designated system does not have a suitable server, then that system is no longer considered. Hence, then decision block 625 routes execution, via its NO path 626 and path 670, back to decision block 610 to again determine whether all the systems have been processed and so on. Alternatively, if the designated system is home to a suitable server, then execution proceeds, via YES path 628 emanating from decision block 625, to decision block 630. This latter block determines whether capacity information (an associated ILSS table) exists for this particular system. If such capacity information does not exist, then decision block 630 routes execution, via its NO path 632, to block 665. All such goal-oriented systems for which capacity information is missing as well as the "black box" systems, which are non-goal oriented and hence provide no such information, are all collectively classified by routine 600 as candidate systems, with their resident servers being classified as candidate servers. Hence, block 665, when executed, merely adds the current system, whether it is a "black box" system or not, to the list of candidate systems, i.e., CANDIDATE_SYSTEMS_LIST, and adds all the servers resident thereon, by server set name (stored in SYSTEM_SERVER_LIST and originally accessible through the SRRU table), to the list of candidate servers, i.e., CANDIDATE_SERVER_LIST. Should capacity information become available later, then, through subsequent execution of routine 600 at that time, specifically decision block 630, this particular system and its set of resident servers will not then be categorized as a candidate system and candidate servers, respectively. Alternatively, if capacity information is currently available for the current system, then decision block 630 routes execution, via its YES path 634, to decision block 635.

Decision block 635 ascertains, based on current system capacity as shown in the ILSS table for the current system, whether that particular system has had at least 5% available capacity at the target importance level for the last three minutes, i.e., whether $ILSS\_\%_{180} \geq 5$ at TARGET_IMPORTANCE_LEVEL? If such capacity is not available, then that system is viewed as having insufficient capacity and thus is not a better choice than any other system previously chosen, through the current execution of routine 600, that had such capacity available. Consequently, for that current system that does not have such capacity, that system is effectively ignored. Specifically, decision block 635 routes execution, via its NO path 636 and path 670, back to decision block 610 to again determine whether all the systems have been processed and so on. The target importance level is initially set to the highest importance level, i.e., zero, and, as will be shortly seen, is then lowered accordingly. At the highest importance level, 5% capacity is always available. In the event the current system has at least 5% available capacity at the target importance level, then decision block 635 routes execution, via its YES path 638, to block 640. This latter block sets a variable CURRENT_LEVEL equal to the highest numerical importance level (lowest level in terms of actual business importance) for the current system at which available capacity exists that equals or exceeds 5% For example for the $ILSS\_\%_{180}$ data in table 300 shown in FIG. 3, this lowest level occurs at numerical level 5.

Returning to FIGS. 6A–6C, once the CURRENT_LEVEL variable is set, then execution proceeds from block 640 to decision block 645. This latter block determines whether the value of CURRENT_LEVEL is greater numerically than the value of TARGET_IMPORTANCE_LEVEL, i.e., whether the current system has available capacity at a lower importance level than a previous system choice, in essence whether a "better" server has now been found. If the current system is no better in terms of importance level at which the 5% available capacity exists, i.e., CURRENT_LEVEL is not numerically greater than TARGET_IMPORTANCE_LEVEL, then decision block 645 routes execution, via its NO path 648, to block 655. This latter block, when executed, merely adds the current system to the list of eligible systems, i.e., ELIGIBLE_SYSTEMS_LIST, and adds the set of servers thereon, by name, to the list of eligible servers, i.e., to ELIGIBLE_SERVER_LIST. Execution then proceeds to block 660. Alternatively, if the current system is indeed "better" than a previous system choice, i.e., it has sufficient available capacity at a lower business importance level (greater numerically), then decision block 645 routes execution, via its YES path 646, to block 650. This latter block, when executed, effectively selects the current system as the basis of comparison vis-à-vis other systems by: substituting the current system for all the systems previously included on the eligible systems list—effectively resetting this list; substituting the set of servers, by name, on the current system for those on the eligible server list—effectively resetting this list as well; and setting the target importance level equal to the CURRENT_LEVEL for the current system. In addition, block 650 sets a variable, that maintains a running total of the service units (TOTAL_SERVICE_UNITS) at the value of CURRENT_LEVEL, to zero. The value of this variable is subsequently used, as discussed below, in routine 700 shown in FIGS. 7A–7C, to calculate server weights. Once block 650 has fully executed, execution proceeds to block 660. Block 660 when executed, accumulates the total service units, i.e., the value of TOTAL_SERVICE_UNITS, consumed by the current system by adding the service units consumed thereby during the prior 180 second time period by work occurring at the target and all lower (numerically greater) business importance levels. Once block 660 has executed, execution loops back, via path 670, to decision block 610 to again determine whether all the systems have been processed and so on.

Once routine 600 completes processing, what remains is two lists of servers: a list of eligible servers, i.e., policy related servers for which capacity information is available, and a list of all candidate servers—the former list possessing available requisite capacity at the lowest business importance level, the latter list being servers, whether goal-oriented or not (i.e., running under a policy or being "black box") but for which no capacity information is available. Routine 700 is then executed, as noted above, to set a maximum limit on the number of servers that can be selected from either of the server lists and subsequently provided to the client application, and to determine the weights for the eligible servers.

Figure 7A:
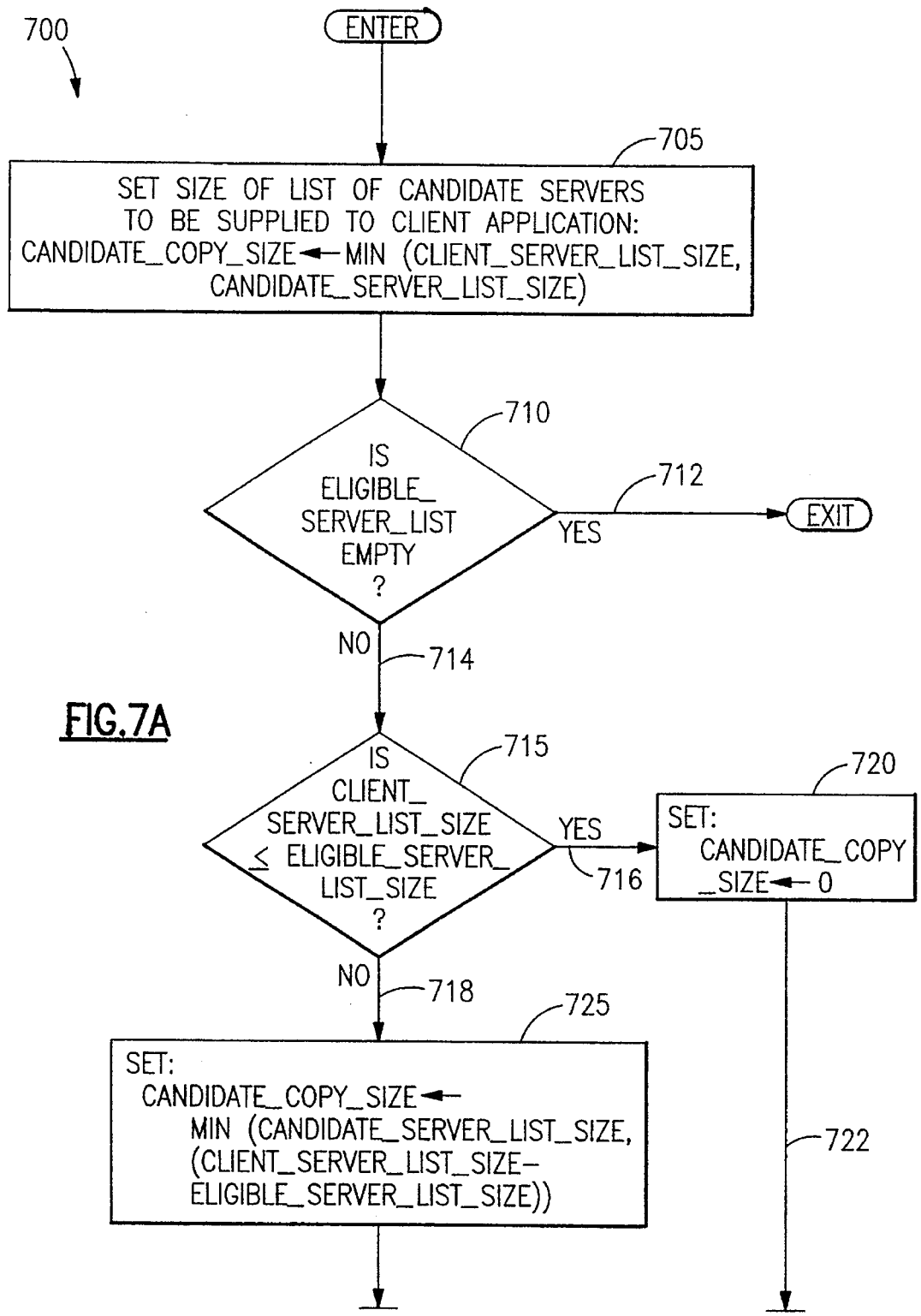
Figure 7B:
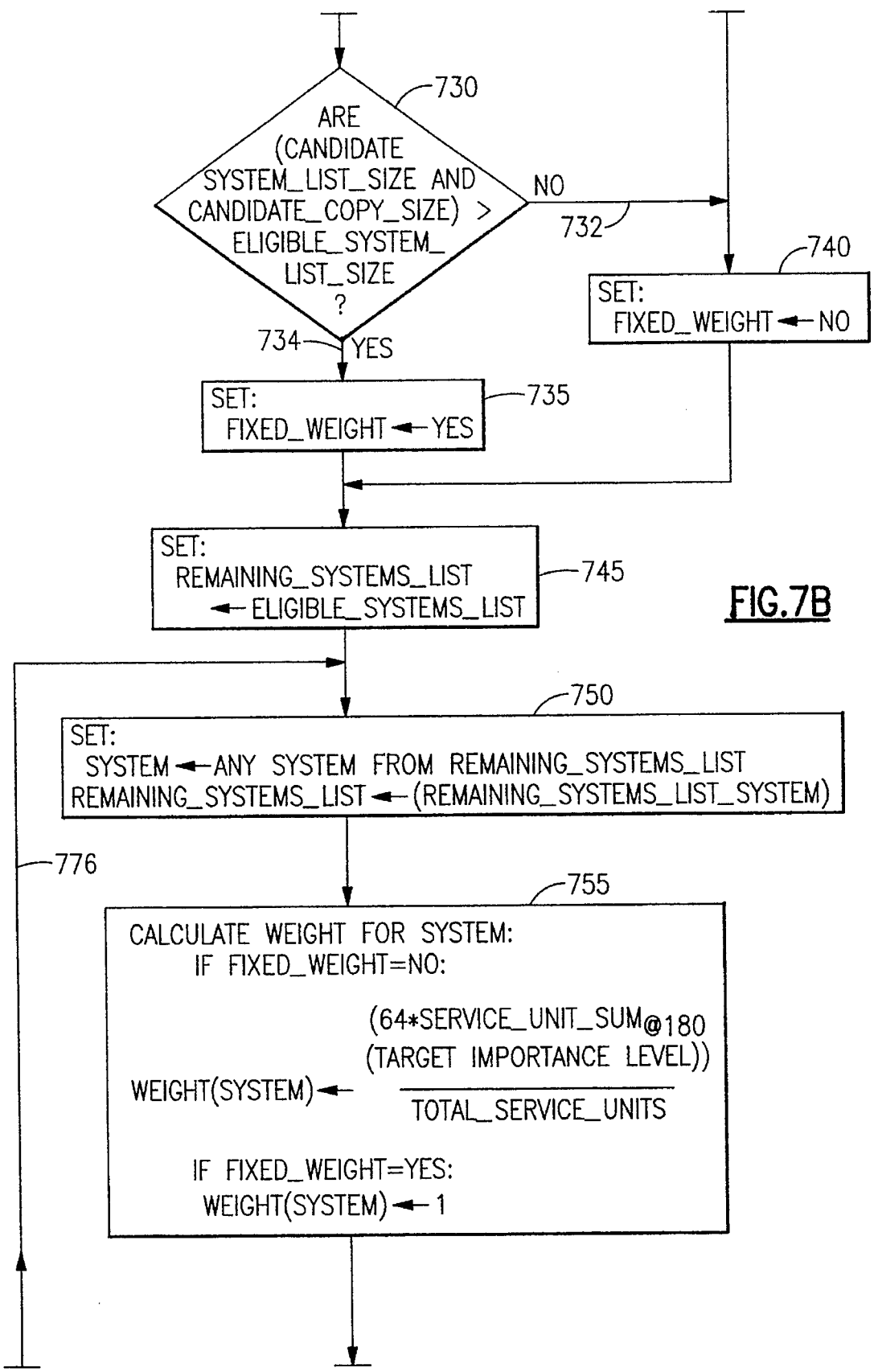

FIGS. 7A–7C collectively depict a high level flowchart of Eligible Server List and Weight Determination routine 700; the correct alignment of the drawing sheets for these figures is shown in FIG. 7.

Upon entry into routine 700, execution first proceeds to blocks 705–725 which collectively specify the maximum number of servers that can be selected from the candidate server list and subsequently provided to the client application. Specifically, execution first proceeds to block 705 which, when executed, sets the size of a list of output servers to be provided, by our inventive process, to the client application. This size (variable CANDIDATE_COPY_SIZE) is taken to be a minimum of the size, as specified by the client application itself in its work request, of its server list, i.e., variable CLIENT_SERVER_LIST_SIZE, or the size of the candidate server list itself, i.e., variable CANDIDATE_SERVER_LIST SIZE. Thereafter, decision block 710 determines whether the eligible server list contains any servers. If not, then the only servers that can be selected are those in the candidate server list. Accordingly, if no eligible servers exist, i.e., ELIGIBLE_SERVER_LIST is empty, then execution exits, via YES path 712, from routine 700. Alternatively, if eligible servers do exist, then decision block 710 directs execution, via NO path 714, to decision block 715. This latter decision block, when executed, ascertains whether more servers exist in the eligible server list than are requested by the client, i.e., whether CLIENT_SERVER_LIST_SIZE≧ELIGIBLE_SERVER_LIST_SIZE? If this is true, then only eligible servers and no candidate servers will be placed in the client server list. In this case, decision block 715 will route execution, via YES path 716, to block 720 which, when executed, will set the number of servers, specified in variable CANDIDATE_COPY_SIZE, to be selected from the candidate server list to zero. Alternatively, if an insufficient number of servers exists in the eligible server list to satisfy the requirements of the client application, thereby requiring some or all of the servers to be selected from the candidate server list, decision block 715 will route execution, via NO path 718, to block 725. This latter block, when executed, will set the number of servers to be selected from the candidate server list, i.e., as specified in variable CANDIDATE_COPY_SIZE, as the minimum of either the size of the candidate server list itself, i.e., as specified in variable CANDIDATE_SERVER_LIST_SIZE, or the remaining number of servers requested by the client application after all the eligible servers have been selected, i.e., CLIENT_SERVER_LIST_SIZE - ELIGIBLE_SERVER_LIST_SIZE. Once block 725 has executed, then execution proceeds to decision block 730.

Blocks 730–775 collectively determine the weights for each of the eligible servers. Decision block 730 determines, based upon the number and type (candidate vis-à-vis eligible) of the presently available servers, whether a relatively large number of candidate, presumably black box servers, would be provided, i.e., servers for which no capacity information is currently known. If this is the case and particularly if less than half of these collectively available systems have eligible servers, then to avoid taking undue risks in assigning work to all these servers, equal weights of one are set for all the servers that will be returned, from both server lists, to the client application. Alternatively, if more than half of these collective systems have eligible servers, i.e., for which capacity information is available, then, with relatively little risk, the weights assigned to the eligible servers can be extended, as discussed below, to the candidate servers that will be returned to the client application. Accordingly, if more than half of the collective systems have candidate servers, then decision block 730 directs execution via its YES path 734, to block 735 which sets a flag, FIXED_WEIGHT, which signifies that fixed weights are to be assigned to the candidate servers, to YES. Alternatively, if more than half of the collective systems have eligible servers, then, decision block 730 routes execution, via its NO path 732, to block 740 which, when executed, sets the FIXED_WEIGHT flag to NO; hence, variable weights are subsequently set. Once this flag has been duly set by either block 735 or 740, execution proceeds to block 745.

Block 745, when executed, initializes the list variable REMAINING_SYSTEMS_LIST to all the systems specified in the eligible system list, i.e., in ELIGIBLE_SYSTEMS_LIST. Once this occurs, then a loop is iterated through blocks 750–775 for each of the eligible systems, i.e., goal-oriented systems for which capacity information exists, to set the weight of all the servers on that system.

In particular, block 750 selects the next successive system specified in the REMAINING_SYSTEMS list and sets variable SYSTEM to specify that selection. Once block 750 has executed, execution proceeds to block 755 which calculates, in an implementationally specific manner, the weight for the currently selected system, i.e., for SYSTEM. In particular, if fixed weights are to be used, then this system weight, WEIGHT(SYSTEM), is set to illustratively one. Otherwise, for variable weights, i.e., if FIXED_WEIGHT equals NO, the weight is determined based upon the capacity utilized at that system over, e.g., a three minute period at the target importance level, i.e., SERVICE_UNITS_SUM$_{@180}$ (TARGET IMPORTANCE LEVEL), in relation to the total utilized capacity, i.e., TOTAL_SERVICE_UNITS, for that importance level and for systems that have capacity information over that interval. The target importance level and the totalized service units, i.e., TOTAL_SERVICE_UNITS, are provided through the immediately prior execution of routine 600, specifically blocks 640–660 shown in FIGS. 6A–6C and which were discussed in detail above. Once the system weight is appropriately calculated or set by block 755, as shown in FIGS. 7A–7C, execution proceeds to decision block 760. Blocks 760–770 address a peculiarity in the sense that a weight for an individual system can not be returned that is less than one. Hence, decision block 760 tests whether the number of eligible servers on the currently selected system is less than or equal to the weight for this system, i.e., WEIGHT(SYSTEM). If the number of eligible servers on this system is less than the weight, then the weight of each such eligible server on this system is simply calculated as the system weight divided by the number of eligible servers on this system, else the entire system weight is assigned to only one of these particular servers and the other eligible servers are dropped. Specifically, if the number of eligible servers equals or is less than the system weight, then decision block 760 routes execution, via YES path 764, to block 765. This latter block, when executed, sets the weight of each of the eligible servers on the currently selected system to the system weight divided by the number of these servers. Thereafter, execution proceeds to decision block 775. Alternatively, if the number of eligible servers exceeds the system weight, then decision block 760 routes execution, via NO path 762, to block 770. This latter block, when executed, chooses any one of the eligible servers resident on the currently selected system, i.e., on SYSTEM, and writes the identification of that server into variable CHOSEN_SERVER. The actual server and the manner of choosing this server are both not critical, either simply the first server in the eligible server list can be chosen or a random selection can be made. Once this server is selected, by whatever method is used to select it, all servers on that system except the chosen server are removed from the eligible server list. Thereafter, the entire system weight for the currently selected system, i.e., WEIGHT(SYSTEM), is assigned to this single chosen server, i.e., as WEIGHT(CHOSEN_SERVER). All other servers for that system are discarded; hence, these servers are simply dropped and thus their existence is not communicated back to the client application. Execution then proceeds to decision block 775 which, when executed, determines whether any other system remains in the REMAINING_SYSTEMS_LIST to be processed. If so, execution loops back, via NO path 776, to block 750 to select the next system in succession and so on. Alternatively, if no further systems remain, i.e., REMAINING_SYSTEMS_LIST is now empty, then execution exits, via YES path 778, from routine 700.

Figure 8B:
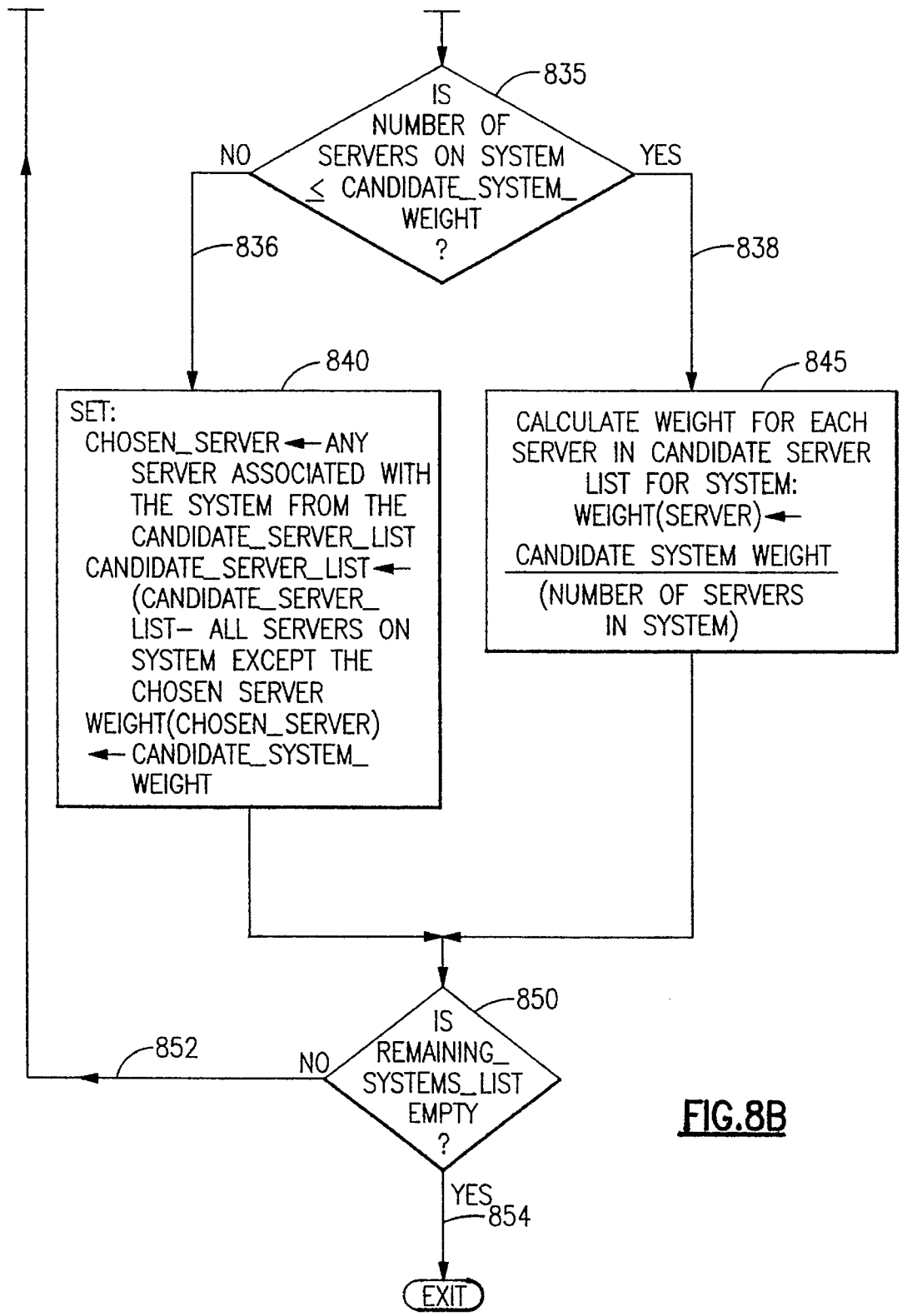

FIGS. 8A and 8B collectively depict a high level flowchart of Selection of Candidate Servers and Weights Determination routine 800; the correct alignment of the drawing sheets for these figures is shown in FIG. 8. Routine 800, as noted above, sets the weight for each of the candidate servers.

In particular, upon entry into routine 800, execution first proceeds to decision block 805. This block determines whether any candidate servers are to be considered at all, i.e., whether CANDIDATE_COPY_SIZE equals zero. If the variable CANDIDATE_COPY_SIZE equals zero, then only eligible servers are to be provided to the client application. In this case, execution simply exits, via YES path 806, from routine 800. Alternatively, if an identification of one or more candidate servers is to be provided to the client application, i.e., CANDIDATE_COPY_SIZE is not equal to zero, then decision block 805 routes execution, via its NO path 808, to decision block 810. This latter decision block determines whether the eligible server list is empty, i.e., whether only candidate servers—servers without current capacity utilization information—are to be identified to the client application. If this list is empty, then, execution proceeds, via YES path 812, to block 820 which sets weight, CANDIDATE_SYSTEM_WEIGHT, of each of the previously selected candidate systems to one in a round-robin fashion. Execution then proceeds to block 825. Alternatively, if the eligible server list contains at least one server, then execution proceeds, via NO path 814, to block 815. This latter block, when executes, sets the weight of each of the candidate systems, i.e., CANDIDATE_SYSTEM_WEIGHT, as the lesser of the average and a median of the weights for all the eligible systems. Accordingly, each candidate system will be assigned an amount of work equal to the average and a median, whichever is less, of that handled by the current eligible systems. Once block 815 has executed, execution proceeds to block 825. This latter block, when executed, initializes the list variable REMAINING_SYSTEMS_LIST to all the systems specified in the candidate system list, i.e., in CANDIDATE_SYSTEMS_LIST.

Thereafter, execution proceeds to a loop formed of blocks 830–850 which is iterated for each of the candidate systems, i.e., systems (including the "black box" servers) for which no capacity information is known, to set the weight of the candidate servers. This loop is quite similar to a loop formed of blocks 750–775 shown in FIGS. 7A–7C.

In particular, block 830, as shown in FIGS. 8A and 8B, selects the next successive system specified in the REMAINING_SYSTEMS list and sets variable SYSTEM to specify that selection. Thereafter, this particular system is deleted from the remaining systems list, i.e., REMAINING_SYSTEMS_LIST. Once block 830 has executed, execution proceeds to block 835. Blocks 835–845 also address the same peculiarity, as with blocks 760–775 shown in FIGS. 7A–7C, that a weight for an individual server can not be returned that is less than one. Hence, decision block 835, shown in FIGS. 8A and 8B, tests whether the number of candidate servers on the currently selected system is less than or equal to the weight for this system, i.e., CANDIDATE_SYSTEM_WEIGHT. If the number of candidate servers on this system is less than this weight, then the weight of each such candidate server on this system is simply calculated as the system weight divided by the number of candidate servers on this system, else the entire system weight is assigned to only one of these particular servers and the other candidate servers are dropped. Specifically, if the number of candidate servers equals or is less than the system weight, then decision block 835 routes execution, via YES path 838, to block 845. This latter block, when executed, sets the weight of each of the candidate servers, WEIGHT(SERVER), on the currently selected candidate system to the system weight divided by the number of these servers. Thereafter, execution proceeds to decision block 850. Alternatively, if the number of candidate servers exceeds the system weight, then decision block 835 routes execution, via NO path 836, to block 840. This latter block, when executed, chooses any one of the candidate servers resident on the currently selected system, i.e., on SYSTEM, and writes the identification of that server into variable CHOSEN_SERVER. Here too, the actual server and the manner of choosing this server are both not critical, either simply the first server in the candidate server list can be chosen or a random selection can be made. Once this server is selected, by whatever method is used to select it, all servers on that system except the chosen server are removed from the candidate server list. Thereafter, the entire system weight for the currently selected system, i.e., CANDIDATE_SYSTEM_ WEIGHT, is assigned to this single chosen server, i.e., as WEIGHT(CHOSEN_SERVER). All other candidate servers on this system are discarded; hence, their existence is not communicated back to the client application. Execution then proceeds to decision block 850 which, when executed, determines whether any other system remains in the remaining systems list, i.e., REMAINING_SYSTEMS_LIST, to be processed. If so, execution loops back, via NO path 852, to block 830 to select the next system in succession and so on. Alternatively, if no further systems remain, i.e., REMAINING_SYSTEMS_LIST is now empty, then execution exits, via YES path 854, from routine 800. Execution then returns to routine 500, as shown in FIG. 5.

Figure 9B:
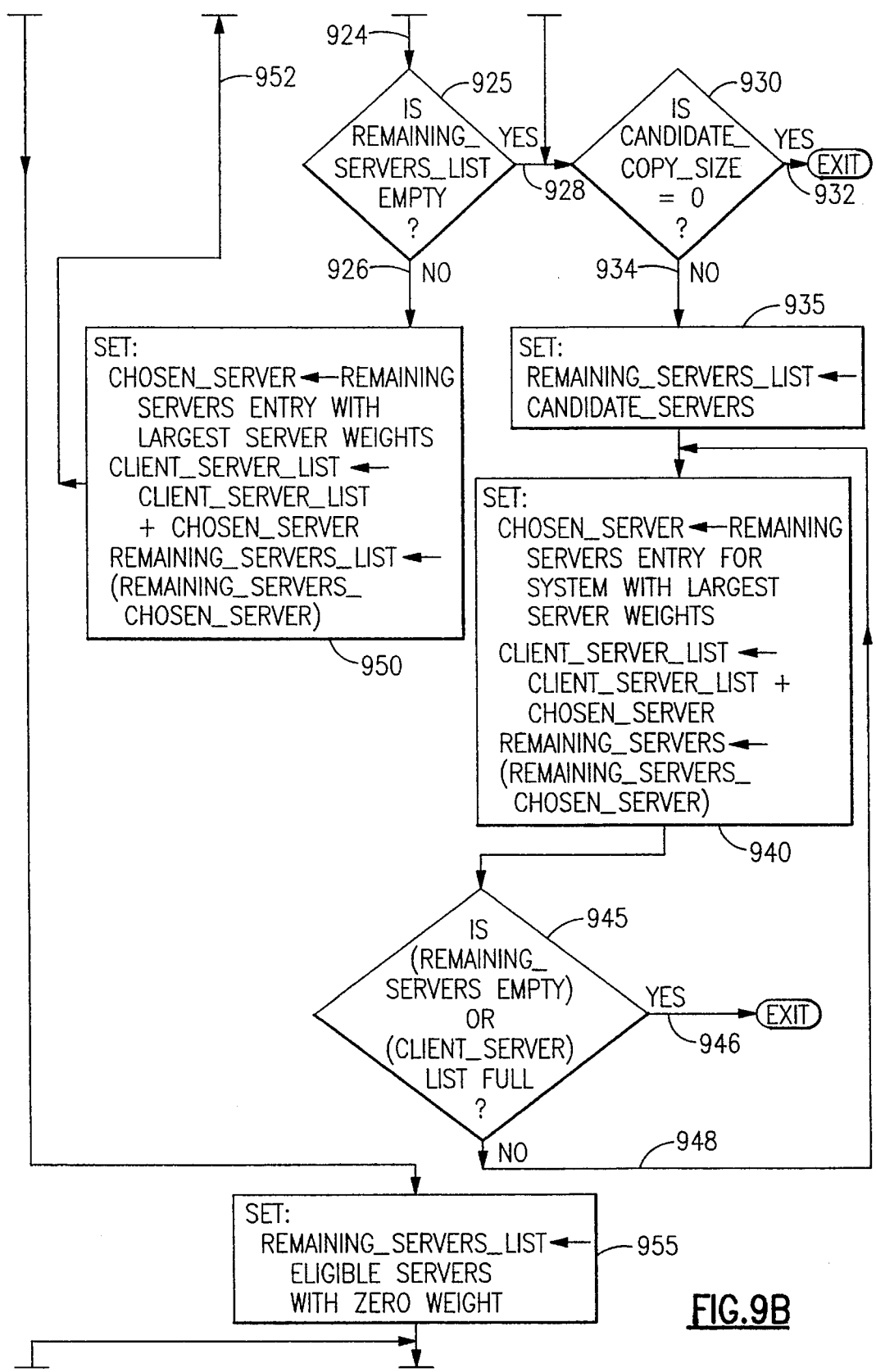
Figure 9C:
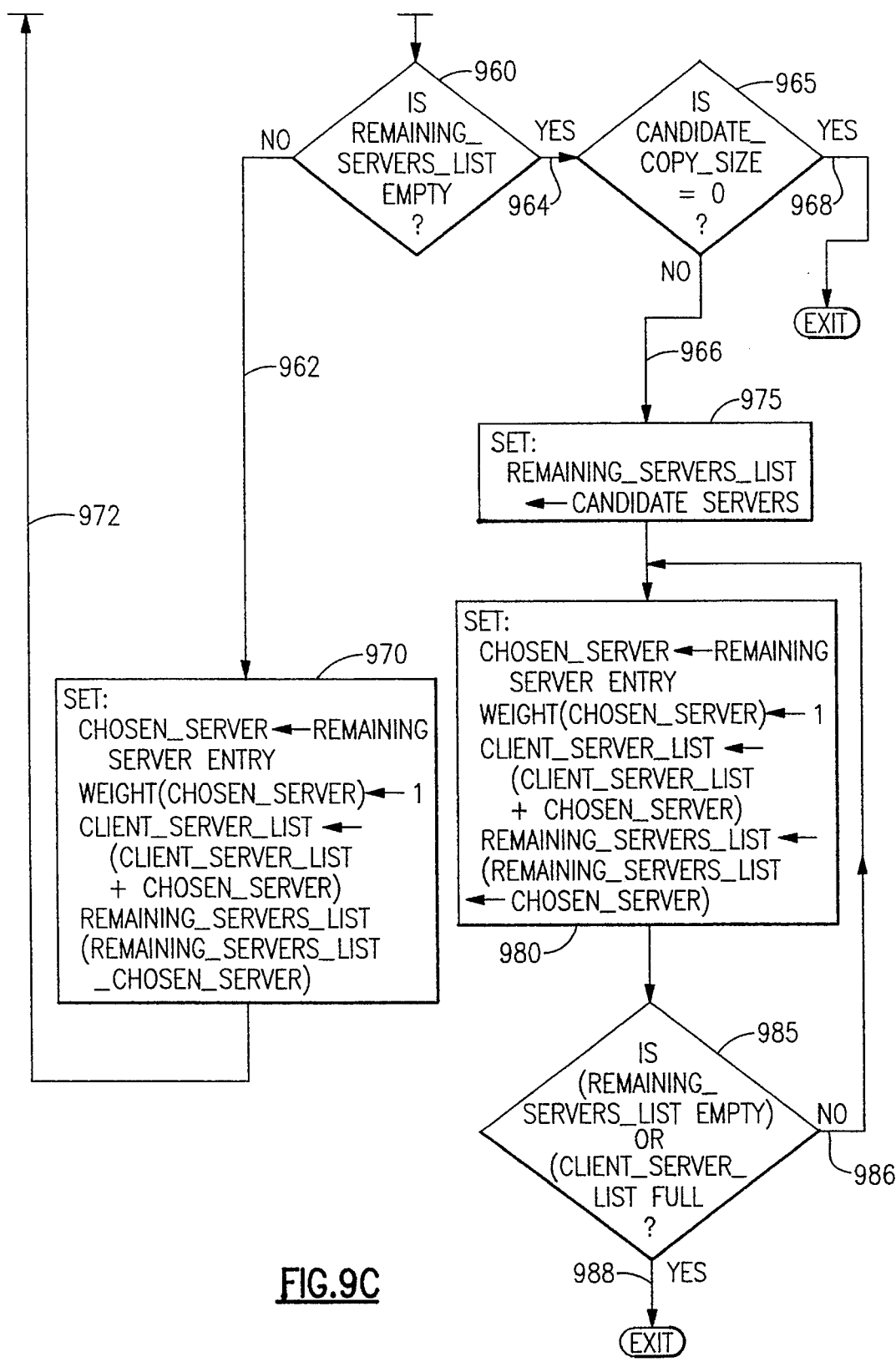

FIGS. 9A–9C collectively depict a high level flowchart of Server Assignment routine 900 which is next executed by routine 500; the correct alignment of the drawing sheets for FIGS. 9A–9C is shown in FIG. 9. As noted above, routine 900 assigns servers, either the eligible or candidate servers depending on the results of routines 700 and 800, and their weights to an output server list. The size of this list is specified by the particular client application that is requesting work. Once this list is formulated, this list is thereafter sent by routine 500 back through the network to the client application.

Specifically, upon entry into routine 900, execution first proceeds to decision block 905 which determines whether the eligible server list, i.e., ELIGIBLE_SERVER_LIST, is empty. In the event the eligible server list is empty, then decision block 905 routes execution, via its YES path 906, to decision block 930. Decision block 930 tests whether any candidate servers are to be selected, i.e., whether the current value of CANDIDATE_COPY_SIZE equals zero. If this value is zero, i.e., no candidate servers are to be chosen, then execution merely exits, via YES path 932, from routine 900. If, however, one or more candidate servers are to be selected from the candidate server list, then decision block 930 routes execution, via its NO path 934, to block 935. This latter block, when executed, sets the list variable REMAINING_SERVERS_LIST to a list of all the candidate servers. Thereafter, a loop formed of blocks 940 and 945 simply takes servers, in succession in descending weight order, from REMAINING_SERVERS_LIST and places them in a client server list, i.e., CLIENT_SERVER_LIST, until the latter list is full or all the candidate servers in the candidate server list are selected, whichever occurs first. Specifically, block 940, when executed, chooses the candidate server having the numerically largest weight in the REMAINING_SERVERS_LIST and writes the identification of that server into variable CHOSEN_SERVER. Once this server is selected that particular server is placed into the CLIENT_SERVER_LIST and also removed from the REMAINING_SERVERS_LIST. Execution then proceeds to decision block 945 which, when executed, determines whether any other servers remains in the REMAINING_SERVERS_LIST to be processed. If so, execution loops back, via NO path 948, to block 940 to choose the candidate server with the largest weight from those then remaining in the REMAINING_SERVERS_LIST and so on. Alternatively, a server can be chosen from the system having the largest weight. Once the CLIENT_SERVER_LIST is full or all the candidate servers have been chosen, i.e., REMAINING_SERVERS_LIST becomes empty, whichever occurs first, execution exits from routine 900, via YES path 946 emanating from decision block 945.

Alternatively, if the eligible server list is not empty, then decision block 905 routes execution, via NO path 908, to block 910. This latter block, when executed, sets the list variable REMAINING_SERVERS_LIST to a list of all the eligible servers with a non-zero weight, i.e., available servers with enough capacity to be significant. Thereafter, execution proceeds to decision block 915 which, when executed, ascertains whether REMAINING_SERVERS_LIST is empty, i.e., there are no eligible servers with a non-zero weight; hence, no eligible servers exist that have current capacity information. If REMAINING_SERVERS_LIST is not empty, then decision block 915 routes execution, via its NO path 918, to decision block 920.

At this point, a loop containing blocks 920, 925 and 950 is repeatedly executed to insert eligible server identifications (including weights) into the client server list until that list is full or the eligible server list is exhausted, whichever occurs first. Specifically decision block 920, when executed, determines whether the client server list, i.e., CLIENT_SERVER_LIST, is full. If so, all the servers requested by the client application have been specified; no further servers can then be accommodated in that list. In this case, execution exits from routine 900, via YES path 922 emanating from decision block 920.

Alternatively, if the client server list is not yet full, decision block 920 routes execution, via NO path 924, to decision block 925. This latter decision block determines whether the REMAINING_SERVERS_LIST, most recently set to the current list of eligible servers, is now empty, i.e., the entire list of eligible servers has been written into the client server list. If REMAINING_SERVERS_LIST is now empty, then decision block 925 routes execution, via YES path 928, to decision block 930 to determine whether any servers in the candidate server list is to be included in the client server list and, if so, to proceed accordingly or, if not, for execution to exit from routine 900. Alternatively, if REMAINING_SERVERS_LIST is not empty, meaning that eligible servers still exist therein, then decision block 925 routes execution, via NO path 926, to block 950. This latter block, when executed, chooses the eligible server having the numerically largest weight in the REMAINING_SERVERS_LIST and writes the identification of that server into variable CHOSEN_SERVER. Once this server is selected that particular server is placed into the CLIENT_SERVER_LIST and also removed from the REMAINING_SERVERS_LIST. Execution then loops back, via path 952, to decision block 920 to determine whether the client server list is full and so on.

However, in the event that the REMAINING_SERVERS_LIST only has eligible servers with zero weights, then through execution of blocks 955–986, these eligible servers are successively assigned a common weight of one and selected until all identifications of all these servers (including their weights) have been written into the client server list and, thereafter, if any candidate servers are to be selected, successively assigning a weight of one to all these servers and selecting these candidate servers (including "black box" servers) in seriatim until all the candidate servers are selected or the client server list is full, whichever occurs first.

In particular, block 955, when executed, sets the list variable REMAINING_SERVERS_LIST to a list of all the eligible servers with a zero weight. Thereafter, a loop formed of blocks 960 and 970 simply chooses a next successive eligible server, assigns a weight of one to it and then places that server in the client server list, i.e., CLIENT_SERVER_LIST, until the latter list is full or all the remaining zero-weighted servers in the eligible server list are selected, whichever occurs first. Specifically, block 970, when executed, chooses the first eligible server then listed in REMAINING_SERVERS_LIST, assigns a weight of one to that server and writes the identification of that server into variable CHOSEN_SERVER. Alternatively, servers could be chosen in a round-robin fashion among all systems, picking one server from each system until the list of eligible servers is exhausted. In any event, once this server is selected that particular server is placed into the CLIENT_SERVER_LIST and also removed from the REMAINING_SERVERS_LIST. Execution then loops back to decision block 960 which, when executed, determines whether any other servers remains in the REMAINING_SERVERS_LIST to be processed. If so, execution continues with block 970 and so on. Once all the eligible zero-weighted servers in the eligible server list have been selected, i.e., REMAINING_SERVERS is then empty, decision block 960 routes execution, via its YES path 964, to decision block 965. This decision block determines whether any candidate servers are to be selected, i.e., whether CANDIDATE_COPY_SIZE=ZERO. If candidate servers are not to be selected, then execution merely exits from routine 900 via YES path 968 emanating from decision block 965. Alternatively, if one or more candidate servers are to be selected, then decision block 965 routes execution via its NO path 966, to block 975. This latter block, when executed, sets the list variable REMAINING_SERVERS_LIST to a list of all the candidate servers with zero weights. Thereafter, a loop formed of blocks 980 and 985 simply takes servers, in succession, from REMAINING_SERVERS_LIST, assigns a weight of one to that server and writes its identification (including weight) in the client server list, i.e., CLIENT_SERVER_LIST, until the latter list is full or all the candidate servers in the candidate server list are selected, whichever occurs first. Specifically, block 980, when executed, chooses the first candidate server in the REMAINING_SERVERS_LIST, assigns a weight of one to that server and writes the identification of that server, including its weight, into variable CHOSEN_SERVER. Once this server is selected, that particular server identification is written into the CLIENT_SERVER_LIST and also removed from the REMAINING_SERVERS_LIST. Execution then proceeds to decision block 985 which, when executed, determines whether any other servers remains in the REMAINING_SERVERS_LIST to be processed. If so, execution loops back, via NO path 986, to block 980 to select the then first occurring candidate server in the REMAINING_SERVERS_LIST and so on. Once the CLIENT_SERVER_LIST is full or all the zero-weighted candidate servers have been chosen, i.e., REMAINING_SERVERS_LIST becomes empty, whichever occurs first, execution exits from routine 900, via YES path 988 emanating from decision block 985. At this point, routine 900 has written an appropriate list of eligible and candidate servers into a client server list, which, in turn, is then provided, through execution of block 560 in routine 500 shown in FIG. 5, back through the router and the network to the client application.

As noted above, the client application then routes work requests, through the network directly to each of the servers identified in the client server list and in an amount, of the total work the client then has, to each such server proportionally equal to the weight specified in the client server list and associated with that server. This concludes our inventive process for balancing work requests, among a plurality of servers in a sysplex, in view of attendant user-defined business importance thereof and available sysplex resource capacity, so as to meet overall business goals. We will now turn our discussion to our inventive session placement method.

E. GRRI and GRSS Tables

We will now describe two tables, the Generic Real Instance (GRRI) and the Generic Resource Selected Systems (GRSS) tables, as used by our inventive session placement method.

FIG. 10A depicts Generic Resource Real Instance (GRRI) table 1000. As noted above, this table respectively lists, in columns 1010, 1020 and 1030, the specific application servers executing on a given system in terms of the generic resource it supports (support for an entire application provided by the sysplex is collectively a "generic resource" with each separate instance of an application server for that resource being a so-called "real instance"), its associated logical unit and its network name. Each system maintains its own GRRI table for its registered servers and through its MVS OS (e.g., OS 220 for system $110_E$ shown in FIGS. 2A and 2B) communicates updates to this table, as they occur, i.e., as new servers are registered and de-registered, to each of the other systems. As such, exact copies of all the current GRRI tables are maintained on every system. As with SSRU table 400 shown in FIG. 4, since the only data of interest, for purposes of our present invention, in GRRI table 1000 is generic resource name (real instance) column 1010 of the servers, we will not discuss columns 1020 or 1030 any further.

FIG. 10B depicts Generic Resource Selected Systems (GRSS) table 1050. This table specifies the number of times, measured over, e.g., a ten second interval, that a session has been assigned, i.e., bound, by our inventive process, to a given system. This same table is also maintained and updated independently on every system to which our inventive process can assign a session. Hence, this table depicts a measure of the latent demand of each system. Those systems having higher GRSS_SELECTIONS values are recently handling more sessions than those having lower values and thus the latter systems, all else being equal, would be favored for session placement of a next successive session request.

F. Session Placement

In essence, our inventive session placement method only places sessions when all relevant systems collectively have non-zero capacity information, i.e. are goal-oriented. In the absence of such systems, we will revert back to session count balancing. If all systems have capacity information, then, as to the eligible servers, those servers that are meeting their goals are selected first, followed by those not meeting their goals. Obviously, the eligible servers meeting their business goals are preferred for establishing new sessions than those servers that are not meeting their goals.

In essence, one or more systems are first selected based upon their entries in the ILSS and GRSS tables (tables 300 and 1050 shown in FIGS. 3 and 10B, respectively). In essence, the system(s) selected is that which has the lowest ILSS entry with a sufficient $ILSS\_\%_{60}$ value (indicative of available capacity) at that level. The GRSS entry is used to factor in latent demand into the sufficient $ILSS\_\%_{60}$ value. The time periods here—one being the time over which the GRSS entries is kept, e.g., 10 seconds, and the other being the time frame, e.g., 60 seconds, over which the ILSS entries are maintained—implementationally specific, with the noted values being illustrative. Competing servers on the selected system(s) are then evaluated based on their corresponding session count data to yield a single server. As a result of our inventive session placement method, the identification of that single server is returned to the client application which, in turn, will directly establish a session therewith.

Figure 11:
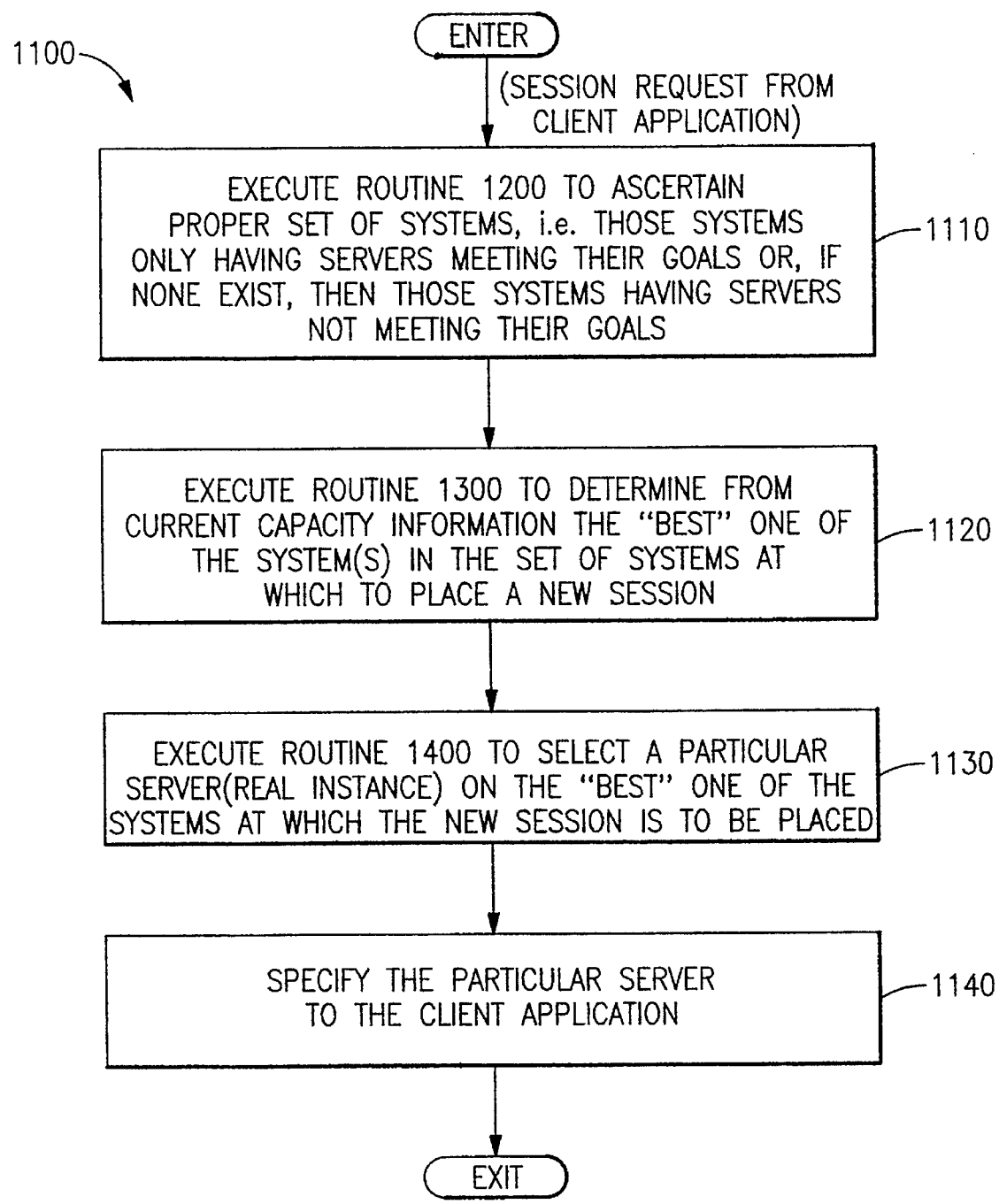
FIG. 11 depicts a high level flowchart of Session Placement Determination routine 1100 which embodies our present invention for assigning and balancing new session placements throughout the sysplex.

With the above overview in mind, FIG. 11 depicts a high level flowchart of Session Placement Determination routine 1100 which embodies our present invention for assigning and balancing new session placements throughout the sysplex. As noted above, routine 1100, as well as subservient called routines 1200–1400, all execute as part of Workload Manager 216 in the routing node—which for purposes of illustration is system $110_E$ shown in FIGS. 1 and 2A–2B.

As shown, upon entry into routine 1100, execution first proceeds to block 1110 which invokes routine 1200, described in detail below in conjunction with FIGS. 12A and 12B, to ascertain a proper set of eligible systems, i.e., goal-oriented servers which are meeting their goals or if none exists, goal-oriented servers that are not meeting their goals, on which a new session can be placed—in effect narrowing the scope of the systems that are being considered for session placement. Once such a set of systems has been fabricated, execution proceeds to block 1120 which invokes routine 1300 to select, using current capacity information, the one system(s), from those in the set, at which the session should be placed. Thereafter, execution proceeds to block 1130 which invokes routine 1400 to select a particular server on the selected system(s) to which the session will be assigned. Once this occurs, execution proceeds to block 1140 which will return, through the router, the identification of this particular server (SERVER ID) to the client application. Execution then exits from routine 1100. The client application will then directly establish a session, through the network, with this particular server.

Figure 12B:
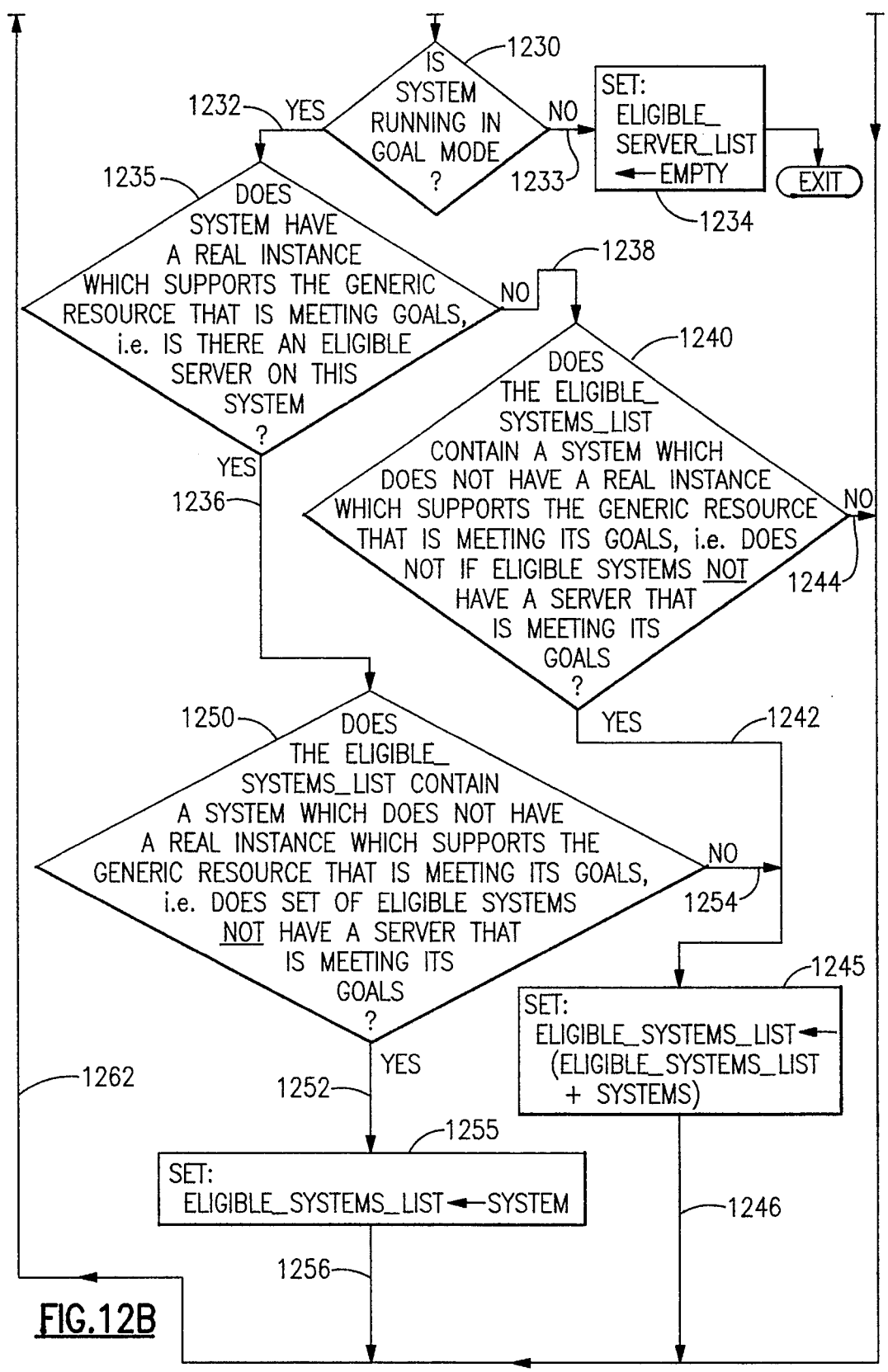

FIGS. 12A and 12B collectively depict a high level flowchart of System Set Ascertaining routine 1200 which is executed by routine 1100, the latter shown in FIG. 11; the correct alignment of the drawing sheets for FIGS. 12A and 12B is shown in FIG. 12. As discussed above, routine 1200 ascertains a proper set of eligible systems on which a new session can be placed.

Specifically, upon entry into routine 1200, execution first proceeds to block 1205 which initializes two list variables, i.e., ELIGIBLE_SYSTEMS to empty and REMAINING_SYSTEMS_LIST to a list of all the systems—whether eligible or candidate. Thereafter, a loop containing blocks 1210–1255 is entered to evaluate each and every system in seriatim and generate an appropriate set of eligible systems at which a new session can be placed. In particular, execution of this loop continues until each and every system has been processed. In that regard, decision block 1210 determines whether all the systems have been processed. If all the registered systems in the sysplex have been processed, i.e., the current contents of list variable REMAINING_SYSTEMS_LIST will be empty, then execution exits, via YES path 1214, from routine 1200. Alternatively, if another system remains to be processed, then REMAINING_SYSTEMS_LIST is not empty; hence, decision block 1210 routes execution, via its NO path 1212, to block 1215.

Block 1215, when executed, sets variable SYSTEM to designate the first system in REMAINING_SYSTEMS_LIST. Thereafter, block 1215 removes the system now designated by variable SYSTEM, i.e., the current system, from REMAINING_SYSTEMS_LIST. Once this occurs, execution proceeds to decision block 1220 which tests whether the current system is presently active. If this system is not active, then this system is no longer considered with execution merely looping back, via NO path 1224 and path 1262, to decision block 1210 to check whether any further systems remain to be considered and so on. Alternatively, if the current system is active, then decision block 1220 routes execution, via its YES path 1222, to decision block 1225. This latter decision block determines, from the GRRI table, whether that system has a real instance that supports the generic resource requested by the client application, i.e., whether an eligible application server resides on the system for the client application. If no such server exists, then the current system is not considered further with execution looping back, via NO path 1228 and path 1262, to decision block 1210 to check whether any further systems remain to be considered and so on. In the event that the current system does possess an eligible application server (real instance for the requested generic resource), then decision block 1225 routes execution, via its YES path 1226, to decision block 1230. This latter decision block ascertains whether this present system is goal-oriented, i.e., running in a goal mode. As noted above, all servers for which capacity information is not available, including non-goal oriented servers, are not selected at all for session placement. In any event, if the current system is not running in goal mode, then decision block 1230 routes execution, via NO path 1233, to block 1234 which, in turn, sets the eligible system list to empty. Execution then exits. Alternatively, if the current system is running in goal mode, then decision block 1230 routes execution, via YES path 1232, to decision block 1235. This latter decision block ascertains whether the current system, i.e., as identified in SYSTEM, which supports the desired generic resource, has an application server (real instance) that is meeting its goals. If no such application server residing on the current system is meeting its corresponding goals, then decision block 1235 routes execution, via NO path 1238, to decision block 1240. This latter decision block checks to determine whether any of the systems within the set of ELIGIBLE_SYSTEMS, as previously chosen by this loop thus far, contains a system that does not have an application server that is meeting its goals. If such a system does not exist, i.e., at least one system has already been chosen that is meeting its goals and the current system is an inferior choice to the system already chosen, then the present system is not considered any further. In this case, execution then loops back, via NO path 1244 and path 1262, to decision block 1210 to check whether any further systems remain to be considered and so on. Alternatively, if such a system exists, i.e., the current as well as all the systems selected thus far are not meeting their goals, then decision block 1240 routes execution to block 1245 which, when executed, adds the identification of the current system to the set of selected eligible systems as it presently exists, i.e., ELIGIBLE_SYSTEMS←ELIGIBLE_SYSTEMS+SYSTEM. Once the list of eligible systems is updated, then execution then loops back, via path 1246 and path 1262, to decision block 1210 to check whether any further systems remain to be considered and so on.

In the event that the current system, i.e., as identified in SYSTEM, has an appropriate application server (real instance) that is meeting its goals, then decision block 1235 routes execution, via its YES path 1236, to decision block 1250. This latter decision block, when executed, determines, identical with decision block 1240, whether any system within the set of ELIGIBLE_SYSTEMS, as previously chosen by this loop thus far, contains a system that does not have an application server that is meeting its goals. If such a system does not exist, then at least the current system just now chosen, i.e., that now identified in SYSTEM, which is meeting its goals is a better choice to any system previously chosen. In that case, the current system simply replaces all the previously chosen eligible systems. Specifically, decision block 1250 routes execution, via its YES path 1252, to block 1255 which, when executed, over-writes the ELIGIBLE_SYSTEMS list with the single identification of the current system. All previous entries in the ELIGIBLE_SYSTEMS list, being inferior in terms of not meeting goals to the present choice which is meeting its goals, are not considered any further. Thereafter, execution then loops back, via paths 1256 and 1262, to decision block 1210 to check whether any further systems remain to be considered and so on. Alternatively, if the current as well as all the systems selected thus far are all not meeting their goals, then decision block 1250 routes execution, via NO path 1254, to block 1245 which, when executed, merely adds the identification of the current system to the set of selected eligible systems as it presently exists, i.e., ELIGIBLE_SYSTEMS←ELIGIBLE_SYSTEMS+SYSTEM. Once the list of eligible systems is updated, then execution then loops back, via paths 1246 and 1262, to decision block 1210 to check whether any further systems remain to be considered and so on.

Figure 13B:
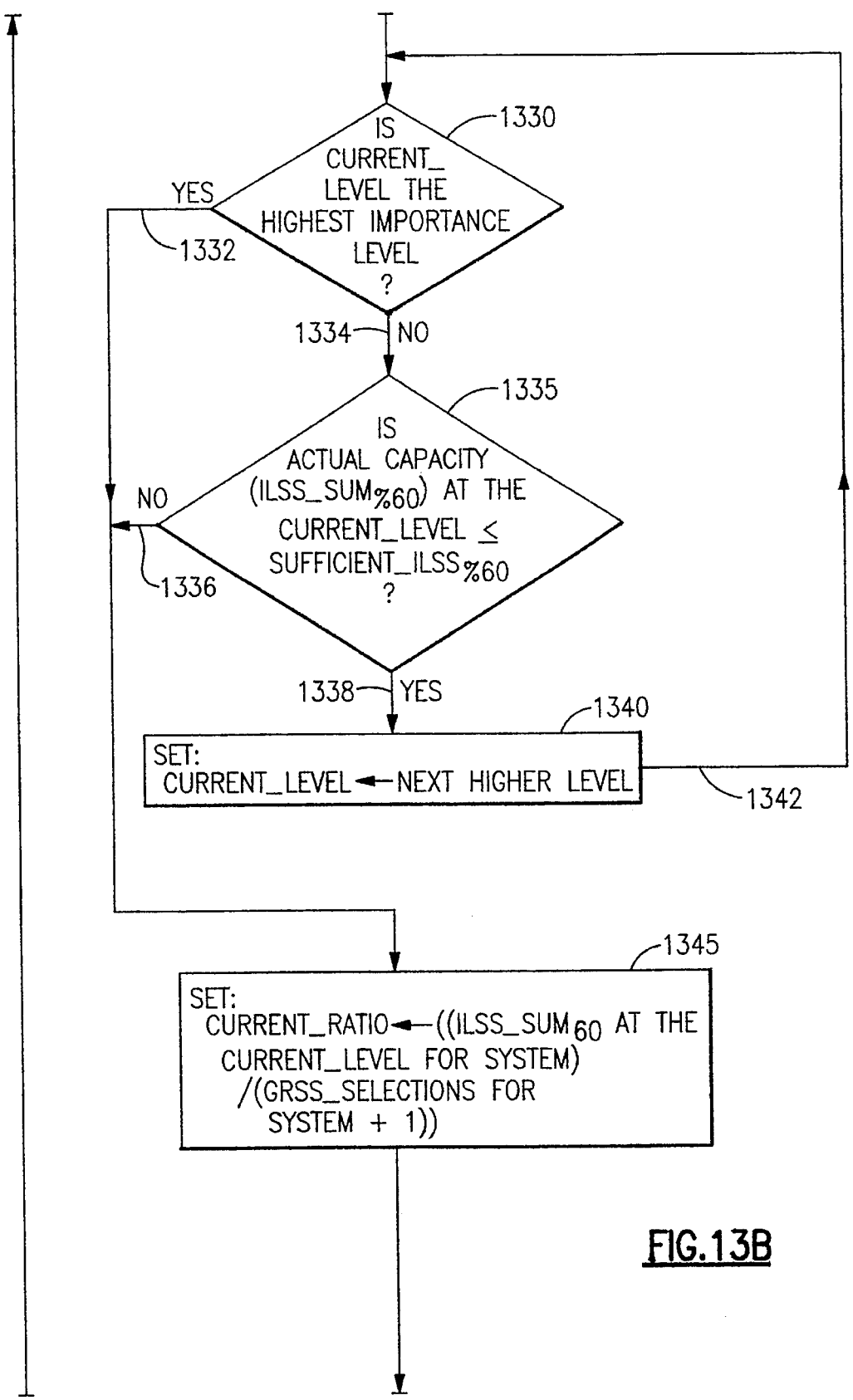

FIGS. 13A–13C collectively depict a high level flowchart of System Determination routine 1300; the correct alignment of the drawing sheets for these figures is shown in FIG. 13. As noted above, routine 1300 selects, using current capacity information, the one system(s) from those currently on the ELIGIBLE_SYSTEMS list, at which a new session should be placed. As will be seen, routine 1300 will select one particular system that is then viewed as "best" choice at which the new session should be placed; failing that, then several systems that are all equally good choices for new session placement.

Upon entry in routine 1300, execution first proceeds to block 1305. This block, when executed, initializes two list variables, i.e., SELECTED_SYSTEMS to empty (null) and REMAINING_SYSTEMS_LIST to a list of all the eligible systems found through the immediately prior execution of routine 1200, i.e., the list of systems currently specified in ELIGIBLE_SYSTEMS. Thereafter, a loop containing blocks 1310–1385 is entered to evaluate each and every eligible system in seriatim to select the one system at which a new session is to be placed. In particular, execution of this loop continues until each and every eligible system has been processed. In that regard, decision block 1310 determines whether all such systems have been processed. If all these eligible systems have been processed, i.e., the current contents of list variable REMAINING_SYSTEMS_LIST is empty, then execution exits, via YES path 1312, from routine 1300. Alternatively, if another system remains to be processed, then REMAINING_SYSTEMS_LIST is not empty; hence, decision block 1310 routes execution, via its NO path 1314, to block 1315.

Block 1315, when executed, sets variable SYSTEM to designate the first system, i.e., the current system, in REMAINING_SYSTEMS_LIST. Thereafter, block 1315 removes the current system from REMAINING_SYSTEMS_LIST. Once this occurs, execution proceeds to block 1320 which establishes a varying value, i.e., SUFFICIENT_ILSS$_{\%60}$ which is a target value, that specifies an amount of sufficient available capacity needed at the current system in order to establish a new session thereat. In that regard, if a relatively large number of sessions have recently been placed at any given system within a relatively small time period, then any work flowing from a new session subsequently placed at that system may well experience some degree of latency. This arises from a latent demand at that system to process work subsequently requested by then existing, i.e., previously established, active and/or pending sessions thereat. Unfortunately, the amount of such latent work at any one system generally can not be accurately estimated a priori. Moreover, owing to latency, the capacity statistics in the system capacity utilization (ILSS) table (table 300 shown in FIG. 3 and discussed above) will not update immediately upon placement of each new session, but rather will require some time, to accurately reflect the actual processing capacity utilized by that session. Consequently, to anticipate this latent demand, a metric for sufficient available capacity for the current system, SUFFICIENT_ILSS$_{\%60}$, is predicated on a function of the number of sessions placed at the current system over, e.g., the last ten seconds. This function is calculated as set forth below by equations (1)–(2). Specifically, the capacity needed to establish a new session at the current system is determined from the number of sessions established at this system over the prior ten seconds, through equation (1), as:

$$\text{CAPACITY\_NEEDED (SYSTEM)}=52000*(\text{GRSS\_SELECTIONS(SYSTEM)}+1)/10 \qquad (1)$$

The constant "52000", which is an illustrative base value, represents the total observed capacity, in service units, for the smallest system in the sysplex. The number of sessions recently placed at this system is provided in GRSS_SELECTIONS table 1050 shown in FIG. 10B and discussed in detail above. In equation (1), the number "10" is a conservative estimate of the number of sessions that a system having the smallest capacity can simultaneously support at 1% of its total capacity. For increasingly larger systems, this number will correspondingly change. Using equation (1), sufficient available capacity is given by equation (2) as follows:

$$\text{SUFFICIENT\_ILSS}_{\%60}=\text{MIN}((1+\text{CAPACITY\_NEEDED})/\text{ILSS\_SUM}_{\%60}, 100) \qquad (2)$$

For equation (2), the current value of ILSS_SUM$_{\%60}$ is evaluated at the highest numeric (lowest business) importance level for the current system, i.e., the measured capacity utilization that this system is currently supporting over a 60 second interval at this importance level. As one can see, by virtue of the constants, the value of SUFFICIENT_ILSS$_{\%60}$—which we will also refer to hereinafter as the "target" capacity—is implementationally dependent, dynamically variable and scaled to the processing capacity of the particular system for which it is being evaluated. The length of each of these intervals, be it ten or sixty seconds, is not critical but should be sufficiently short to provide accurate, though smoothed (for artifact and transient elimination), current dynamic performance measures.

Once block 1320 has fully executed, execution proceeds to block 1325 which, when executed, initializes a variable, CURRENT_LEVEL, to the highest numerical (lowest business) importance level, i.e., unused (see ILSS table 300 shown in FIG. 3). Once this has occurred, execution enters a loop formed of blocks 1330–1340 to ascertain the highest numerical (lowest business) importance level at which the sufficient capacity, i.e., the value of SUFFICIENT_ILSS$_{\%60}$, can be found for the current system. In particular, decision block 1330 determines whether the current importance level is the highest importance level (level 0). If this is true, then decision block 1330 routes execution, via its YES path 1332, to block 1345. Alternatively, if a numerically lower importance level exists, then decision block 1330 routes execution, via its NO path 1334, to decision block 1335. This latter decision block determines whether the actual capacity, ILSS_SUM$_{\%60}$, at the current importance level, is less than or equal that which is currently required, i.e., the value of SUFFICIENT_ILSS$_{\%60}$. If the actual capacity is greater at the current level, then the current level is selected owing to a preference for using capacity at the highest numerical importance level. In this case, decision block 1335 routes execution, via NO path 1336, to block 1345. Alternatively, if the requisite capacity can not be found at the current level, then the next higher business importance level is examined. To accomplish this, decision block 1335 routes execution, via YES path 1338, to block 1340 which, when executed, sets the value of CURRENT_LEVEL to point to the next higher (lower numeric) level in succession. Once this occurs, execution loops back, via path 1342, to block 1330 to determine whether this is the numerically lowest level, and so on.

At this point through the execution of routine 1300 for each and every system in the sysplex, in essence, a set of those systems will have been selected such that each of these selected systems will have the requisite available capacity at the lowest business (highest numerical) importance levels. Blocks 1345–1385 execute to effectively decide amongst these systems and select the one particular system(s) that currently represents the "best" system(s) at which a new session is to be placed. The "best" system is that system which could have delivered the greatest number of service units to all the sessions placed thereat over the immediately preceding ten second interval, i.e., that particular system which then had the most available capacity to handle an additional session. This criteria is used as a "tie-breaker" between otherwise equally attractive system selections.

In particular, block 1345, when executed, initializes a variable, CURRENT_RATIO, to a value of a ratio of the current capacity utilization for the current system, i.e., that specified in SYSTEM, divided by the number of sessions +1, i.e., GRSS_SELECTIONS+1, at the current importance level. For simplicity, this ratio will henceforth be referred to as the "session capacity" ratio. Thereafter, execution proceeds to decision block 1350 which, when executed, determines if no systems have been selected thus far. A list of these systems, i.e., SELECTED_SYSTEMS, is initially set to empty by execution of block 1305 upon entry into routine 1300. If this list is presently empty, then decision block 1350 routes execution, via its YES path 1352, to block 1385. This latter block saves information for the current system. In particular, this block inserts the current system, i.e., that designated by SYSTEM, into SELECTED_SYSTEMS; sets a variable SELECTED_LEVEL to the current importance level found for this system, i.e., the value of CURRENT_LEVEL; and sets variable SELECTED_RATIO to the current session capacity ratio, i.e., value of CURRENT_RATIO, associated with this system. Once this occurs, execution loops back, via paths 1386 and 1392, to block 1310 to determine whether any remaining systems remain to be examined and so on. Alternatively, if SELECTED_SYSTEMS is not empty, i.e., one or more systems have been selected thus far, then execution proceeds, via NO path 1354 emanating from decision block 1350, to decision block 1355. This latter decision block, when executed, determines whether the current system is a better choice, in terms of the importance level at which sufficient capacity exists there, i.e., the value of CURRENT_LEVEL, than a system (having its importance level being SELECTED_LEVEL) that has been previously selected through the present execution of routine 1300. It should be understood hereinafter that multiple, rather than just one, systems could result from this or other selection criteria. For simplicity, we will assume, for purposes of discussion, that only one such system is selected in such instances. Now returning to our discussion, if the current system is clearly a better choice, i.e., its importance level is numerically larger than that for a previously selected system, then decision block 1355 routes execution, via its YES path 1356, to block 1385 to select the current system as the basis of future comparison vis-à-vis other systems by: substituting the current system for all the systems previously included on the selected systems list—effectively resetting this list; and saving the importance level and current capacity utilization ratio found for this system into the variables SELECTED_LEVEL and SELECTED_RATIO, respectively. Thereafter, execution loops back, via paths 1386 and 1392, to block 1310 to determine whether any remaining systems remain to be examined and so on.

Alternatively, in the event that decision block 1355 ascertains that the current system is either an equal or inferior choice, in terms of the importance level at which sufficient capacity exists there, i.e., the value of CURRENT_LEVEL, than a system (having its importance level being SELECTED_LEVEL) that has been previously selected through the present execution of routine 1300, then this decision block routes execution, via NO path 1358, to decision block 1360. If the current system ties on importance level with a previously selected system, then blocks 1360–1385 will select the current system if it has more capacity (a higher session capacity ratio) to support a session at that importance level than will the previously selected system. Alternatively, if these ratios tie for both the current and previously selected systems, then the current system will merely be added to the list of selected systems. Otherwise, the current system will not be selected and, hence, ignored.

In particular, decision block 1360 determines whether the current system is an inferior choice, in terms of importance level, than a previously selected system, i.e., the importance level specified in CURRENT_LEVEL for this system will not equal that specified in SELECTED_LEVEL for a previously selected system. If the current system is so inferior, then the current system is ignored. In this case, decision block 1360 routes execution, via NO paths 1364 and 1392, back to decision block 1310 to determine whether any other systems remain to be examined and so on. Alternatively, if the current system ties on importance level with the previously selected system, i.e., they are equally good choices in terms of importance level, then decision block 1360 routes execution, via YES path 1362, to decision block 1365. This latter decision block determines whether the current system has more capacity to support a session at the tied importance level than will the previously selected system. This is manifested by the session capacity ratio for the current system exceeding that for the previously selected system, i.e., the value of CURRENT_RATIO exceeds that of SELECTED_RATIO. If indeed the current system manifests a higher ratio, then decision block 1365 routes execution, via YES path 1366, to block 1385 to substitute the current system for all the system(s) then situated on the selected systems list and to save information (CURRENT_LEVEL and CURRENT_RATIO) associated with this particular system for comparison, during the present execution of routine 1300, with all subsequent remaining systems (if any). Alternatively, if the current system does not have a session capacity ratio that exceeds that of a previously selected system, execution proceeds, via NO path 1368, to decision block 1370. This latter block determines whether the session capacity ratio of these two systems are equal. If the ratio is unequal, here effectively being that session capacity ratio of the current system is less than that of the previously selected system, than that latter system is a better choice than the former system. Consequently, the current system is ignored. In this case, decision block 1370 routes execution, via its NO path 1374 and path 1392, back to decision block 1310 to determine whether any remaining systems remain to be examined and so on. Alternatively, if the current system is an equally good choice as the previous system in terms of its session capacity ratio (both systems have equal amounts of capacity to support a new session), then decision block 1370 routes execution, via its YES path 1372, to block 1380. This latter block, when executed, merely adds the current system to the present list of selected systems. Once this occurs, execution proceeds, via paths 1382 and 1392, back to decision block 1310 to determine whether any remaining systems remain to be examined and so on.

Once routine 1300 has finished executing, the selected systems list, i.e., SELECTED_SYSTEMS, contains either one system that is clearly the best choice at which to place a session in terms of importance level and (where necessary) session capacity, or, in terms of these same metrics, more than one system of which all are equally good choices.

Figure 14B:
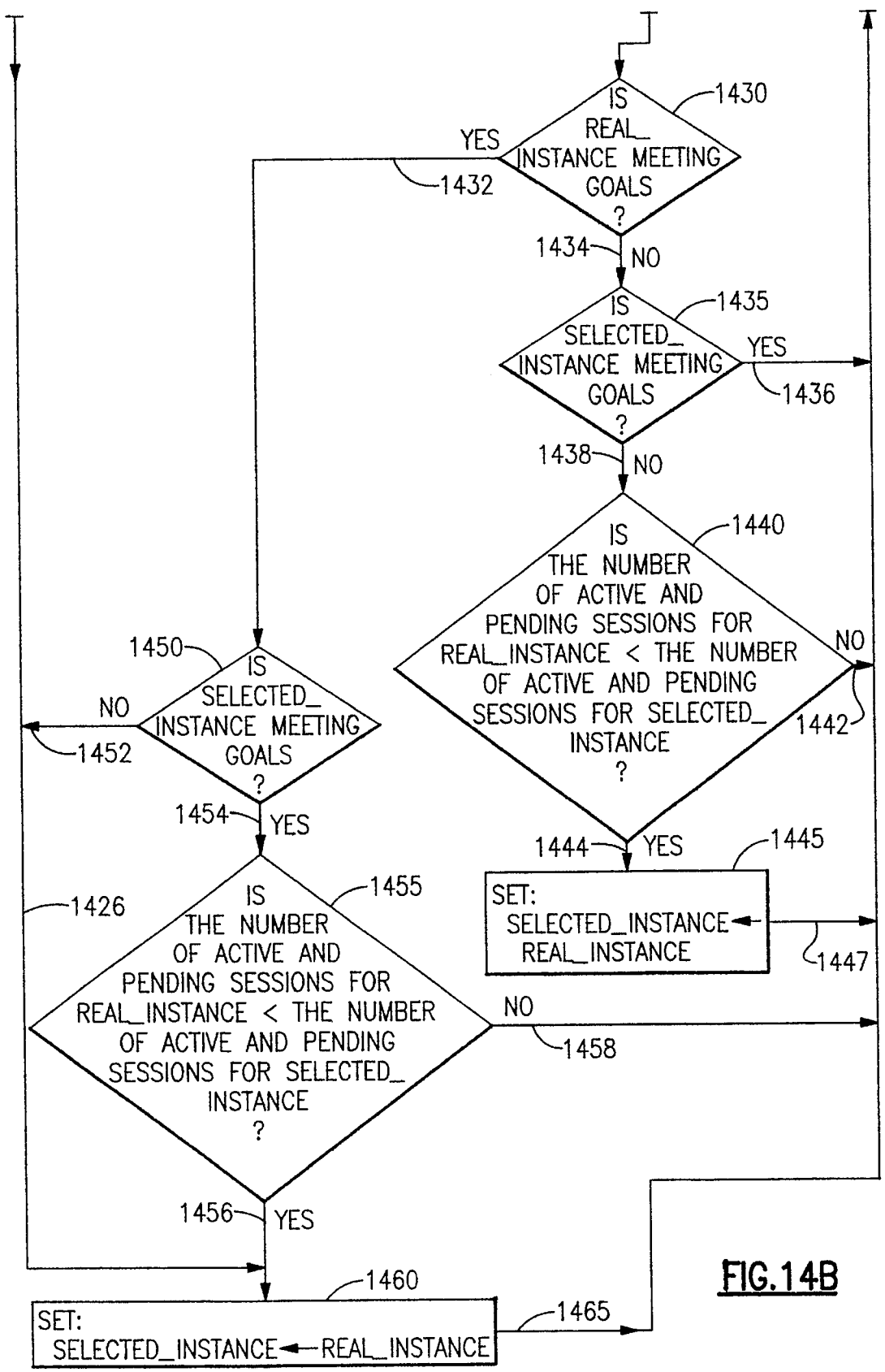

FIGS. 14A and 14B collectively depict a high level flowchart of Server Selection routine 1400; the correct alignment of the drawing sheets for FIGS. 14A and 14B is shown in FIG. 14. As noted above, routine 1400 selects a particular server on the selected system(s) to which a new session will be assigned. Ideally, this server is selected as that which is meeting its goals and which has the fewest sessions placed thereat; i.e., the goal-meeting server then having the most available capacity to accommodate the new session. If no servers on the selected system is meeting goals, then the server that has the fewest sessions placed thereat is selected.

Specifically, upon entry into routine 1400, execution proceeds to block 1405 which, when executed, initializes a variable, SELECTED_INSTANCE, to empty. This variable, at the conclusion of routine 1400, will designate the particular application server that has been selected for establishing the new session. Once this block has executed, execution proceeds to block 1410. This block, when executed, sets a list variable, ELIGIBLE_REAL_INSTANCES, to a list of all the application servers (real instances) that support the generic resource sought by the client application on collectively all the systems selected through routine 1300, i.e., all the systems then specified in SELECTED_SYSTEMS list. These servers are collectively all those designated in the GRRI (Generic Resource Real Instance) table (e.g., 1000 shown in FIG. 10A) for each and every system in the selected systems list for the particular generic resource specified by the client application in its session request. Once the ELIGIBLE_REAL_INSTANCES list is fabricated, then execution proceeds to decision block 1415. This decision block determines whether there are no such application servers on the selected systems, i.e., the ELIGIBLE_REAL_INSTANCES list is empty. If no such servers exist, then execution exits, via YES path 1416, from routine 1400. In this case, the workload manager, through the router, will revert to session count balancing for placement of the new session.

Alternatively, if one or more application servers (real instances) that support the client application exist on any of the selected systems, then decision block 1415 routes execution, via its NO path 1418, to block 1420. This latter block, when executed, selects the first application server in the ELIGIBLE_REAL_INSTANCES list and then removes this particular instance from this list. Once this occurs, a loop is entered consisting of blocks 1425–1460 to select the particular application server (real instance) from among all the application servers in the ELIGIBLE_REAL_INSTANCES list.

Specifically, decision block 1425, when executed, determines if no such server (real instance) has been previously selected thus far. This selection, i.e., SELECTED_INSTANCE, is initially set to null by execution of block 1405 upon entry into routine 1400. If no such server has been selected thus far, then decision block 1425 routes execution, via its YES path 1426, to block 1460. This latter block merely selects the current server, i.e., REAL_INSTANCE, as the selected instance (SELECTED_INSTANCE) for subsequent comparison with the other such servers. Once this occurs, execution loops back, via path 1465, to block 1415 to determine whether any application servers remain to be examined and so on. Alternatively, if a real instance (application server) has previously been selected through current execution of routine 1400, then execution proceeds, via NO path 1428 emanating from decision block 1425, to decision block 1430. This latter decision block, when executed, determines whether the current server, i.e., REAL_INSTANCE, is meeting its goals. If the current server is meeting its goals, then decision block 1430 routes execution, via YES path 1432, to decision block 1450; otherwise if the current server is not meeting its goals, execution proceeds, via NO path 1434, to decision block 1435.

If the current server is meeting its goals, then that server becomes the selected server if the previously selected server is not meeting its goals, or, if both servers are meeting their goals, if the number of active and pending sessions on the current server is less than that for the previously selected server. Specifically, decision block 1450 determines whether the previously selected server is meeting its goals. If this server is not meeting its goals, then the current server, which is meeting its goals, is a better choice for session placement. Consequently, decision block 1450 routes execution, via NO path 1452 and path 1426, to block 1460 which, in turn, merely selects the current server as the selected server (SELECTED_INSTANCE) for subsequent comparison with the other such servers. Once this occurs, execution loops back, via path 1465, to block 1415 to determine whether any application servers remain to be examined and so on. Alternatively, if the previously selected server is also meeting its goals—as is the current server, then decision block 1450 routes execution, via its YES path 1454, to decision block 1455. This latter decision block, when executed, determines whether the number of active and pending sessions on the current server is less than that for the previously selected server. If the session count is less for the current server, then decision block 1455 routes execution, via. YES path 1456, to block 1460 which, in turn, selects the current server as the selected server (SELECTED_INSTANCE) for subsequent comparison with the other such servers. Once this occurs, execution loops back, via path 1465, to block 1415 to determine whether any application servers remain to be examined and so on. If, however, the session count for the current server is equal to or greater than that for the previously selected server, then the current server is not any better than the previously selected server to receive a new session. In this case, the current server is ignored by decision block 1455 routing execution, via NO path 1458, directly to path 1465 and via the latter path back to decision block 1415 to determine whether any application servers remain to be examined and so on.

Alternatively, if the current server is not meeting its goals, then decision block 1430 directs execution, via its NO path 1434, to decision block 1435. This latter decision block determines, identical to block 1450, whether the previously selected server is meeting its goals. If the previously selected server is meeting its goals, then the previously selected server is a better selection over the current server which presently is not meeting its goals. Hence, the current server is simply ignored in favor of the previously selected server. Specifically, decision block 1435 merely routes execution, via its YES path 1436, directly to path 1465 and via the latter path back to decision block 1415 to determine whether any application servers remain to be examined and so on. If, however, both the current and previously selected servers (i.e., servers specified in REAL_INSTANCE and SELECTED_INSTANCE) are not meeting their respective goals, then the lower active and pending session count is used to select between these two servers. Specifically, if both servers are not meeting their goals, decision block 1435 routes execution, via NO path 1438, to decision block 1440. This latter decision block, when executed, determines, identical to block 1455, whether the number of active and pending sessions on the current server is less than that for the previously selected server. If, on the one hand, the session count for the former server is less than that for the latter server, thus indicating that, even though both servers are not meeting their goals, the current server is the better choice to handle a new session, then decision block 1440 routes execution, via its YES path 1444, to block 1445. Block 1445, when executed, identical to block 1460, merely selects the current server, i.e., REAL_INSTANCE, as the selected instance (SELECTED_INSTANCE) for subsequent comparison with the other such servers. Once this occurs, execution loops back, via path 1465 to block 1415 to determine whether any application servers remain to be examined and so on. On the other hand, if the current server has more active and pending sessions than the previously selected server, then the latter server is a better choice to receive a new session. In that case, the current server is ignored with decision block 1440 routing execution, via its NO path 1442, directly to path 1465 and from there back to block 1415 to determine whether any application servers remain to be examined and so on.

Thus, as one can see, once routine 1400 completes execution, the variable SELECTED_SERVER contains an identification of the particular server at which a new session should be placed. This identification (SERVER ID) is then communicated, via execution of block 1140 (shown in FIG. 11), back through the router and network 30 (see FIGS. 2A and 2B) to the client application. As noted above, the client application then initiates a new session, through the network, directly with the identified server. This concludes our inventive process for balancing session placement, among a plurality of servers in a sysplex, in view of attendant user-defined business importance thereof and available sysplex resource capacity, so as to meet overall business goals.

Clearly, one skilled in the art can now readily appreciate that while we have discussed our invention in the context of imposing a duty on the client application, e.g., application 15₁ (shown in FIGS. 1, 2A and 2B), executing at the client computer, e.g., computer 10₁, to perform workload routing to individual servers in proportion to corresponding weights, this duty could be relegated back to the sysplex and specifically to a client application, e.g., a concentrator, executing in the routing node. In this instance, all the users would connect either directly to that client application, executing within an MVS OS in a system, or via a server. All the work requests would be sent from the client application at the client computer to the same concentrator. The workload manager in the routing node, after executing our inventive method to identify the appropriate servers and ascertain their weights, would then inform the concentrator of the work request assignments and weights. The concentrator, in turn, would route the work requests to the individual servers in proportion to the corresponding weights. Though various network based software facilities, as noted above, are replicated, for redundancy, in each item in the sysplex, only those facilities, now including the concentrator, in the routing node are active at any one time. Advantageously, this approach of sysplex rather than client-based routing frees the client application (i.e., on behalf of the user) at the client computer from a need to perform any workload routing. Consequently, by merely requiring the client computer to communicate with a single well-known client application, e.g., a concentrator, at a single network address in a sysplex rather than with multiple servers across multiple systems and possibly different sysplexes, application programming at the client computer can be considerably simplified. Unfortunately, this approach incurs additional sysplex overhead and, by introducing an extra "hop" (leg) into each resulting route, necessitates additional processing delay. However, for those work requests that require processing over extended periods of time—which fortunately constitute many of the requests in a sysplex environment, the additional overhead and delay is typically negligible and hence readily tolerated in view of the advantages gained through simplified application programming.

Furthermore, while our inventive session placement method, as described above, relies on making sharp distinctions in choosing among competing servers, the underlying criteria can be varied to accommodate transient server conditions. For example, as pertaining to routine 1400, servers that marginally miss their goals may do so as a result of causes other than dispatch-related phenomena, i.e., factors unrelated to sufficient CPU access. In this regard, excess paging caused by insufficient storage may be one such cause. But for these non-CPU access problems, these servers may well possess sufficient capacity to support an additional session. Fortunately, these factors are likely to be transitory in duration. In that regard, the MVS OS (specifically a system resource manager therein) in the corresponding system on which such a server resides will over a very short time, here illustratively ten seconds, recognize the need to assign additional resources to that server in order for it to meet its goals and then will then re-assign resources accordingly. As such, a server previously missing its goals by a marginal amount may well be converted through resource re-assignment into a server that does meet its goals and is thus favored to receive work and session requests. Often, a session request may entail several hours of subsequent application processing; thus, a corresponding session assignment will be in effect for quite some time. Consequently, by increasing the number of servers that can preferentially accept new sessions and hence process work requests therefrom—even if a short transitory delay ensues in processing the work, such a delay being hardly noticeable, then a current processing burden can be spread across an additional server thus further assuring that the overall business goals of the sysplex are to be met.

Accordingly, in selecting competing servers for session placement, a more refined selection criteria can be used than that described above, with the order of preferential server selection being: (a) first, those servers that are fully meeting their goals; (b) second, those servers that are marginally missing their goals but having requisite capacity at a sufficiently high numeric (low business) importance level, such as level six, or greater, or just unused capacity; (c) third, those servers that are meeting their goals but only have sufficient capacity at a higher (numerically lower) business importance level than those servers marginally missing their goals; and (d) fourth and finally, those servers that are not meeting their goals at all, i.e., by more than a marginal amount. By favoring those servers that are marginally missing their goals (servers (b)) but have capacity at a sufficiently low business importance level to receive new sessions (and work) over those goal-meeting servers that have capacity only at higher business importance levels (servers (c)), this criteria assures that work of higher business importance currently active or pending at the latter servers will not be readily displaced. Those marginal servers that do not possess requisite minimum capacity at a sufficiently low business importance level are classified in the last group of servers. Servers in this last group (servers (d)) are only selected as a last resort since any additional sessions placed thereat (with ensuing work requests) are likely to excessively burden these servers, thus degrading their throughput to the ultimate detriment of meeting the overall business goals of the sysplex. Here, too, servers in each of the four classes (a–d) would be chosen in ascending order of session counts, i.e.

those servers having the fewest sessions would be chosen first. The numeric server performance measure (s) that defines "marginal" operation is implementationally dependent and may well be empirically defined.

Although a preferred embodiment, which incorporates the teachings of our present invention, as claimed below, has been shown and described in detail herein along with various modifications, those skilled in the art can readily devise many other varied embodiments that still incorporate our inventive teachings.

We claim:

1. In a multi-processing environment having a plurality of computer systems, each of said systems having an operating system instance resident thereon and providing at least one application server, a method for assigning work requests among individual ones of the servers in order to meet business goals inherent in a policy governing the environment, the method comprising the steps of:

in response to an incoming request to route work,
classifying each active one of the systems either as an eligible system that then exhibits at least a minimum pre-defined capacity utilization, at a lowest one of a number of pre-defined business importance levels among all the systems, over a first pre-defined time interval, or as a candidate system so as to form first and second sets of eligible and candidate systems, respectively; each eligible system being one of the systems that is goal-oriented and runs under the policy for which current capacity information is available, and each candidate system being any remaining one of said plurality of systems other than all the eligible systems; and forming, in conjunction with said classifying step, third and fourth sets of eligible and candidate servers, respectively, such that said third and fourth sets contain identifications of all active ones of the servers residing on each of the systems in said first and second sets, respectively;

assigning, in response to said classifying step, a system weight to each one of the systems in the first and second sets, the system weight representing an amount of total available capacity utilized at the lowest one of the business importance levels, by said each one system in the first and second sets;

determining, in conjunction with said system weight assigning step and for each different one of the systems in said first and second sets, a corresponding server weight for each different server residing on said each different one system;

forming, in response to said third and fourth sets, an output server set populated first by identifications of eligible servers, and their associated server weights, taken, successively and in order of descending server weights, from said third set followed, by identification of servers, and their associated server weights, taken successively from said fourth set; and routing work requests to each one of the servers identified in the output server set wherein, of a total number of work requests to be routed to all of the identified servers, an amount of the total work requests is routed to each one identified server in the output server set in proportion to the server weight associated therewith.

2. The method in claim 1 wherein the output server set forming step comprises the steps of:

writing identifications of successive ones of the eligible servers, if any, and their associated weights, from the third set into the output server set until the output server set is full or identifications of all the eligible servers in the third set have been taken; and if the output server set is not full, writing identifications of successive ones of the candidate servers, and the associated server weights, from the fourth set into the output server set until either the output server set is full or identifications of all the candidate servers in the fourth set have been taken.

3. The method in claim 2 wherein the system weight assigning step comprises the steps of:

ascertaining the total available capacity utilized as total capacity utilized by all of the eligible systems in the first set at the lowest one of the business importance levels which has sufficient capacity; and specifying, for each one of the eligible systems in the first set, the system weight therefor as a function of a ratio of capacity utilized by said each one eligible system, at the lowest one of the business importance levels which has sufficient capacity, divided by the total available capacity utilized at a target importance level among all of said eligible systems.

4. The method in claim 3 wherein the system weight assigning step further comprises the steps of:

in the event identifications of more candidate systems than identifications of eligible systems are to be taken from said second and first sets, respectively, setting the system weight for each different eligible system to be taken from the second set to a pre-defined fixed weight; and in the event identifications of more eligible systems than identifications of candidate systems are to be taken from said first and second sets, respectively, setting the system weight for each different candidate system to be taken from the first set to a minimum of either an average and a median of the system weights of all the eligible systems to be taken from the first set.

5. The method in claim 2 wherein the server weight determining step comprises the steps of, for said eligible servers residing on each one eligible system:

where the number of eligible servers residing thereon exceeds the system weight therefor, setting the server weight for each of the eligible servers residing on said each one eligible system equal to the system weight therefor divided by the number of eligible servers; and where the number of eligible servers residing therein is less than the system weight therefor,
selecting one of the eligible servers residing on said each one eligible system as a selected eligible server;
assigning the entire system weight for said each one eligible system to said selected eligible server as the server weight therefor; and
assigning zero as the server weight to each remaining one of said eligible servers residing on said each one eligible system.

6. The method in claim 5 wherein the server weight determining step comprises the steps of, for said candidate servers residing on each one candidate system:

where the number of candidate servers residing thereon exceeds the system weight therefor, setting the server weight for each of the candidate servers residing on said each one candidate system equal to the system weight therefor divided by a number of candidate servers residing thereon; and where the number of candidate servers residing therein is less than the system weight therefor, selecting one of the candidate servers residing on said each one candidate system as a selected candidate server;

assigning the entire system weight for said each one candidate system to said selected candidate server as the server weight therefor; and assigning zero as the server weight to each remaining one of said eligible servers residing on said each one candidate system.

7. The method in claim 6 wherein the server weight determining step further comprises the steps of:

if one or more eligible servers identified in the third set each has a zero server weight and the identification of one or more of said zero-weighted eligible servers is to be written into the output server set:

writing the identifications of each successive zero-weighted eligible server into the output server set as an output eligible server until the output server set is full or the identifications of all the zero-weighted eligible servers have been taken; and assigning a pre-defined fixed server weight to the output eligible server; and if one or more candidate servers identified in the fourth set each has a zero server weight and the identification of one or more of said zero-weighted candidate servers is to be written into the output server set:

writing the identifications of each successive zero-weighted candidate server into the output server set as an output candidate server until the output server set is full or the identifications of all the zero-weighted candidate servers have been taken; and assigning a pre-defined fixed server weight to the output candidate server.

8. The method in claim 2, wherein the multi-processing environment is a sysplex, further comprising the steps of:

receiving, from a network connected to the sysplex, the incoming request in a routing node, the routing node being one of the plurality of systems; and undertaking the classifying, third and fourth set forming, assigning, determining and output set forming steps by the operating system instance residing in the routing node.

9. The method in claim 8 further comprising the steps of:

communicating, through the network, the output server set from the routing node to a client application executing in a client computer connected through the network to the sysplex; and said work requests routing step comprises the step, performed by the client application, of routing each of the total number of work requests, through the network, to a corresponding one of the servers in the sysplex and identified in the output server set.

10. The method in claim 9 wherein the system weight assigning step comprises the steps of:

ascertaining the total available capacity utilized as total capacity utilized by all of the eligible systems in the first set at the lowest one of the business importance levels which has sufficient capacity; and specifying, for each one of the eligible systems in the first set, the system weight therefor as a function of a ratio of capacity utilized by said each one eligible system and at the lowest one of the business importance levels which has sufficient capacity, divided by the total available capacity utilized at a target importance level among all of aid eligible systems.

11. The method in claim 10 wherein the system weight assigning step further comprises the steps of:

in the event identifications of more candidate systems than identifications of eligible systems are to be taken from said second and first sets, respectively, setting the system weight for each different eligible system to be taken from the second set to a pre-defined fixed weight; and in the event identifications of more eligible systems than identifications of candidate systems are to be taken from said first and second sets, respectively, setting the system weight for each different candidate system to be taken from the first set to a minimum of either an average and a median of the system weights of all the eligible systems to be taken from the first set.

12. The method in claim 11 wherein the server weight determining step comprises the steps of, for said eligible servers residing on each one eligible system:

where the number of eligible servers residing thereon exceeds the system weight therefor, setting the server weight for each of the eligible servers residing on said each one eligible system equal to the system weight therefor divided by the number of eligible servers; and where the number of eligible servers residing therein is less than the system weight therefor, selecting one of the eligible servers residing on said each one eligible system as a selected eligible server;

assigning the entire system weight for said each one eligible system to said selected eligible server as the server weight therefor; and assigning zero as the server weight to each remaining one of said eligible servers residing on said each one eligible system.

13. The method in claim 12 wherein the server weight determining step comprises the steps of, for said candidate servers residing on each one candidate system:

where the number of candidate servers residing thereon exceeds the system weight therefor, setting the server weight for each of the candidate servers residing on said each one candidate system equal to the system weight therefor divided by a number of candidate servers residing thereon; and where the number of candidate servers residing therein is less than the system weight therefor, selecting one of the candidate servers residing on said each one candidate system as a selected candidate server;

assigning the entire system weight for said each one candidate system to said selected candidate server as the server weight therefor; and assigning zero as the server weight to each remaining one of said eligible servers residing on said each one candidate system.

14. The method in claim 13 wherein the server weight determining step further comprises the steps of:

if one or more eligible servers identified in the third set each has a zero server weight and the identification of one or more of said zero-weighted eligible servers is to be written into the output server set:

writing the identifications of each successive zero-weighted eligible server into the output server set as an output eligible server until the output server set is full or the identifications of all the zero-weighted eligible servers have been taken; and assigning a pre-defined fixed server weight to the output eligible server; and if one or more candidate servers identified in the fourth set each has a zero server weight and the identification of one or more of said zero-weighted candidate servers is to be written into the output server set:
  writing the identifications of each successive zero-weighted candidate server into the output server set as an output candidate server until the output server set is full or the identifications of all the zero-weighted candidate servers have been taken; and
  assigning a pre-defined fixed server weight to the output candidate server.

15. The method in claim 14 wherein the pre-defined utilization equals at least 5% of total capacity provided by said each active one system and the pre-defined fixed weight is one.

16. The method in claim 9 wherein the server weight determining step comprises the steps of, for said eligible servers residing on each one eligible system:
  where the number of eligible servers residing thereon exceeds the system weight therefor, setting the server weight for each of the eligible servers residing on said each one eligible system equal to the system weight therefor divided by the number of eligible servers; and
  where the number of eligible servers residing therein is less than the system weight therefor,
    selecting one of the eligible servers residing on said each one eligible system as a selected eligible server;
    assigning the entire system weight for said each one eligible system to said selected eligible server as the server weight therefor; and
    assigning zero as the server weight to each remaining one of said eligible servers residing on said each one eligible system.

17. The method in claim 16 wherein the server weight determining step comprises the steps of, for said candidate servers residing on each one candidate system:
  where the number of candidate servers residing thereon exceeds the system weight therefor, setting the server weight for each of the candidate servers residing on said each one candidate system equal to the system weight therefor divided by a number of candidate servers residing thereon; and
  where the number of candidate servers residing therein is less than the system weight therefor,
    selecting one of the candidate servers residing on said each one candidate system as a selected candidate server;
    assigning the entire system weight for said each one candidate system to said selected candidate server as the server weight therefor; and
    assigning zero as the server weight to each remaining one of said eligible servers residing on said each one candidate system.

18. The method in claim 17 wherein the server weight determining step further comprises the steps of:
  if one or more eligible servers identified in the third set each has a zero server weight and the identification of one or more of said zero- weighted eligible servers is to be written into the output server set:
    writing the identifications of each successive zero-weighted eligible server into the output server set as an output eligible server until the output server set is full or the identifications of all the zero-weighted eligible servers have been taken; and
    assigning a pre-defined fixed server weight to the output eligible server; and
  if one or more candidate servers identified in the fourth set each has a zero server weight and the identification of one or more of said zero-weighted candidate servers is to be written into the output server set:
    writing the identifications of each successive zero-weighted candidate server into the output server set as an output candidate server until the output server set is full or the identifications of all the zero-weighted candidate servers have been taken; and
    assigning a pre-defined fixed server weight to the output candidate server.

19. The method in claim 18 wherein the system weight assigning step comprises the steps of:
  ascertaining the total available capacity utilized as total capacity utilized by all of the eligible systems in the first set at the lowest one of the business importance levels which has sufficient capacity; and
  specifying, for each one of the eligible systems in the first set, the system weight therefor as a function of a ratio of capacity utilized by said each one eligible system and at the lowest one of the business importance levels which has sufficient capacity, divided by the total available capacity utilized at a target importance level among all of said eligible systems.

20. The method in claim 19 wherein the system weight assigning step further comprises the steps of:
  in the event identifications of more candidate systems than identifications of eligible systems are to be taken from said second and first sets, respectively, setting the system weight for each different eligible system to be taken from the second set to a pre-defined fixed weight; and
  in the event identifications of more eligible systems than identifications of candidate systems are to be taken from said first and second sets, respectively, setting the system weight for each different candidate system to be taken from the first set to a minimum of either an average and a median of the system weights of all the eligible systems to be taken from the first set.

21. The method in claim 20 wherein the pre-defined utilization equals at least 5% of total capacity provided by said each active one system and the pre-defined fixed weight is one.

22. The method in claim 8 further comprising the steps of:
  receiving, at the routing node, the total number of work requests from a client application executing in a client computer connected through the network to the sysplex; and
  said work requests routing step comprises the step, performed by the operating instance residing in the routing node, of routing each of the total number of work requests received thereat to a corresponding one of the servers in the sysplex and identified in the output server set.

23. The method in claim 22 wherein the system weight assigning step comprises the steps of:
  ascertaining the total available capacity utilized as total capacity utilized by all of the eligible systems in the first set at the lowest one of the business importance levels which has sufficient capacity; and
  specifying, for each one of the eligible systems in the first set, the system weight therefor as a function of a ratio of capacity utilized by said each one eligible system and at the lowest one of the business importance levels which has sufficient capacity, divided by the total available capacity utilized at a target importance level among all of said eligible systems.

24. The method in claim 23 wherein the system weight assigning step further comprises the steps of:

in the event identifications of more candidate systems than identifications of eligible systems are to be taken from said second and first sets, respectively, setting the system weight for each different eligible system to be taken from the second set to a pre-defined fixed weight; and in the event identifications of more eligible systems than identifications of candidate systems are to be taken from said first and second sets, respectively, setting the system weight for each different candidate system to be taken from the first set to a minimum of either an average and a median of the system weights of all the eligible systems to be taken from the first set.

25. The method in claim 24 wherein the server weight determining step comprises the steps of, for said eligible servers residing on each one eligible system:

where the number of eligible servers residing thereon exceeds the system weight therefor, setting the server weight for each of the eligible servers residing on said each one eligible system equal to the system weight therefor divided by the number of eligible servers; and where the number of eligible servers residing therein is less than the system weight therefor, selecting one of the eligible servers residing on said each one eligible system as a selected eligible server;

assigning the entire system weight for said each one eligible system to said selected eligible server as the server weight therefor; and assigning zero as the server weight to each remaining one of said eligible servers residing on said each one eligible system.

26. The method in claim 25 wherein the server weight determining step comprises the steps of, for said candidate servers residing on each one candidate system:

where the number of candidate servers residing thereon exceeds the system weight therefor, setting the server weight for each of the candidate servers residing on said each one candidate system equal to the system weight therefor divided by a number of candidate servers residing thereon; and where the number of candidate servers residing therein is less than the system weight therefor, selecting one of the candidate servers residing on said each one candidate system as a selected candidate server;

assigning the entire system weight for said each one candidate system to said selected candidate server as the server weight therefor; and assigning zero as the server weight to each remaining one of said eligible servers residing on said each one candidate system.

27. The method in claim 26 wherein the server weight determining step further comprises the steps of:

if one or more eligible servers identified in the third set each has a zero server weight and the identification of one or more of said zero-weighted eligible servers is to be written into the output server set:

writing the identifications of each successive zero-weighted eligible server into the output server set as an output eligible server until the output server set is full or the identifications of all the zero-weighted eligible servers have been taken; and assigning a pre-defined fixed server weight to the output eligible server; and if one or more candidate servers identified in the fourth set each has a zero server weight and the identification of one or more of said zero-weighted candidate servers is to be written into the output server set:

writing the identifications of each successive zero-weighted candidate server into the output server set as an output candidate server until the output server set is full or the identifications of all the zero-weighted candidate servers have been taken; and assigning a pre-defined fixed server weight to the output candidate server.

28. The method in claim 27 wherein the pre-defined utilization equals at least 5% of total capacity provided by said each active one system and the pre-defined fixed weight is one.

29. The method in claim 28 wherein the server weight determining step comprises the steps of, for said eligible servers residing on each one eligible system:

where the number of eligible servers residing thereon exceeds the system weight therefor, setting the server weight for each of the eligible servers residing on said each one eligible system equal to the system weight therefor divided by the number of eligible servers; and where the number of eligible servers residing therein is less than the system weight therefor, selecting one of the eligible servers residing on said each one eligible system as a selected eligible server;

assigning the entire system weight for said each one eligible system to said selected eligible server as the server weight therefor; and assigning zero as the server weight to each remaining one of said eligible servers residing on said each one eligible system.

30. The method in claim 29 wherein the server weight determining step comprises the steps of, for said candidate servers residing on each one candidate system:

where the number of candidate servers residing thereon exceeds the system weight therefor, setting the server weight for each of the candidate servers residing on said each one candidate system equal to the system weight therefor divided by a number of candidate servers residing thereon; and where the number of candidate servers residing therein is less than the system weight therefor, selecting one of the candidate servers residing on said each one candidate system as a selected candidate server;

assigning the entire system weight for said each one candidate system to said selected candidate server as the server weight therefor; and assigning zero as the server weight to each remaining one of said eligible servers residing on said each one candidate system.

31. The method in claim 30 wherein the server weight determining step further comprises the steps of:

if one or more eligible servers identified in the third set each has a zero server weight and the identification of one or more of said zero-weighted eligible servers is to be written into the output server set:

writing the identifications of each successive zero-weighted eligible server into the output server set as an output eligible server until the output server set is full or the identifications of all the zero-weighted eligible servers have been taken; and assigning a pre-defined fixed server weight to the output eligible server; and if one or more candidate servers identified in the fourth set each has a zero server weight and the identification of one or more of said zero-weighted candidate servers is to be written into the output server set:

writing the identifications of each successive zero-weighted candidate server into the output server set as an output candidate server until the output server set is full or the identifications of all the zero-weighted candidate servers have been taken; and assigning a pre-defined fixed server weight to the output candidate server.

32. The method in claim 31 wherein the system weight assigning step comprises the steps of:

ascertaining the total available capacity utilized as total capacity utilized by all of the eligible systems in the first set at the lowest one of the business importance levels which has sufficient capacity; and specifying, for each one of the eligible systems in the first set, the system weight therefor as a function of a ratio of capacity utilized by said each one eligible system and at the lowest one of the business importance levels which has sufficient capacity, divided by the total available capacity utilized at a target importance level among all of said eligible systems.

33. The method in claim 32 wherein the system weight assigning step further comprises the steps of:

in the event identifications of more candidate systems than identifications of eligible systems are to be taken from said second and first sets, respectively, setting the system weight for each different eligible system to be taken from the second set to a pre-defined fixed weight; and in the event identifications of more eligible systems than identifications of candidate systems are to be taken from said first and second sets, respectively, setting the system weight for each different candidate system to be taken from the first set to a minimum of either an average and a median of the system weights of all the eligible systems to be taken from the first set.

34. The method in claim 33 wherein the pre-defined utilization equals at least 5% of total capacity provided by said each active one system and the pre-defined fixed weight is one.

35. In a multi-processing environment having a plurality of computer systems, each of said systems having an operating system instance resident thereon and providing at least one application server, apparatus for assigning work requests among individual ones of the servers in order to meet business goals inherent in a policy governing the environment, the apparatus comprising:

means, responsive to an incoming request to route work, for classifying each active one of the systems either as an eligible system that then exhibits at least a minimum pre-defined capacity utilization, at a lowest one of a number of pre-defined business importance levels among all the systems, over a first pre-defined time interval, or as a candidate system so as to form first and second sets of eligible and candidate systems, respectively; each eligible system being one of the systems that is goal-oriented and runs under the policy for which current capacity information is available, and each candidate system being any remaining one of said plurality of systems other than all the eligible systems; and means, operative in conjunction with said classifying means, for forming third and fourth sets of eligible and candidate servers, respectively, such that said third and fourth sets contain identifications of all active ones of the servers residing on each of the systems in said first and second sets, respectively;

means for assigning a system weight to each one of the systems in the first and second sets, the system weight representing an amount of total available capacity utilized at the lowest one of the business importance levels, by said each one system in the first and second sets;

means for determining, in conjunction with said system weight assigning means and for each different one of the systems in said first and second sets, a corresponding server weight for each different server residing on said each different one system;

means for forming, in response to said third and fourth sets, an output server set populated first by identifications of eligible servers, and their associated server weights, taken, successively and in order of descending server weights, from said third set followed, by identification of servers, and their associated server weights, taken successively from said fourth set; and means for routing work requests to each one of the servers identified in the output server set wherein, of a total number of work requests to be routed to all of the identified servers, an amount of the total work requests is routed to each one identified server in the output server set in proportion to the server weight associated therewith.

36. The apparatus in claim 35 wherein the output server set forming means comprises:

means for writing identifications of successive ones of the eligible servers, if any, and their associated weights, from the third set into the output server set until the output server set is full or identifications of all the eligible servers in the third set have been taken; and means for writing, if the output server set is not full, identifications of successive ones of the candidate servers, and the associated server weights, from the fourth set into the output server set until either the output server set is full or identifications of all the candidate servers in the fourth set have been taken.

37. The apparatus in claim 36 wherein the system weight assigning means comprises:

means for ascertaining the total available capacity utilized as total capacity utilized by all of the eligible systems in the first set at the lowest one of the business importance levels which has sufficient capacity; and means for specifying, for each one of the eligible systems in the first set, the system weight therefor as a function of a ratio of capacity utilized by said each one eligible system and at the lowest one of the business importance levels which has sufficient capacity, divided by the total available capacity utilized at a target importance level among all of said eligible systems.

38. The apparatus in claim 37 wherein the system weight assigning means further comprises:

first means for setting, in the event identifications of more candidate systems than identifications of eligible systems are to be taken from said second and first sets, respectively, the system weight for each different eligible system to be taken from the second set to a pre-defined fixed weight; and second means for setting, in the event identifications of more eligible systems than identifications of candidate systems are to be taken from said first and second sets, respectively, the system weight for each different candidate system to be taken from the first set to a minimum of either an average and a median of the system weights of all the eligible systems to be taken from the first set.

39. The apparatus in claim 36 wherein the server weight determining means comprises:

means for setting, where the number of eligible servers residing on each one eligible system exceeds the system weight therefor, the server weight for each of the eligible servers residing on said each one eligible system equal to the system weight therefor divided by the number of eligible servers; and means, operative where the number of eligible servers residing therein is less than the system weight therefor:
for selecting one of the eligible servers residing on said each one eligible system as a selected eligible server,
for assigning the entire system weight for said each one eligible system to said selected eligible server as the server weight therefor, and
for assigning zero as the server weight to each remaining one of said eligible servers residing on said each one eligible system.

40. The apparatus in claim 39 wherein the server weight determining means comprises:

means for setting, where the number of candidate servers residing on each one candidate system exceeds the system weight therefor, setting the server weight for each of the candidate servers residing on said each one candidate system equal to the system weight therefor divided by a number of candidate servers residing thereon; and means, operative where the number of candidate servers residing therein is less than the system weight therefor:
for selecting one of the candidate servers residing on said each one candidate system as a selected candidate server,
for assigning the entire system weight for said each one candidate system to said selected candidate server as the server weight therefor, and
for assigning zero as the server weight to each remaining one of said eligible servers residing on said each one candidate system.

41. The apparatus in claim 40 wherein the server weight determining means further comprises:

means, operative if one or more eligible servers identified in the third set each has a zero server weight and the identification of one or more of said zero-weighted eligible servers is to be written into the output server set:
for writing the identifications of each successive zero-weighted eligible server into the output server set as an output eligible server until the output server set is full or the identifications of all the zero-weighted eligible servers have been taken, and
for assigning a pre-defined fixed server weight to the output eligible server; and means, operative if one or more candidate servers identified in the fourth set each has a zero server weight and the identification of one or more of said zero-weighted candidate servers is to be written into the output server set:
for writing the identifications of each successive zero-weighted candidate server into the output server set as an output candidate server until the output server set is full or the identifications of all the zero-weighted candidate servers have been taken; and
for assigning a pre-defined fixed server weight to the output candidate server.

42. The apparatus in claim 36, wherein the multi-processing environment is a sysplex, further comprising: means for receiving, from a network connected to the sysplex, the incoming request in a routing node, the routing node being one of the plurality of systems.

43. The apparatus in claim 42 further comprising:

means for communicating, through the network, the output server set from the routing node to a client application executing in a client computer connected through the network to the sysplex; and said work requests routing means comprises means for routing each of the total number of work requests, from the client application through the network, to a corresponding one of the servers in the sysplex and identified in the output server set.

44. The apparatus in claim 42 further comprising:

means for receiving, at the routing node, the total number of work requests from a client application executing in a client computer connected through the network to the sysplex; and said work requests routing means comprises means, situated within the operating instance in the routing node, for routing each of the total number of work requests received thereat to a corresponding one of the servers in the sysplex and identified in the output server set.

* * * * *